US012061915B2

(12) United States Patent
Shaffer et al.

(10) Patent No.: US 12,061,915 B2
(45) Date of Patent: Aug. 13, 2024

(54) GESTURE RECOGNIZERS WITH DELEGATES FOR CONTROLLING AND MODIFYING GESTURE RECOGNITION

(71) Applicant: Apple Inc., Cupertino, CA (US)

(72) Inventors: Joshua H. Shaffer, San Jose, CA (US); Bradford Allen Moore, Sunnyvale, CA (US); Jason Clay Beaver, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/921,098

(22) Filed: Jul. 6, 2020

(65) Prior Publication Data
US 2020/0387389 A1 Dec. 10, 2020

Related U.S. Application Data

(63) Continuation of application No. 15/623,322, filed on Jun. 14, 2017, now Pat. No. 10,732,997, which is a
(Continued)

(51) Int. Cl.
*G06F 9/451* (2018.01)
*G06F 3/04883* (2022.01)

(52) U.S. Cl.
CPC .......... *G06F 9/451* (2018.02); *G06F 3/04883* (2013.01)

(58) Field of Classification Search
CPC ...... G06F 3/041; G06F 3/0412; G06F 3/0414; G06F 3/0416; G06F 3/042; G06F 3/044;
(Continued)

(56) References Cited

U.S. PATENT DOCUMENTS

| 4,455,452 A | 6/1984 | Schuyler |
| 4,674,066 A | 6/1987 | Kucera |

(Continued)

FOREIGN PATENT DOCUMENTS

| AU | 2007283771 | 4/2007 |
| CA | 2755443 A1 | 9/2010 |

(Continued)

OTHER PUBLICATIONS

Allen, "Override the GNU C Library-Painlessly," http://www.ibm.com/developerworks/linux/library/I-glibc/index.html, Apr. 1, 2002, 4 pages.

(Continued)

*Primary Examiner* — Ke Xiao
*Assistant Examiner* — Nelson Lam
(74) *Attorney, Agent, or Firm* — Morgan, Lewis & Bockius LLP

(57) ABSTRACT

An electronic device displays one or more views of a software application with a plurality of gesture recognizers including at least one discrete gesture recognizer, configured to send a single action message in response to a respective gesture; and at least one continuous gesture recognizer, configured to send action messages at successive recognized sub-events of a respective recognized gesture. The device detects one or more events and processes each event using one or more of the gesture recognizers, including: processing the respective event at a respective gesture recognizer in accordance with a respective gesture definition corresponding to the respective gesture recognizer, and conditionally sending one or more respective action messages to the software application in accordance with an outcome of the processing of the respective event. The device executes the software application in accordance with one or more action
(Continued)

messages received from one or more of the gesture recognizers.

45 Claims, 18 Drawing Sheets

Related U.S. Application Data continuation of application No. 12/789,695, filed on May 28, 2010, now Pat. No. 9,684,521.

(60) Provisional application No. 61/298,531, filed on Jan. 26, 2010.

(58) Field of Classification Search
CPC .......... G06F 3/045; G06F 3/046; G06F 3/047; G06F 3/048; G06F 3/0482; G06F 3/04842; G06F 3/04845; G06F 3/0485; G06F 3/0486; G06F 3/0488; G06F 3/04883
USPC .................................................. 345/173–179
See application file for complete search history.

(56) References Cited

U.S. PATENT DOCUMENTS

| | | |
|---|---|---|
| 4,914,624 A | 4/1990 | Dunthorn |
| 5,046,434 A | 9/1991 | Breezer et al. |
| 5,233,547 A | 8/1993 | Kapp et al. |
| 5,252,951 A | 10/1993 | Tannenbaum et al. |
| 5,454,960 A | 10/1995 | Newsom |
| 5,463,725 A | 10/1995 | Henckel et al. |
| 5,488,204 A | 1/1996 | Mead et al. |
| 5,495,566 A | 2/1996 | Kwatinez |
| 5,513,309 A | 4/1996 | Meier et al. |
| 5,530,861 A | 6/1996 | Diamant et al. |
| 5,534,893 A | 7/1996 | Hansen, Jr. et al. |
| 5,564,112 A | 10/1996 | Hayes et al. |
| 5,566,337 A | 10/1996 | Szymanski et al. |
| 5,570,113 A | 10/1996 | Zetts |
| 5,583,543 A | 12/1996 | Takahashi et al. |
| 5,589,856 A | 12/1996 | Stein et al. |
| 5,612,719 A | 3/1997 | Beernick et al. |
| 5,627,567 A | 5/1997 | Davidson |
| 5,627,959 A | 5/1997 | Brown et al. |
| 5,655,094 A | 8/1997 | Cline et al. |
| 5,676,064 A | 10/1997 | Shuert |
| 5,686,940 A | 11/1997 | Kuga |
| 5,698,822 A | 12/1997 | Haneda et al. |
| 5,708,460 A | 1/1998 | Young et al. |
| 5,745,116 A | 4/1998 | Pisthua-Arnond |
| 5,777,605 A | 4/1998 | Yoshinobu et al. |
| 5,798,752 A | 8/1998 | Buxton et al. |
| 5,818,455 A | 10/1998 | Stone et al. |
| 5,844,547 A | 12/1998 | Minakuchi et al. |
| 5,854,853 A | 12/1998 | Wang |
| 5,864,636 A | 1/1999 | Chisaka |
| 5,867,158 A | 2/1999 | Murasaki et al. |
| 5,880,411 A | 3/1999 | Gillespie et al. |
| 5,903,902 A | 5/1999 | Orr et al. |
| 5,917,477 A | 6/1999 | Lee |
| 5,959,629 A | 9/1999 | Masui |
| 5,999,176 A | 12/1999 | Kamper |
| 6,005,575 A | 12/1999 | Colleran et al. |
| 6,028,602 A | 2/2000 | Weidenfeller et al. |
| 6,034,688 A | 3/2000 | Greenwood et al. |
| 6,035,343 A | 3/2000 | Tsushima et al. |
| 6,049,326 A | 4/2000 | Beyda et al. |
| 6,061,063 A | 5/2000 | Wagner et al. |
| 6,089,371 A | 7/2000 | Lin |
| 6,141,018 A | 10/2000 | Beri et al. |
| 6,188,391 B1 | 2/2001 | Seely et al. |
| 6,259,436 B1 | 7/2001 | Moon et al. |
| 6,281,886 B1 | 8/2001 | Ranieri |
| 6,282,316 B1 | 8/2001 | Arai |
| 6,323,846 B1 | 11/2001 | Westerman et al. |
| 6,369,821 B2 | 4/2002 | Merrill et al. |
| 6,377,965 B1 | 4/2002 | Hachamovitch et al. |
| 6,446,083 B1 | 9/2002 | Leight et al. |
| 6,448,986 B1 | 9/2002 | Smith |
| 6,486,896 B1 | 11/2002 | Ubillos |
| 6,489,951 B1 | 12/2002 | Wong et al. |
| 6,498,590 B1 | 12/2002 | Dietz et al. |
| 6,559,869 B1 | 5/2003 | Lui et al. |
| 6,567,102 B2 | 5/2003 | Kung |
| 6,570,557 B1 | 5/2003 | Westerman et al. |
| 6,570,594 B1 | 5/2003 | Wagner |
| 6,590,595 B1 | 7/2003 | Wagner et al. |
| 6,628,835 B1 | 9/2003 | Brill et al. |
| 6,631,501 B1 | 10/2003 | Jurion et al. |
| 6,636,242 B2 | 10/2003 | Bowman-Amuah |
| 6,639,584 B1 | 10/2003 | Li |
| 6,661,409 B2 | 12/2003 | DeMartines et al. |
| 6,664,989 B1 | 12/2003 | Snyder et al. |
| 6,664,991 B1 | 12/2003 | Chew et al. |
| 6,677,932 B1 | 1/2004 | Westerman |
| 6,677,965 B1 | 1/2004 | Ullmann et al. |
| 6,690,387 B2 | 2/2004 | Zimmerman et al. |
| 6,707,449 B2 | 3/2004 | Hinckley et al. |
| 6,714,221 B1 | 3/2004 | Christie et al. |
| 6,714,936 B1 | 3/2004 | Nevin, III |
| 6,735,583 B1 | 5/2004 | Bjarnestam et al. |
| 6,741,996 B1 | 5/2004 | Brechner et al. |
| 6,757,673 B2 | 6/2004 | Makus et al. |
| 6,765,557 B1 | 7/2004 | Segal et al. |
| 6,778,992 B1 | 8/2004 | Searle et al. |
| 6,809,724 B1 | 10/2004 | Shiraishi et al. |
| 6,819,315 B2 | 11/2004 | Toepke et al. |
| 6,820,237 B1 | 11/2004 | Abu-Hakima et al. |
| 6,831,631 B2 | 12/2004 | Chuang |
| 6,839,721 B2 | 1/2005 | Schwols |
| 6,856,326 B1 | 2/2005 | Zhai |
| 6,868,383 B1 | 3/2005 | Bangalore et al. |
| 6,903,927 B2 | 6/2005 | Anlauff |
| 6,907,575 B2 | 6/2005 | Duarte |
| 6,912,462 B2 | 6/2005 | Ogaki |
| 6,957,392 B2 | 10/2005 | Simister et al. |
| 6,958,749 B1 | 10/2005 | Matsushita |
| 6,963,937 B1 | 11/2005 | Kamper et al. |
| 6,972,776 B2 | 12/2005 | Davis et al. |
| 6,975,306 B2 | 12/2005 | Hinckley et al. |
| 6,985,137 B2 | 1/2006 | Kaikuranta |
| 6,985,178 B1 | 1/2006 | Morita et al. |
| 7,009,599 B2 | 3/2006 | Pihlaja |
| 7,009,626 B2 | 3/2006 | Anwar |
| 7,013,435 B2 | 3/2006 | Gallo et al. |
| 7,023,427 B2 | 4/2006 | Kraus et al. |
| 7,030,861 B1 | 4/2006 | Westerman et al. |
| 7,030,863 B2 | 4/2006 | Longe et al. |
| 7,036,094 B1 | 4/2006 | Cohen et al. |
| 7,046,230 B2 | 5/2006 | Zadesky et al. |
| 7,062,090 B2 | 6/2006 | Simmons et al. |
| 7,075,512 B1 | 7/2006 | Fabre et al. |
| 7,084,859 B1 | 8/2006 | Pryor |
| 7,088,374 B2 | 8/2006 | David et al. |
| 7,102,626 B2 | 9/2006 | Denny, III |
| 7,117,453 B2 | 10/2006 | Drucker et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,171,353 B2 | 1/2007 | Trower, II et al. |
| 7,173,623 B2 | 2/2007 | Calkins et al. |
| 7,181,373 B2 | 2/2007 | Le Cocq et al. |
| 7,184,796 B2 | 2/2007 | Karidis et al. |
| 7,237,199 B1 | 6/2007 | Menhardt et al. |
| 7,240,291 B2 | 7/2007 | Card et al. |
| 7,337,412 B2 | 2/2008 | Guido et al. |
| 7,346,850 B2 | 3/2008 | Swartz et al. |
| 7,358,965 B2 | 4/2008 | Barabe et al. |
| 7,385,592 B2 | 6/2008 | Collins |
| 7,406,696 B2 | 7/2008 | Burger et al. |
| 7,420,543 B2 | 9/2008 | Jayachandra |
| 7,469,381 B2 | 12/2008 | Ording |

(56) References Cited

U.S. PATENT DOCUMENTS

| | | |
|---|---|---|
| 7,487,447 B1 | 2/2009 | Jerger |
| 7,499,027 B2 | 3/2009 | Brigham, II et al. |
| 7,561,159 B2 | 7/2009 | Abel et al. |
| 7,564,448 B2 | 7/2009 | Yi |
| 7,576,732 B2 | 8/2009 | Lii |
| 7,603,143 B2 | 10/2009 | Kang et al. |
| 7,614,008 B2 | 11/2009 | Ording |
| 7,653,883 B2 | 1/2010 | Hotelling et al. |
| 7,663,607 B2 | 2/2010 | Hotelling et al. |
| 7,673,255 B2 | 3/2010 | Schechter et al. |
| 7,694,231 B2 | 4/2010 | Kocienda et al. |
| 7,724,242 B2 | 5/2010 | Hillis et al. |
| 7,739,604 B1 | 6/2010 | Lyons et al. |
| 7,750,893 B2 | 7/2010 | Hashimoto et al. |
| 7,761,541 B1 | 7/2010 | Morley et al. |
| 7,778,818 B2 | 8/2010 | Longe et al. |
| 7,782,307 B2 | 8/2010 | Westerman et al. |
| 7,786,975 B2 | 8/2010 | Ording et al. |
| 7,812,826 B2 | 10/2010 | Ording et al. |
| 7,843,427 B2 | 11/2010 | Ording et al. |
| 7,844,915 B2 | 11/2010 | Platzer et al. |
| 7,864,037 B2 | 1/2011 | Miller |
| 7,872,652 B2 | 1/2011 | Platzer et al. |
| 7,900,156 B2 | 3/2011 | Andre et al. |
| 7,903,115 B2 | 3/2011 | Platzer et al. |
| 7,907,125 B2 | 3/2011 | Weiss et al. |
| 7,917,584 B2 | 3/2011 | Arthursson |
| 7,925,996 B2 | 4/2011 | Hofmeister et al. |
| 7,941,760 B2 | 5/2011 | Kocienda et al. |
| 7,962,862 B2 | 6/2011 | Kulp et al. |
| 7,966,578 B2 | 6/2011 | Tolmasky et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | Ho et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,400,416 B2 | 3/2013 | Ho et al. |
| 8,411,060 B1 | 4/2013 | Scholler et al. |
| 8,416,196 B2 | 4/2013 | Williamson et al. |
| 8,428,893 B2 | 4/2013 | Moore et al. |
| 8,434,003 B2 | 4/2013 | Zalewski et al. |
| 8,436,815 B2 | 5/2013 | Mazeev et al. |
| 8,436,821 B1 | 5/2013 | Plitcha et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 | 10/2013 | Rekimoto |
| 8,645,827 B2 | 2/2014 | Beaver et al. |
| 8,656,311 B1 | 2/2014 | Harper et al. |
| 8,676,824 B2 | 3/2014 | Tavor |
| 8,682,602 B2 | 3/2014 | Moore et al. |
| 8,775,820 B1 | 7/2014 | Freeburne |
| 9,285,908 B2 | 3/2016 | Moore et al. |
| 9,311,112 B2 | 4/2016 | Shaffer et al. |
| 9,389,712 B2 | 7/2016 | Beaver et al. |
| 9,483,121 B2 | 11/2016 | Shaffer et al. |
| 9,684,521 B2 | 6/2017 | Shaffer et al. |
| 9,690,481 B2 | 6/2017 | Beaver et al. |
| 9,720,594 B2 | 8/2017 | Beaver et al. |
| 9,965,177 B2 | 5/2018 | Moore et al. |
| 10,521,109 B2 | 12/2019 | Beaver et al. |
| 11,755,196 B2* | 9/2023 | Shaffer ............... G06F 3/04883 715/863 |
| 2001/0009033 A1 | 7/2001 | Morisaki et al. |
| 2001/0011998 A1 | 8/2001 | Agata et al. |
| 2001/0012001 A1 | 8/2001 | Rekimoto et al. |
| 2001/0028369 A1 | 10/2001 | Gallo et al. |
| 2001/0045949 A1 | 11/2001 | Chithambaram et al. |
| 2002/0015024 A1 | 2/2002 | Westerman et al. |
| 2002/0015064 A1 | 2/2002 | Robotham et al. |
| 2002/0025024 A1 | 2/2002 | Tybinkowski et al. |
| 2002/0036618 A1 | 3/2002 | Wakai et al. |
| 2002/0101418 A1 | 8/2002 | Vernier et al. |
| 2002/0130847 A1 | 9/2002 | Conzola et al. |
| 2002/0171675 A1 | 11/2002 | Fox et al. |
| 2002/0191029 A1 | 12/2002 | Gillespie et al. |
| 2002/0194589 A1 | 12/2002 | Cristofalo et al. |
| 2003/0063073 A1 | 4/2003 | Geaghan et al. |
| 2003/0071850 A1 | 4/2003 | Geidl |
| 2003/0071858 A1 | 4/2003 | Morohoshi |
| 2003/0080946 A1 | 5/2003 | Chuang |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0122787 A1 | 7/2003 | Zimmerman et al. |
| 2003/0132959 A1 | 7/2003 | Simister et al. |
| 2003/0146941 A1 | 8/2003 | Bailey et al. |
| 2003/0160832 A1 | 8/2003 | Ridgley et al. |
| 2003/0174149 A1 | 9/2003 | Fujisaki et al. |
| 2003/0184525 A1 | 10/2003 | Tsai |
| 2003/0197689 A1 | 10/2003 | May |
| 2003/0197744 A1 | 10/2003 | Irvine |
| 2003/0210258 A1 | 11/2003 | Williams |
| 2003/0214531 A1 | 11/2003 | Chambers et al. |
| 2003/0214553 A1 | 11/2003 | Dodge |
| 2003/0217336 A1 | 11/2003 | Gounares et al. |
| 2003/0222917 A1 | 12/2003 | Trantow |
| 2004/0001627 A1 | 1/2004 | Simmons et al. |
| 2004/0021676 A1 | 2/2004 | Chen et al. |
| 2004/0021698 A1 | 2/2004 | Baldwin et al. |
| 2004/0022523 A1 | 2/2004 | Duerr et al. |
| 2004/0025115 A1 | 2/2004 | Sienel et al. |
| 2004/0027398 A1 | 2/2004 | Jaeger |
| 2004/0030914 A1 | 2/2004 | Kelley et al. |
| 2004/0039474 A1 | 2/2004 | Kontani |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. |
| 2004/0111672 A1 | 6/2004 | Bowman et al. |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt |
| 2004/0189721 A1 | 9/2004 | Pettiross et al. |
| 2004/0207542 A1 | 10/2004 | Chang et al. |
| 2004/0210847 A1 | 10/2004 | Berson et al. |
| 2004/0215643 A1 | 10/2004 | Brechner et al. |
| 2004/0221168 A1 | 11/2004 | Girard |
| 2004/0222992 A1 | 11/2004 | Calkins et al. |
| 2004/0224638 A1 | 11/2004 | Fadell et al. |
| 2004/0225965 A1 | 11/2004 | Garside et al. |
| 2004/0263486 A1 | 12/2004 | Seni |
| 2005/0005241 A1 | 1/2005 | Hunleth et al. |
| 2005/0008343 A1 | 1/2005 | Frohlich et al. |
| 2005/0012723 A1 | 1/2005 | Pallakoff |
| 2005/0017957 A1 | 1/2005 | Yi |
| 2005/0024341 A1 | 2/2005 | Gillespie et al. |
| 2005/0027666 A1 | 2/2005 | Beck, Jr. et al. |
| 2005/0057524 A1 | 3/2005 | Hill et al. |
| 2005/0078088 A1 | 4/2005 | Davis et al. |
| 2005/0088443 A1 | 4/2005 | Blanco et al. |
| 2005/0122806 A1 | 6/2005 | Arakawa et al. |
| 2005/0145807 A1 | 7/2005 | Lapstun et al. |
| 2005/0162402 A1 | 7/2005 | Watanachote |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0193015 A1 | 9/2005 | Logston et al. |
| 2005/0195154 A1 | 9/2005 | Robbins et al. |

(56) References Cited

U.S. PATENT DOCUMENTS

| | | |
|---|---|---|
| 2005/0198588 A1 | 9/2005 | Lin et al. |
| 2005/0210369 A1 | 9/2005 | Damm, Jr. |
| 2005/0210419 A1 | 9/2005 | Kela et al. |
| 2005/0212767 A1 | 9/2005 | Marvit et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0010400 A1 | 1/2006 | Dehlin et al. |
| 2006/0022956 A1 | 2/2006 | Lengeling et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028455 A1 | 2/2006 | Hinckley et al. |
| 2006/0031786 A1 | 2/2006 | Hillis et al. |
| 2006/0036955 A1 | 2/2006 | Baudisch et al. |
| 2006/0038796 A1 | 2/2006 | Hinckley et al. |
| 2006/0048073 A1 | 3/2006 | Jarrett et al. |
| 2006/0055662 A1 | 3/2006 | Rimas-Ribikauskas et al. |
| 2006/0055669 A1 | 3/2006 | Das |
| 2006/0055789 A1 | 3/2006 | Jin et al. |
| 2006/0059462 A1 | 3/2006 | Yamamoto |
| 2006/0061551 A1 | 3/2006 | Fateh |
| 2006/0066588 A1 | 3/2006 | Lyon et al. |
| 2006/0077183 A1 | 4/2006 | Studt |
| 2006/0077544 A1 | 4/2006 | Stark |
| 2006/0082549 A1 | 4/2006 | Hoshino et al. |
| 2006/0094502 A1 | 5/2006 | Katayama et al. |
| 2006/0097991 A1 | 5/2006 | Hotelling et al. |
| 2006/0112335 A1 | 5/2006 | Hofmeister et al. |
| 2006/0112349 A1 | 5/2006 | Clow et al. |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. |
| 2006/0176403 A1 | 8/2006 | Gritton et al. |
| 2006/0181510 A1 | 8/2006 | Faith |
| 2006/0187215 A1 | 8/2006 | Rosenberg et al. |
| 2006/0190833 A1 | 8/2006 | SanGiovanni et al. |
| 2006/0197753 A1 | 9/2006 | Hotelling |
| 2006/0221061 A1 | 10/2006 | Fry |
| 2006/0236263 A1 | 10/2006 | Bathiche et al. |
| 2006/0238495 A1 | 10/2006 | Davis |
| 2006/0242602 A1 | 10/2006 | Schechter et al. |
| 2006/0242607 A1 | 10/2006 | Hudson |
| 2006/0247915 A1 | 11/2006 | Bradford et al. |
| 2006/0262104 A1 | 11/2006 | Sullivan et al. |
| 2006/0262136 A1 | 11/2006 | Vaisanen |
| 2006/0271520 A1 | 11/2006 | Ragan |
| 2006/0274042 A1 | 12/2006 | Krah et al. |
| 2006/0279548 A1 | 12/2006 | Geaghan |
| 2006/0284792 A1 | 12/2006 | Foxlin |
| 2006/0288313 A1 | 12/2006 | Hillis |
| 2007/0006078 A1 | 1/2007 | Jewsbury et al. |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0036346 A1 | 2/2007 | Kwon |
| 2007/0046643 A1 | 3/2007 | Hillis et al. |
| 2007/0050469 A1 | 3/2007 | Gupta et al. |
| 2007/0055967 A1 | 3/2007 | Poff et al. |
| 2007/0061126 A1 | 3/2007 | Russo et al. |
| 2007/0064004 A1 | 3/2007 | Bonner et al. |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0089069 A1 | 4/2007 | Hsieh et al. |
| 2007/0094352 A1 | 4/2007 | Choi et al. |
| 2007/0109275 A1 | 5/2007 | Chuang |
| 2007/0119698 A1 | 5/2007 | Day |
| 2007/0120835 A1 | 5/2007 | Sato |
| 2007/0132789 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152980 A1 | 7/2007 | Kocienda et al. |
| 2007/0152983 A1 | 7/2007 | McKillop et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | van Os et al. |
| 2007/0174257 A1 | 7/2007 | Howard |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. |
| 2007/0198926 A1 | 8/2007 | Joguet et al. |
| 2007/0214436 A1 | 9/2007 | Myers |
| 2007/0214462 A1 | 9/2007 | Boillot |
| 2007/0226636 A1 | 9/2007 | Carpenter et al. |
| 2007/0236472 A1 | 10/2007 | Bentsen et al. |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. |
| 2007/0252821 A1 | 11/2007 | Hollemans et al. |
| 2007/0259685 A1 | 11/2007 | Engblom et al. |
| 2007/0262964 A1 | 11/2007 | Zotov et al. |
| 2007/0277124 A1 | 11/2007 | Shin et al. |
| 2007/0288856 A1 | 12/2007 | Butlin et al. |
| 2007/0291009 A1 | 12/2007 | Wright et al. |
| 2007/0296707 A1 | 12/2007 | Kang et al. |
| 2008/0001923 A1 | 1/2008 | Hall et al. |
| 2008/0005703 A1 | 1/2008 | Radivojevic et al. |
| 2008/0012835 A1 | 1/2008 | Rimon et al. |
| 2008/0016096 A1 | 1/2008 | Wilding et al. |
| 2008/0027642 A1 | 1/2008 | Winberry et al. |
| 2008/0028327 A1 | 1/2008 | Hirota et al. |
| 2008/0034029 A1 | 2/2008 | Fang et al. |
| 2008/0036743 A1 | 2/2008 | Westerman et al. |
| 2008/0041640 A1 | 2/2008 | Gillespie et al. |
| 2008/0043020 A1 | 2/2008 | Snow et al. |
| 2008/0048978 A1 | 2/2008 | Trent, Jr. et al. |
| 2008/0072143 A1 | 3/2008 | Assadollahi |
| 2008/0075368 A1 | 3/2008 | Kuzmin |
| 2008/0082934 A1 | 4/2008 | Kocienda et al. |
| 2008/0084400 A1 | 4/2008 | Rosenberg |
| 2008/0094356 A1 | 4/2008 | Ording et al. |
| 2008/0094368 A1 | 4/2008 | Ording et al. |
| 2008/0104544 A1 | 5/2008 | Collins et al. |
| 2008/0114614 A1 | 5/2008 | Mahesh et al. |
| 2008/0115086 A1 | 5/2008 | Rupp et al. |
| 2008/0119217 A1 | 5/2008 | Coxhill |
| 2008/0120576 A1 | 5/2008 | Kariathungal et al. |
| 2008/0122806 A1 | 5/2008 | Ahn |
| 2008/0158170 A1 | 7/2008 | Herz et al. |
| 2008/0158191 A1 | 7/2008 | Yang et al. |
| 2008/0162751 A1 | 7/2008 | Wilson |
| 2008/0165022 A1 | 7/2008 | Herz et al. |
| 2008/0165132 A1 | 7/2008 | Weiss et al. |
| 2008/0165136 A1 | 7/2008 | Christie et al. |
| 2008/0165140 A1 | 7/2008 | Christie et al. |
| 2008/0165141 A1 | 7/2008 | Christie |
| 2008/0165160 A1 | 7/2008 | Kocienda et al. |
| 2008/0165161 A1 | 7/2008 | Platzer et al. |
| 2008/0166049 A1 | 7/2008 | Wang et al. |
| 2008/0168384 A1 | 7/2008 | Platzer et al. |
| 2008/0168388 A1 | 7/2008 | Decker |
| 2008/0168395 A1 | 7/2008 | Ording et al. |
| 2008/0168402 A1 | 7/2008 | Blumenberg |
| 2008/0168405 A1 | 7/2008 | Tolmasky et al. |
| 2008/0168478 A1 | 7/2008 | Platzer et al. |
| 2008/0172633 A1 | 7/2008 | Jeon et al. |
| 2008/0174568 A1 | 7/2008 | Kim |
| 2008/0195388 A1 | 8/2008 | Bower et al. |
| 2008/0207130 A1 | 8/2008 | Kunii |

(56) References Cited

U.S. PATENT DOCUMENTS

| | | |
|---|---|---|
| 2008/0218489 A1 | 9/2008 | Park et al. |
| 2008/0225014 A1 | 9/2008 | Kim |
| 2008/0231610 A1 | 9/2008 | Hotelling et al. |
| 2008/0316178 A1 | 12/2008 | Caliksan et al. |
| 2008/0316183 A1 | 12/2008 | Westerman et al. |
| 2009/0037849 A1 | 2/2009 | Immonen et al. |
| 2009/0048000 A1 | 2/2009 | Ade-Hall |
| 2009/0049388 A1 | 2/2009 | Taib et al. |
| 2009/0051671 A1 | 2/2009 | Konstas |
| 2009/0052639 A1 | 2/2009 | Payne |
| 2009/0058820 A1 | 3/2009 | Hinckley |
| 2009/0058830 A1 | 3/2009 | Herz et al. |
| 2009/0063135 A1 | 3/2009 | Fux et al. |
| 2009/0064047 A1 | 3/2009 | Shim et al. |
| 2009/0070098 A1 | 3/2009 | Patryshev |
| 2009/0128504 A1 | 5/2009 | Smith |
| 2009/0207140 A1 | 8/2009 | Hansson |
| 2009/0211891 A1 | 8/2009 | Lai et al. |
| 2009/0225037 A1 | 9/2009 | Williamson et al. |
| 2009/0225038 A1 | 9/2009 | Bolsinga et al. |
| 2009/0225039 A1 | 9/2009 | Williamson et al. |
| 2009/0225041 A1 | 9/2009 | Kida et al. |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0244020 A1 | 10/2009 | Sjolin |
| 2009/0251434 A1 | 10/2009 | Rimon et al. |
| 2009/0259969 A1 | 10/2009 | Pallakoff |
| 2009/0262087 A1 | 10/2009 | Kim |
| 2009/0271704 A1 | 10/2009 | Cohen |
| 2009/0273571 A1* | 11/2009 | Bowens ............... G06F 3/041 345/173 |
| 2009/0282332 A1 | 11/2009 | Porat |
| 2009/0284479 A1 | 11/2009 | Dennis et al. |
| 2009/0293007 A1 | 11/2009 | Duarte et al. |
| 2009/0300530 A1 | 12/2009 | Falchuk |
| 2009/0303187 A1 | 12/2009 | Pallakoff |
| 2009/0304281 A1 | 12/2009 | Yipu |
| 2009/0309847 A1 | 12/2009 | Russell et al. |
| 2009/0322671 A1* | 12/2009 | Scott ............... G06F 3/012 345/156 |
| 2009/0322687 A1 | 12/2009 | Duncan et al. |
| 2009/0322699 A1 | 12/2009 | Hansson |
| 2009/0322700 A1 | 12/2009 | D'Souza et al. |
| 2010/0013676 A1 | 1/2010 | Do et al. |
| 2010/0020025 A1 | 1/2010 | Lemort et al. |
| 2010/0020221 A1 | 1/2010 | Tupman et al. |
| 2010/0030612 A1 | 2/2010 | Kim et al. |
| 2010/0046850 A1 | 2/2010 | Ho et al. |
| 2010/0060666 A1 | 3/2010 | Fong |
| 2010/0066676 A1 | 3/2010 | Kramer et al. |
| 2010/0073303 A1* | 3/2010 | Wu ............... G06F 3/0485 345/173 |
| 2010/0085323 A1 | 4/2010 | Bogue |
| 2010/0107116 A1 | 4/2010 | Rieman et al. |
| 2010/0122167 A1 | 5/2010 | Ryu |
| 2010/0146458 A1 | 6/2010 | Wadekar |
| 2010/0149122 A1 | 6/2010 | Lin |
| 2010/0156804 A1 | 6/2010 | Young |
| 2010/0169841 A1 | 7/2010 | Singh |
| 2010/0177053 A2 | 7/2010 | Yasutake |
| 2010/0182246 A1 | 7/2010 | Petschnigg et al. |
| 2010/0182248 A1 | 7/2010 | Chun |
| 2010/0188328 A1 | 7/2010 | Dodge et al. |
| 2010/0235118 A1 | 9/2010 | Moore et al. |
| 2010/0235745 A1 | 9/2010 | Shintani |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299594 A1 | 11/2010 | Zalewski et al. |
| 2010/0309147 A1 | 12/2010 | Fleizach et al. |
| 2010/0325575 A1 | 12/2010 | Platzer et al. |
| 2011/0037714 A1 | 2/2011 | Seo et al. |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0102464 A1 | 5/2011 | Godavari |
| 2011/0111798 A1 | 5/2011 | Jeon et al. |
| 2011/0115745 A1 | 5/2011 | Cabrera Cordon et al. |
| 2011/0151974 A1 | 6/2011 | Deaguero |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0242032 A1 | 10/2011 | Seo et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0258537 A1 | 10/2011 | Rives et al. |
| 2011/0291951 A1 | 12/2011 | Tong |
| 2011/0295596 A1 | 12/2011 | Hung et al. |
| 2011/0298724 A1 | 12/2011 | Ameling et al. |
| 2011/0304550 A1 | 12/2011 | Romera Jolliff et al. |
| 2011/0304560 A1 | 12/2011 | Dale et al. |
| 2011/0307833 A1 | 12/2011 | Dale et al. |
| 2011/0310046 A1 | 12/2011 | Beaver et al. |
| 2011/0310047 A1 | 12/2011 | Moore et al. |
| 2011/0314429 A1 | 12/2011 | Blumenberg |
| 2011/0314430 A1 | 12/2011 | Blumenberg |
| 2011/0321125 A1 | 12/2011 | Kyohgoku et al. |
| 2012/0023443 A1 | 1/2012 | Blumenberg |
| 2012/0023460 A1 | 1/2012 | Blumenberg |
| 2012/0023461 A1 | 1/2012 | Blumenberg |
| 2012/0023509 A1 | 1/2012 | Blumenberg |
| 2012/0026104 A1 | 2/2012 | Ho et al. |
| 2012/0092276 A1 | 4/2012 | O'Prey et al. |
| 2012/0098768 A1 | 4/2012 | Bendewald et al. |
| 2012/0133579 A1 | 5/2012 | Prieur et al. |
| 2012/0169593 A1 | 7/2012 | Mak et al. |
| 2012/0221929 A1 | 8/2012 | Bolsinga et al. |
| 2012/0242584 A1 | 9/2012 | Tuli |
| 2012/0256849 A1 | 10/2012 | Crumly |
| 2012/0278725 A1 | 11/2012 | Gordon et al. |
| 2012/0299852 A1 | 11/2012 | Hsu et al. |
| 2012/0304133 A1 | 11/2012 | Nan et al. |
| 2013/0009986 A1 | 1/2013 | Shah et al. |
| 2013/0016039 A1 | 1/2013 | Moore et al. |
| 2013/0069899 A1 | 3/2013 | Beaver et al. |
| 2013/0120280 A1 | 5/2013 | Kukulski |
| 2013/0135217 A1 | 5/2013 | Honji et al. |
| 2013/0239046 A1 | 9/2013 | Platzer et al. |
| 2013/0244574 A1 | 9/2013 | Okuno et al. |
| 2013/0246861 A1 | 9/2013 | Colley et al. |
| 2013/0275888 A1 | 10/2013 | Williamson et al. |
| 2014/0033131 A1 | 1/2014 | Shaffer et al. |
| 2014/0145995 A1 | 5/2014 | Beaver et al. |
| 2014/0160052 A1 | 6/2014 | Moore et al. |
| 2014/0160085 A1* | 6/2014 | Rabii ............... G06F 1/3262 345/178 |
| 2014/0173419 A1 | 6/2014 | Williamson et al. |
| 2014/0181731 A1 | 6/2014 | Platzer et al. |
| 2014/0189716 A1 | 7/2014 | George et al. |
| 2014/0310661 A1 | 10/2014 | Frederickson et al. |
| 2014/0340327 A1* | 11/2014 | Herz ............... G06F 3/041 345/173 |
| 2014/0361982 A1 | 12/2014 | Shaffer |
| 2016/0018981 A1 | 1/2016 | Amerige et al. |
| 2016/0110230 A1 | 1/2016 | Moore et al. |
| 2016/0077597 A1 | 3/2016 | Silawan et al. |
| 2016/0091977 A1 | 3/2016 | Ortega et al. |
| 2016/0139778 A1* | 5/2016 | An ............... H04N 5/272 345/173 |
| 2016/0162180 A1 | 6/2016 | Moore et al. |
| 2016/0334990 A1 | 11/2016 | Beaver et al. |
| 2016/0342325 A1 | 11/2016 | Blumenberg |
| 2016/0370987 A1 | 12/2016 | Amerige et al. |
| 2016/0378193 A1* | 12/2016 | Camacho Perez ...... G06F 3/017 345/156 |
| 2017/0046063 A1 | 2/2017 | Shaffer et al. |
| 2017/0160925 A1 | 4/2017 | Beaver et al. |
| 2017/0277381 A1* | 9/2017 | Allyn ............... G06F 3/038 |

(56) References Cited

U.S. PATENT DOCUMENTS

| | | |
|---|---|---|
| 2017/0286131 A1 | 10/2017 | Shaffer et al. |
| 2017/0308277 A1 | 10/2017 | Platzer et al. |
| 2018/0024681 A1* | 1/2018 | Bernstein ............ G06F 3/0412 345/174 |
| 2018/0052522 A1 | 2/2018 | Shaffer |
| 2018/0260113 A1 | 9/2018 | Beaver et al. |
| 2019/0138181 A1 | 5/2019 | Blumenberg |
| 2020/0125256 A1 | 4/2020 | Beaver et al. |
| 2020/0233555 A1 | 7/2020 | Blumenberg |
| 2020/0301579 A1 | 9/2020 | Shaffer et al. |
| 2021/0117037 A1 | 4/2021 | Beaver et al. |
| 2022/0107728 A1 | 4/2022 | Shaffer et al. |
| 2022/0391067 A1* | 12/2022 | Chugunov .......... G06F 3/04883 |
| 2023/0021869 A1 | 1/2023 | Blumenberg |
| 2023/0066645 A1 | 3/2023 | Williamson et al. |
| 2023/0244317 A1 | 8/2023 | Shaffer |
| 2023/0384881 A1 | 11/2023 | Beaver et al. |
| 2023/0409189 A1 | 12/2023 | Shaffer et al. |

FOREIGN PATENT DOCUMENTS

| | | |
|---|---|---|
| CN | 1326564 A | 12/2001 |
| CN | 1331815 A | 1/2002 |
| CN | 1422481 A | 6/2003 |
| CN | 1695105 A | 11/2005 |
| CN | 1704886 A | 12/2005 |
| CN | 1797308 A | 7/2006 |
| CN | 1841284 A | 10/2006 |
| CN | 1845046 A | 10/2006 |
| CN | 1860429 A | 11/2006 |
| CN | 1942853 A | 4/2007 |
| CN | 1967458 A | 5/2007 |
| CN | 1969254 A | 5/2007 |
| CN | 101040244 A | 9/2007 |
| CN | 101052939 A | 10/2007 |
| CN | 101089804 A | 12/2007 |
| CN | 101339453 A | 1/2009 |
| CN | 101356492 A | 1/2009 |
| CN | 101410781 A | 4/2009 |
| CN | 101526880 A | 9/2009 |
| CN | 101529368 A | 9/2009 |
| CN | 101578577 A | 11/2009 |
| CN | 101636711 A | 1/2010 |
| CN | 101727240 A | 6/2010 |
| CN | 101853105 A | 10/2010 |
| CN | 102768608 A | 11/2012 |
| CN | 103109249 A | 5/2013 |
| DE | 202007013923 U1 | 12/2007 |
| DE | 202005021427 U1 | 2/2008 |
| EP | 538 705 A1 | 4/1993 |
| EP | 626 635 A2 | 11/1994 |
| EP | 635 779 A1 | 1/1995 |
| EP | 701 220 A1 | 3/1996 |
| EP | 0 712 825 A1 | 5/1996 |
| EP | 0 880 091 A2 | 11/1998 |
| EP | 1 443 395 A2 | 8/2004 |
| EP | 1 517 228 A2 | 3/2005 |
| EP | 1 171 682 A2 | 11/2006 |
| EP | 1 860 539 A1 | 11/2007 |
| EP | 2 031 837 A2 | 3/2009 |
| EP | 2 141 576 A2 | 1/2010 |
| EP | 1 964 022 B1 | 3/2010 |
| EP | 2 184 673 A1 | 5/2010 |
| EP | 2 354 930 A1 | 8/2011 |
| EP | 2 390 766 A1 | 11/2011 |
| EP | 2 409 222 A2 | 1/2012 |
| EP | 2 472 384 A1 | 7/2012 |
| EP | 2330492 B1 | 10/2017 |
| GB | 1517521 A | 7/1978 |
| GB | 2319591 A | 5/1998 |
| GB | 2 351 639 A | 1/2001 |
| GB | 2351639 A | 1/2001 |
| GB | 2373778 A | 10/2002 |
| GB | 2404547 A | 7/2003 |
| JP | 02-140822 | 5/1990 |
| JP | 03-271976 | 12/1991 |
| JP | H05-019969 | 1/1993 |
| JP | H05-298002 | 11/1993 |
| JP | 06-149467 | 5/1994 |
| JP | H06-274329 | 9/1994 |
| JP | 08-16314 | 1/1996 |
| JP | H09-44285 | 2/1997 |
| JP | H09-114586 | 5/1997 |
| JP | H09-231003 | 9/1997 |
| JP | H10-500509 | 1/1998 |
| JP | H11-085354 | 3/1999 |
| JP | 2000-163031 | 6/2000 |
| JP | 2000-163443 | 6/2000 |
| JP | 2000-222130 | 8/2000 |
| JP | 2000-322199 | 11/2000 |
| JP | 2001-027924 | 1/2001 |
| JP | 2001-051798 | 2/2001 |
| JP | 2001-167227 | 6/2001 |
| JP | 2001-290585 | 10/2001 |
| JP | 2002-041242 | 2/2002 |
| JP | 2002-244848 | 8/2002 |
| JP | 2003-296024 | 10/2003 |
| JP | 2003-330605 | 11/2003 |
| JP | 2004-005688 | 1/2004 |
| JP | 2005-056286 | 3/2005 |
| JP | 2005-082086 | 3/2005 |
| JP | 2005-092476 | 4/2005 |
| JP | 2005-100391 | 4/2005 |
| JP | 2005-108211 | 4/2005 |
| JP | 2005-165532 | 6/2005 |
| JP | 2005-242669 | 9/2005 |
| JP | 2005-275652 | 10/2005 |
| JP | 2005-322088 | 11/2005 |
| JP | 2006-024039 | 1/2006 |
| JP | 2006-085356 | 3/2006 |
| JP | 2006-085703 | 3/2006 |
| JP | 2006-102275 | 4/2006 |
| JP | 2006-314167 | 11/2006 |
| JP | 2006-350490 | 12/2006 |
| JP | 2007-523394 | 8/2007 |
| JP | 2007-312823 | 12/2007 |
| JP | 2008-503125 | 1/2008 |
| JP | 2008-027082 | 2/2008 |
| JP | 2008-508600 | 3/2008 |
| JP | 2008-508601 | 3/2008 |
| JP | 2008-146165 | 6/2008 |
| JP | 2008-203973 | 9/2008 |
| JP | 2008-312153 | 12/2008 |
| JP | 2009-110286 | 5/2009 |
| JP | 2009-169825 | 7/2009 |
| JP | 2009-525538 | 7/2009 |
| JP | 10-503124 | 1/2010 |
| JP | 2012-014299 A | 1/2012 |
| JP | 2006-245128 | 9/2014 |
| KR | 20080087940 A | 10/2008 |
| KR | 2009-0057304 | 6/2009 |
| KR | 2009-0057421 | 6/2009 |
| WO | WO 00/38042 A1 | 6/2000 |
| WO | WO 01/29702 A2 | 4/2001 |
| WO | WO 01/77792 A2 | 10/2001 |
| WO | WO 02/01338 A1 | 1/2002 |
| WO | WO 02/08881 A | 1/2002 |
| WO | WO 02/13176 A2 | 2/2002 |
| WO | WO 02/21338 A2 | 3/2002 |
| WO | WO 03/060622 A2 | 7/2003 |
| WO | WO 03/081458 A1 | 10/2003 |
| WO | WO 04/001560 A1 | 12/2003 |
| WO | WO 2005/029460 A1 | 3/2005 |
| WO | WO 05/052773 A2 | 6/2005 |
| WO | WO 06/003590 A2 | 1/2006 |
| WO | WO 2006/003591 A2 | 1/2006 |
| WO | WO 06/020304 A2 | 2/2006 |
| WO | WO 06/020305 A2 | 2/2006 |
| WO | WO 2006/020305 A2 | 2/2006 |
| WO | WO 2006/026183 A2 | 3/2006 |
| WO | WO 2006/045530 A2 | 5/2006 |
| WO | WO 2006/067711 A2 | 6/2006 |
| WO | WO 2006/094308 A2 | 9/2006 |

(56) References Cited

FOREIGN PATENT DOCUMENTS

| | | |
|---|---|---|
| WO | WO 2006/124248 A2 | 11/2006 |
| WO | WO 2006/128248 A1 | 12/2006 |
| WO | WO 2007/037806 A1 | 4/2007 |
| WO | WO 2007/067858 A1 | 6/2007 |
| WO | WO 2007/079425 A2 | 7/2007 |
| WO | WO 2007/089766 A2 | 8/2007 |
| WO | WO 2008/020446 A1 | 2/2008 |
| WO | WO 2008/030779 A2 | 3/2008 |
| WO | WO 2008/030879 A2 | 3/2008 |
| WO | WO 2008/030880 A1 | 3/2008 |
| WO | WO 2008/030976 A2 | 3/2008 |
| WO | WO 2008/085846 A2 | 7/2008 |
| WO | WO 2008/085848 A1 | 7/2008 |
| WO | WO 2008/085855 A1 | 7/2008 |
| WO | WO 2008/085871 A1 | 7/2008 |
| WO | WO 2008/085877 A1 | 7/2008 |
| WO | WO 2008/148021 A2 | 12/2008 |
| WO | WO 2009/018314 A2 | 2/2009 |
| WO | WO 2009/111189 A1 | 9/2009 |
| WO | WO 2009/111458 A1 | 9/2009 |
| WO | WO 2009/111460 A1 | 9/2009 |
| WO | WO 2009/111469 A1 | 9/2009 |
| WO | WO 2010/041155 A1 | 4/2010 |
| WO | WO 2010/107669 A2 | 9/2010 |
| WO | WO 2010/144201 A2 | 12/2010 |

OTHER PUBLICATIONS

Anonymous, "Firegestures Version History: Add-ons for Firefox," Internet Article, http://addons.mozilla.org/en-US/firefox/addons/version/6366, Oct. 28, 2009, 6 pages.
Anonymous, "Firegestures: Changelog," Internet Article, http://www.xuldev.org/firegestures/changelong.php, Oct. 27, 2009, 8 pages.
Anonymous, "Firegestures: Firefox Extension," Internet Article, http://www.xuldev.org/firegesture/, Oct. 27, 2009, 2 pages.
Apple Inc., "iPad User Guide For iOS 4.2 Software", http://support.apple.com/kb/index?page=answerlink&url=http%3A%2F%2Fmanuals.infor.apple.com%2Fen_US%2FiPad_iOS4_User_Guide.pdf&answerid=16777220&src=support_site.manuals.search, Nov. 8, 2010, 181 pages.
Apple, "Safari Web Content Guide for iPhone," Apple Inc., Feb. 5, 2008, 96 pages.
*Apple Inc.* v. *HTC Corporation*, Brief Details of Claim, in the High Court of Justice, Chancery Division, Patents Court, Sep. 12, 2011, 2 pages.
*Apple Inc.* v. *HTC Corporation* Intervention of the Infringer according to Art. 105 EPC, Dec. 12, 2011, 24 pages.
*Apple vs. HTC*, Justice Floyd, Royal Courts of Justice, Jul. 4, 2012, 26 pages.
*Apple Inc.* v. *HTC Corporation*, Particulars of Claim, In the High Court of Justice, Chancery Division, Patents Court, Sep. 12, 2011, 4 pages.
*Apple Inc.* v. *HTC Corporation*, Particulars of Infringement, In the High Court of Justice, Chancery Division, Patents Court, Sep. 12, 2011, 5 pages.
*Apple vs HTC*, Reference to Complaint, Letter from Powell Gilbert, Apr. 5, 2012, 12 pages.
*Apple vs HTC*, Reference to Complaint, Letter from Powell Gilbert, Jul. 29, 2011, 22 pages.
*Apple Inc.* vs. *Samsung Electronics Co. Ltd. et al.*, Judgment, District Court of the Hague, Aug. 24, 2011, 65 pages.
*Apple Inc.* vs. *Samsung Electronics Co. Ltd., et al.*, Samsung's Motion To Supplement Invalidity, U.S. District Court, Jan. 27, 2012, 47 pages.
Ballard, "Microsoft Makes Research Technologies Available for Licensing," http://www.theserverside.com/news/thread.tss?thread_id=33761, May 5, 2005, 3 pages.
Bederson, "Photo Mesa 3.1.2, Screen Shots," May 24, 2006, 5 pages.
Benko et al., "Precise Selection Techniques for Multi-Touch Screens," Department of Computer Science, Columbia University, NY, Jan. 16, 2006, 10 pages.
Brown, et al., "Distributed Active Objects," Fifth International World Wide Web Conference, Paris, France, May 6-10, 1996, 18 pages.
Buxton, "Multi-Touch Systems that I Have Known and Loved," Jan. 12, 2007, http://www.billbuxton.com/multitouchOverview.html, 25 pages.
Chartier, "Apple Releases iOS 4.3 Beta for Developers," Macworld.com, www.macworld.com/article/1157114/ios_4_3.html, Jan. 12, 2011, 7 pages.
Chen, "The Web is Everywhere," IEEE Communications Magazine, Feb. 5, 2008, 1 page.
Davis, "Flash to the Core," http://www.amazon.com/Flash-Core-Joshua-David/dp/0735712881:Amazon.com, Jul. 24, 2002, 5 pages.
Dewid, "Scroll Control Box," IBM Technical Disclosure Bulletin, vol. 38, Apr. 4, 1993, 6 pages.
Dietz et al., "DiamondTouch: A Multi-User Touch Technology," Mitsubishi Electric Research Laboratories, Cambridge, Massachusetts, Oct. 2003, 11 pages.
Dodge et al., "Microsoft Office Excel 2003 Office Manual," Microsoft Press, vol. 1, Jul. 12, 2004, 5 pages.
"Dreamweaver", www.inforpower.com.cn, Feb. 29, 2008, 18 pages.
Esenther et al., "Fluid DTMouse: Better Mouse Support for Touch-Based Interactions," Mitsubishi Electric Research Laboratories, Cambridge, Massachusetts, May 2006, 5 pages.
Feng et al., "Wireless Java Programming with Java 2 Micro Edition," ASCII Corporation, Kenichi Suzuki, , Japan, May 11, 2002, 90 pages.
Flanagan, JavaScript, 5th Ed., O'Reilly Japan, Jan. 31, 2008, 35 pages.
Forlines et al., "DTLens: Multi-user Tabletop Spatial Data Exploration," Mitsubishi Electric Research Laboratories, Cambridge, Massachusetts, Oct. 2005, 5 pages.
Forlines et al., "Glimpse: A Novel Input Model for Multi-Level Devices," Mitsubishi Electric Research Laboratory, Cambridge, Massachusetts, Dec. 2005, 5 pages.
Han, "TED Ideas Worth Spreading," http://www.ted.com/talks/jeff_han_demos_his_breakthrough_touchscreen.html, Feb. 25, 2006, 1 page.
Holzner, "Built-in JavaScript Objects," JavaScript Complete, McGraw/Hill, New York, Jun. 1998, 9 pages.
Hong et al., "Satin: A Toolkit for Informal Ink-based Applications", University of California, Berkeley, CA, 2000, 10 pages.
IPhone Development Wiki, "UI GestureRecognizer", http://iphonedevwiki.net/index.php?title+UIGestureRecognizer&oldid=319, Oct. 31, 2009, 3 pages.
Ivanov, "API Hooking Revealed", Code Project, www.codeproject.com/Articles/2082/API-hooking-revealed, Dec. 2, 2002, 16 pages.
Jazzmutant, "Lemur v1.3 Examples Package: CursorModes.xml," http://www.jazzmutant.com/support_download.php>, Jan. 31, 2006, 4 pages.
Jazzmutant, The Lemur Owner's Manual, 2005 JazzMutant SAS and Cycling '74, //www.jazzmutant.com/support_download.php, Oct. 31, 2005, 108 pages.,.
Jazzmutant, Lemur v1.3 Documentation Addendum, http://www.jazzmutant.com/support_download.php, Mar. 22, 2005, 3 pages.
Jazzmutant, Lemur v1.3 Examples package: LightStepSeq.xml, http://www.jazzmutant.com/support_download.php, Jan. 31, 2006, 5 pages.
JazzMutant, Support, web.archive.org/web/20060421144624/http://www.jazzmutant.com/support_download.php, Apr. 21, 2006, 2 pages.
Karlson et al., AppLens and LaunchTile: Two Designs for One-handed Thumb Use on Small Devices, PowerPoint presentation, Computer Science Department, University of Maryland, College Park, MD, Apr. 2-7, 2005, 17 pages.
Karlson et al., "AppLens and LaunchTile: Two Designs for One-handed Thumb Use on Small Devices," paper, Computer Science Department, University of Maryland, College Park, MD, Apr. 2-7, 2005, 10 pages.
KennyTM, "UIGestureRecognizer," from iPhone Development Wiki, Oct. 31, 2009, http://iphonedevwiki.net/index.php?title=UIGestureRecognizer&oldid=319http://iphonedevwiki.net/index.php?title=UIGestureRecognizer&action=history, 3 pages.

(56) References Cited

OTHER PUBLICATIONS

Kim et al., "HCI (Human Computer Interaction) Using Multi-touch Tabletop Display," Department of Computer Engineering, Chonnam National University, Gwangju Korea, Aug. 24, 2007, 4 pages.
Landay, "Extending an Existing User Interface Toolkit to Support Gesture Recognition", School of Computer Science, Pittsburgh, PA, USA, 1993, 2 pages.
Lin et al., "Embedded GUI Based on Linux OS and Design Improvement Thereof," May 13, 2004, 6 pages.
Maemo.org, "Coding Style and Programming Guidelines," http://maemo.org/development/documentation/manuals/3-x/maemo_coding_style_and_programming guides, Nov. 28, 2007, 14 pages.
Malik, "An Exploration of Multi-Finger Interaction on Multi-Touch Surfaces", A thesis submitted in conformity with the requirements for the degree of Doctor of Philosophy Graduate Department of Computer Science—University of Toronto, Dec. 18, 2007, 184 pages.
Masui et al., "Elastic Graphical Interfaces for Precise Data Manipulation," Software Research Laboratories, SHARP Corporation, Nara, Japan, Apr. 1995, 2 pages.
Matsuda et al., "Phosphorylcholine-endcapped oligomer and block co-oligomer and surface biological reactivity," Biomaterials, Jun. 24, 2003, 11 pages.
Mertz et al., "The Influence of Design Techniques on User Interfaces: the DigiStrips Experiment for Air Traffic Control," HCI-aero 2000, Toulouse, France, Sep. 2000, 6 pages.
"Microsoft Word 2003 Screen Shots," Microsoft 2003, 2 pages.
Microsoft, "Microsoft Windows Software Development Kit Update for Windows Vista," www.microsoft.com/en-us/download/details.aspx?displaylang=en&id=23719, Mar. 22, 2007, 26 pages.
Microsoft, Window Styles-Microsoft Windows SDK-Screenshot, Mar. 22, 2007, 2 pages.
Miller, "Archive—Java Technology Products Download, PersonalJava Application Environment," http://java.sun.com/products/personaljava/touchable/, Apr. 13, 2006, 12 pages.
Millhollon, "Microsoft Office Word 2003 Inside Out," Microsoft Press, Redmond, Washington, Oct. 2, 2003, 7 pages.
"MySQL", www.pptph.com.cn, Jul. 31, 2001, 9 pages.
Nathan, "Silverlight 1.0 Unleashed," Sam's Publishing, XP055236068, ISBN: 978-0-672-33007-0, Oct. 16, 2007, 271 pages. (Part One & Part Two).
Nokia, "Hildon User Interface Style Guide Summary," Version 1.1, Apr. 12, 2006, 15 pages.
Olsen, "Building Interactive Systems: Principles for Human-Computer Interaction," Jan. 7, 2009, 6 pages.
Olsen, "Developing User Interfaces," Morgan Kaufmann Publishers, San Francisco, California, 1998, Chapter 4, 40 pages.
Petzold, "Programming Microsoft Windows with C#," Core Reference, Jan. 18, 2002, 5 pages.
Plaisant et al., "Touchscreen Toggle Design," Human-Computer Interaction Laboratory, University of Maryland, College Park, MD, May 3-7, 1992, 2 pages.
Pleading notes Mr. B.J. Berghuis van Woortman, Aug. 10-11, 2010, 16 pages.
Pleading notes Mr. Kleemans, Mr Blomme and Mr Van Oorschot, Aug. 10, 2011, 35 pages.
Pogue, "Windows Vista for Starters: The Missing Manual," Safari Books Online, Jan. 25, 2007, 18 pages.
Quinn Emanuel, *Apple Inc.* vs. *Samsung Electronics Co. Ltd., et al.*, Samsung's Patent Local Rule 3-3 and 3-4 Disclosures, U.S. District Court, Oct. 7, 2011, 287 pages.
Quinn Emanuel, Translation Letter to the EPO, dated Apr. 11, 2012, received in European Patent Application No. 08713567.9, 53 pages.
Quinn Emanuel on behalf of Motorola, Statement letter re Notice of the Opposition Division, Dec. 3, 2013, 13 pages.
Quinn Emanuel on behalf of Motorola, Statement letter re briefs, Jan. 21, 2014, 9 pages.
Quinn Emanuel, response to Appeal Proceedings for European U.S. Appl. No. 12/042,318, filed Dec. 8, 2014 (EP 2 098 948 B1), which corresponds with U.S. Appl. No. 12/042,318, filed Dec. 8, 2014, 34 pages.
Räihä, "Delegation: Dynamic Specialization," Department of Computer Science, University of Tempere, Finland, Nov. 11, 1994, 8 pages.
Ramachandran et al., "An Architecture for Ink Annotations on Web Documents," Proceedings of the 7th International Conference on Document Analysis and Recognition, Aug. 3-6, 2003, 5 pages.
Rappin et al., "wxPython in Action," Manning Publications, http://up07.net/t2az7xty4dpz/sharebookpro.com_350770414.rar, Mar. 2006, 40 pages.
Rogers, "It's for You! An iPhone Development Primer for the Busy College Professor," Computer Science and Information Systems, Northwest Missouri State University, Maryville, MO, Oct. 1, 2009, 8 pages.
Rowan, "Breakthrough Internet Device, Eureka Man," available online at https://web.archive.org/web/20070709083626/http://leurekaman.com/towards-multti-touch-in-the-browser, Jan. 31, 2007, 2 pages.
Rubine, "The Automatic Recognition of Gestures," submitted in partial fulfillment of the requirements for the degree of Doctor of Philosophy in Computer Science at Carnegie Mellon University, Dec. 1991, 285 pages.
Salmoni, "The Zooming User Interface," Advogato, Aug. 16, 2004, 14 pages.
Samsung, Statement of Defense also Counterclaim (Smartphones), Judge in Interlocutory Proceedings of the Court in The Hague, Jul. 20, 2011, 48 pages.
Samsung, Statement of Defense also Counterclaim (Tablets), Judge in Interlocutory Proceedings of the Court in The Hague, Jul. 20, 2011, 44 pages.
Sells, Windows Forms Programming in C#, Microsoft.net Development Series, Mar. 1, 2004, 9 pages.
Shen et al., "Informing the Design of Direct-Touch Tabletops,", Mitsubishi Electric Research Labs, Oct. 2006, 11 pages.
Thornlund, "Gesture Analyzing for Multi-Touch Screen Interfaces", http://epubl.ltu.se/1404-5494/2007/30/LTU-HIP-EX-0730-SE.pdf, Sep. 17, 2007, 22 pages.
Tidwell, "Magnetism, Designing Interfaces: Patterns for Effective Interaction Design," O'Reilly Media, Inc., Nov. 21, 2005, 2 pages.
Touch, "A Glance at Touch," Technology Handbook, http://www.carrolltouch.com, Jun. 7, 1998, 37 pages.
Venners, "Java's Security Architecture; Java's Security Model and Built-In Safety Features," JavaWorld, Jul. 1997, 7 pages.
W3C, "Document Object Model (DOM) Level 2 Events Specifications," Version 1.0, Nov. 13, 2000, 47 pages.
Wagner & Geyer, Remarks submitted for the Opposition Division, Aug. 10, 2012, 73 pages.
Webster's Dictionary, Definition of the word "Contemporaneous", Jan. 21, 2014, 2 pages.
Westerman, "Hand Tracking Finger Identification and Chordic Manipulation on a Multi-touch Surface," a dissertation submitted to the Faculty of the University of Delaware in partial fulfillment of the requirements for the degree of Doctor of Philosophy in Electrical Engineering, Mar. 20, 1999, 363 pages.
Wikibooks, "Java Programming/Applets/Event Listeners," en.wikibooks.org/w/index.php?title=Java_Programming/Applets/Event_Listeners&oldid=849558, May 1, 2007, 6 pages.
Withers & Rogers LLP, *Apple* vs. *Samsung*, Proprietor's Response to Communication under Rule 79(1) EPC, dated Mar. 8, 2012, 8 pages.
Withers & Rogers, Apple's Response to Notice of Intervention from Motorola, Jun. 21, 2012, 3 pages.
Withers & Rogers, Apple's Response to Addendum from Samsung, Jun. 21, 2012, 3 pages.
Withers & Rogers, Preliminary Response to Opponent O1's written submissions, Dec. 3, 2013, 11 pages.
Withers Rogers, Revised Second Auxiliary Request, Jan. 30, 2014, 8 pages.
Withers Rogers, Grounds of Appeal in support of the Notice of Appeal, Aug. 4, 2014, 24 pages.

(56) References Cited

OTHER PUBLICATIONS

Withers Rogers, Comments on Sections 3.1 and 3.4 of the Withdrawn Appeal, Oct. 14, 2014, 3 pages.
Youtube, "A Lemurized Formula," http://www.youtube.com/watch?v=sHAMyQak-LM, Dec. 15, 2007, 1 page.
Zimmerman & Partner, Samsung Electronics GMmbH, Supplement to Notice of Opposition, Apr. 5, 2011, 6 pages.
Zimmerman & Partner, *Samsung Electronics GmbH/Apple Inc.* vs EP 2 126 678 B1 (08713567.9) Opposition, Jan. 30, 2012, 27 pages.
Zimmermann & Partner, Response to Summons letter, Nov. 7, 2013, 33 pages.
Zimmermann & Partner, Response to letter dated Jan. 3, 2014, 10 pages.
TR—Notice of Allowance, dated Jan. 30, 2012, received in Canadian Patent Application No. 2,658,177, 1 page.
TR—Office Action, dated Jun. 22, 2011, received in Canadian Patent Application No. 2,658,177, 2 pages.
TR—Office Action, dated Dec. 1, 2009, received in Canadian Patent Application No. 2,658, 177, 2 pages.
TR—Office Action, dated Nov. 4, 2013, received in Canadian Patent Application No. 2,759090, 3 pages.
TR—Office Action, dated Nov. 7, 2013, received in Canadian Patent Application No. 2,759,091, 4 pages.
TR—Final Office Action, dated Nov. 13, 2009, received in U.S. Appl. No. 11/620,709, 8 pages.
TR—Office Action, dated Apr. 1, 2009, received in U.S. Appl. No. 11/620,709, 8 pages.
TR—Office Action, dated Jun. 9, 2010, received in U.S. Appl. No. 11/620,709, 8 pages.
TR—Office Action, dated Jul. 21, 2010, received in U.S. Appl. No. 11/620,710, 29 pages.
TR—Notice of Allowance, dated Jul. 20, 2010, received in U.S. Appl. No. 11/620,717, 11 pages.
TR—Office Action, dated Jul. 8, 2009, received in U.S. Appl. No. 11/620,717, 6 pages.
TR—Office Action, dated Dec. 29, 2009, received in U.S. Appl. No. 11/620,717, 8 pages.
TR—Office Action (Final), dated Jun. 23, 2009, received in U.S. Appl. No. 11/620,720, 17 pages.
TR—Office Action, dated Nov. 18, 2009, received in U.S. Appl. No. 11/620,720, 17 pages.
TR—Office Action, dated Dec. 23, 2008, received in U.S. Appl. No. 11/620,720, 18 pages.
TR—Final Office Action, dated Nov. 17, 2009, received in U.S. Appl. No. 11/620,723, 8 pages.
TR—Office Action, dated Apr. 1, 2009, received in U.S. Appl. No. 11/620,723, 8 pages.
TR—Office Action, dated Jun. 8, 2010, received in U.S. Appl. No. 11/620,723, 8 pages.
TR—Notice of Allowance, dated Oct. 29, 2008, received in U.S. Appl. No. 11/956,969, 5 pages.
TR—Office Action, dated Mar. 30, 2012, received in U.S. Appl. No. 12/207,429, 9 pages.
TR—Notice of Allowance, dated May 17, 2012, received in U.S. Appl. No. 12/270,805, 14 pages.
TR—Office Action, dated Oct. 11, 2011, received in U.S. Appl. No. 12/270,805, 27 pages.
TR—Office Action, dated Oct. 11, 2011, received in U.S. Appl. No. 12/270,807, 26 pages.
TR—Notice of Allowance, dated May 11, 2012, received in U.S. Appl. No. 12/270,810, 12 pages.
TR—Notice of Allowance, dated Jul. 11, 2012, received in U.S. Appl. No. 12/270,810, 17 pages.
TR—Notice of Allowance, dated Sep. 19, 2012, received in U.S. Appl. No. 12/270,812, 22 pages.
TR—Office Action, dated Oct. 13, 2011, received in U.S. Appl. No. 12/270,812, 12 pages.
TR—Final Office Action, dated Feb. 14, 2013, received in U.S. Appl. No. 12/270,815, 12 pages.
TR—Office Action, dated May 17, 2012, received in U.S. Appl. No. 12/270,815, 11 pages.
TR—Office Action, dated Oct. 11, 2011, received in U.S. Appl. No. 12/270,815, 12 pages.
TR—Notice of Allowance, dated Feb. 23, 2012, received in U.S. Appl. No. 12/869,182, 5 pages.
TR—Notice of Allowance, dated Dec. 12, 2012, received in U.S. Appl. No. 12/869,182, 5 pages.
TR—Office Action, dated Jun. 20, 2012, received in U.S. Appl. No. 12/869,182, 6 pages.
TR—Office Action, dated Oct. 24, 2011, received in U.S. Appl. No. 12/869,182, 7 pages.
TR—Notice of Allowance, dated Oct. 22, 2013, received in U.S. Appl. No. 13/867,950, 8 pages.
TR—Notice of Allowance, dated Nov. 15, 2013, received in U.S. Appl. No. 13/867,950, 7 pages.
TR—Office Action, dated Jun. 26, 2013, received in U.S. Appl. No. 13/867,950, 5 pages.
TR—Office Action, dated Sep. 24, 2014, received in U.S. Appl. No. 14/189,922, 7 pages.
TR—Certificate of Grant, dated Feb. 3, 2012, received in Hong Kong Patent Application No. 10103983.1, 2 pages ..
TR—Summons, dated Oct. 28, 2011, received in European Patent Application No. 08705751.9, 9 pages.
TR—Office Action, dated Nov. 26, 2012, received European Patent Application No. 08712964.9, 6 pages.
TR—Office Action, dated Oct. 7, 2011, received in European Patent Application No. 08713567.9, 1 page.
TR—Office Action, dated Dec. 29, 2009, received in European Patent Application No. 08713567.9, 5 pages.
TR—Patent, dated Jun. 21, 2012, received in European Patent Application No. 08713567.9, 2 pages.
TR—Ex Parte Reexamination Communication, dated Jul. 26, 2013, received in U.S. Appl. No. 90/012,332, 61 pages.
TR—Office Action, dated Jul. 1, 2008, received in Australian Patent Application No. 2008100283, 2 pages.
TR—Office Action, dated Feb. 19, 2009, received in Australian Patent No. 2008201540, 2 pages.
TR—Office Action, dated Jul. 15, 2009, received in Australian Patent Application No. 2008201540, 2 pages.
TR—Office Action, dated Feb. 11, 2009, received in Australian Patent Application No. 2009200366, 2 pages.
TR—Office Action, dated Nov. 24, 2011, received in Australian Patent Application No. 2009208099, 3 pages.
TR—Office Action, dated Apr. 8, 2010, received in Australian Patent Application No. 2009208103, 2 pages.
TR—Office Action, dated Apr. 14, 2011, received in Australian Patent Application No. 2009208103, 3 pages.
TR—Office Action, dated Feb. 12, 2010, received in Japanese Patent Application No. 2009-544996, 3 pages.
TR—Office Action, dated Jun. 1, 2011, received in Japanese Patent Application No. 2009-544996, 1 page.
TR—Office Action, dated Nov. 8, 2010, received in Japanese Patent Application No. 2009-544996, 6 pages.
TR—Patent, dated May 20, 2011, received in Japanese Patent Application No. 2009-544996, 1 page.
TR—Office Action, dated Oct. 26, 2012, received in Japanese Patent Application No. 2010-157302, 4 pages.
TR—Office Action, dated Apr. 15, 2013, received in Japanese Patent Application No. 2010-157303, 4 pages.
TR—Office Action, dated Oct. 15, 2012, received in Japanese Patent Application No. 2010-157303, 4 pages.
TR—Notice of Allowance, dated Nov. 9, 2011, received in Australian Patent Application No. 2011201639, 2 pages.
TR—Innovation Patent, dated Mar. 2, 2012, received in Australian Patent Application No. 2012100050, 1 page ..
TR—Office Action, Sep. 9, 2013, received in Australian Patent Application No. 2012200689, 3 pages.
TR—Office Action, dated Aug. 27, 2009, received in Korean Patent Application No. 2009-7003574,1 page.
TR—Office Action, dated Jun. 25, 2013, received in Korean Patent Application No. 2013-7000337, 3 pages.

(56) References Cited

OTHER PUBLICATIONS

TR—Office Action, dated Oct. 29, 2010, received in German Patent Application No. 112008000144.8, 4 pages.
TR—Office Action, Jan. 5, 2012, received in Chinese Patent Application No. 200800000019.9, which corresponds with U.S. Appl. No. 11/956,969, 2 pages.
TR—Office Action, dated Feb. 18, 2013, received in Chinese Patent Application No. 200800000019.9, 2 pages.
TR—Office Action, dated Jul. 23, 2013, received in Chinese Patent Application No. 200800000019.9, 2 pages.
TR—Office Action, dated Sep. 20, 2012, received in Chinese Patent Application No. 200800000019.9, 1 page.
TR—Office Action, dated Nov. 23, 2010, received in Chinese Patent Application No. 200800000019.9, 2 pages.
TR—Office Action, dated Jan. 29, 2012, received in Chinese Patent Application No. 200880001827.7, 5 pages.
TR—Office Action, dated Jul. 2, 2013, received in Chinese Patent Application No. 200880001827.7, 1 page.
TR—Office Action, dated Nov. 11, 2010, received in Chinese Patent Application No. 200880001827.7, 2 pages.
TR—EESR, dated Nov. 29, 2011, received in European Patent Application No. 11182954.5, 6 pages.
TR—EESR, dated Nov. 30, 2011, received in European Patent Application No. 11182959.4, 5 pages.
TR—EESR, dated Jan. 12, 2011, received in European Patent Application No. 11182962.8, 8 pages.
TR—EESR, dated Jan. 12, 2011, received in European Patent Application No. 11182963.6, 7 pages.
TR—International Search Report, dated May 31, 2005, received in International Patent Application No. PCT/US2005/000089, 7 pages.
TR—International Preliminary Report on Patentability, dated Jun. 18, 2008, received in International Patent Application No. PCT/US2005/000089, 5 pages.
TR—International Search Report, dated Jul. 31, 2008, received in International Patent Application No. PCT/US2008/000058, 7 pages.
TR—International Preliminary Report on Patentability, dated Jul. 7, 2009, received in International Patent Application No. PCT/US2008/000058, 5 pages ..
TR—International Search Report, dated Mar. 6, 2008, received in International Patent Application No. PCT/US2008/000103, 11 pages.
TR—International Preliminary Report on Patentability, dated Jul. 7, 2009, received in International Patent Application No. PCT/US2008/000103, 9 pages.
TR—Invitation to Pay Additional Fees, PCT Application PCT/US2008/050292, Jul. 18, 2008, 4 pages.
Office Action, dated Dec. 9, 2011, received in U.S. Appl. No. 12/566,660, 6 pages.
Notice of Allowance, dated May 24, 2012, received in U.S. Appl. No. 12/566,660, 9 pages.
Notice of Allowance, dated Jul. 26, 2012, received in U.S. Appl. No. 12/566,660, 5 pages.
Office Action, dated Oct. 17, 2012, received in Australian U.S. Appl. No. 12/566,660, which corresponds with U.S. Appl. No. 12/566,660, 3 pages.
Notice of Allowance, dated Nov. 2, 2012, received in Canadian Patent Application No. 2,755,443, which corresponds with U.S. Appl. No. 12/566,660, 1 page.
Notice of Allowance, dated Apr. 10, 2014, received in Canadian Patent Application No. 2,817,648, which corresponds with U.S. Appl. No. 12/566,660, 1 page.
Office Action, dated Oct. 9, 2013, received in Canadian Patent Application No. 2,817,890, which corresponds with U.S. Appl. No. 12/566,660, 3 pages.
Office Action, dated Apr. 22, 2014, received in Canadian Patent Application No. 2,817,890, which corresponds with U.S. Appl. No. 12/566,660, 3 pages.
Letters Patent, dated Dec. 29, 2015, received in Canadian Patent Application No. 2,817,890, which corresponds with U.S. Appl. No. 12/566,660, 2 pages.
Office Action, dated Nov. 28, 2016, received in Canadian Patent Application No. 2,909,730, which corresponds with U.S. Appl. No. 12/566,660, 4 pages.
Notice of Allowance, dated Oct. 24, 2017, received in Canadian Patent Application No. 2,909,730, which corresponds with U.S. Appl. No. 12/566,660, 1 page.
Patent, dated Jun. 5, 2018, received in Canadian Patent Application No. 2,909,730, which corresponds with U.S. Appl. No. 12/566,660, 4 pages.
Office Action, dated Oct. 31, 2013, received in Chinese Patent Application No. 201080020598.0, which corresponds with U.S. Appl. No. 12/566,660, 4 pages.
Decision to Grant, dated Apr. 24, 2014, received in Chinese Patent Application No. 201080020598.0, which corresponds with U.S. Appl. No. 12/566,660, 1 page.
Office Action, dated Sep. 26, 2016, received in Chinese Patent Application No. 2016092101783870, which corresponds with U.S. Appl. No. 12/566,660, 2 pages.
Notice of Allowance, dated Mar. 21, 2017, received in Chinese Patent Application No. 201410299526.4, which corresponds with U.S. Appl. No. 12/566,660, 3 pages.
Patent, dated Apr. 19, 2017, received in Chinese Patent Application No. 201410299526.4, which corresponds with U.S. Appl. No. 12/566,660, 2 pages.
Office Action, dated Apr. 5, 2017, received in Chinese Patent Application No. 201410299325.4, which corresponds with U.S. Appl. No. 12/566,660, 8 pages.
Patent, dated Aug. 25, 2017, received in Chinese Patent Application 201410299325.4, which corresponds with U.S. Appl. No. 12/566,660, 4 pages.
Notice of Allowance, dated Mar. 10, 2017, received in Chinese Patent Application No. 201410299324.X, which corresponds with U.S. Appl. No. 12/566,660, 3 pages.
Patent, dated Apr. 12, 2017, received in Chinese Patent Application No. 201410299324.X, which corresponds with U.S. Appl. No. 12/566,660, 2 pages.
Office Action, dated Nov. 7, 2019, received in German Patent Application No. 112010001143.5, which corresponds with U.S. Appl. No. 12/566,660, 14 pages.
Office Action, dated Jun. 19, 2013, received in European Patent Application No. 10712825.8, which corresponds with U.S. Appl. No. 12/566,660, 5 pages.
Office Action, dated Jul. 1, 2015, received in European Patent Application No. 10712825.8, which corresponds with U.S. Appl. No. 12/566,660, 6 pages.
Office Action, dated Aug. 23, 2018, received in European Patent Application No. 10712825.8, which corresponds with U.S. Appl. No. 12/566,660, 5 pages.
Oral Summons, dated May 9, 2019, received in European Patent Application No. 10712825.8, which corresponds with U.S. Appl. No. 12/566,660, 9 pages.
Office Action, dated Mar. 20, 2014, received in European Patent Application No. 11184186.2, which corresponds with U.S. Appl. No. 12/566,660, 5 pages.
Office Action, dated Jan. 8, 2018, received in European Patent Application No. 11184186.2, which corresponds with U.S. Appl. No. 12/566,660, 4 pages.
Decision to Grant, dated Sep. 19, 2019, received in European Patent Application No. 11184186.2, which corresponds with U.S. Appl. No. 12/566,660, 1 page.
Patent, dated Oct. 16, 2019, received in European Patent Application No. 11184186.2, which corresponds with U.S. Appl. No. 12/566,660, 6 pages.
Decision to Grant, dated Sep. 19, 2019, received in Hong Kong Patent Application No. 12107271.1, which corresponds with U.S. Appl. No. 12/566,660, 1 pages.
Office Action, dated Jun. 12, 2018, received in Indian Patent Application No. 6174/CHENP/2011, which corresponds with U.S. Appl. No. 12/566,660, 8 pages.
Oral Summons, dated Apr. 11, 2019, received in Indian Patent Application No. 6174/CHENP/2011, which corresponds with U.S. Appl. No. 12/566,660, 5 pages.

(56) References Cited

OTHER PUBLICATIONS

Patent, dated Dec. 12, 2019, received in Indian Patent Application No. 6174/CHENP/2011, which corresponds with U.S. Appl. No. 12/566,660, 4 pages.
Office Action, dated Jun. 3, 2013, received in Japanese Patent Application No. 2012-500844, which corresponds with U.S. Appl. No. 12/566,660, 5 pages.
Office Action, dated Feb. 24, 2014, received in Japanese Patent Application No. 2012-500844, which corresponds with U.S. Appl. No. 12/566,660, 2 pages.
Notice of Allowance, dated Aug. 1, 2014, received in Japanese Patent Application No. 2012-500844, which corresponds with U.S. Appl. No. 12/566,660, 2 pages.
Office Action, dated Sep. 7, 2015, received in Japanese Patent Application No. 2014-129689, which corresponds with U.S. Appl. No. 12/566,660, 3 pages.
Certificate of Patent, dated Jan. 7, 2016, received in Japanese Patent Application No. 2014-129689, which corresponds with U.S. Appl. No. 12/566,660, 3 pages.
Certificate of Patent, dated Feb. 5, 2016, received in Japanese Patent Application No. 2014-129689, which corresponds with U.S. Appl. No. 12/566,660, 1 page.
Office Action, dated Nov. 18, 2016, received in Japanese Patent Application No. 2016-017396, which corresponds with U.S. Appl. No. 12/566,660, 5 pages.
Notice of Allowance, dated Jun. 20, 2017, received in Japanese Patent Application No. 2016-017396, which corresponds with U.S. Appl. No. 12/566,660, 5 pages.
Patent, dated Jul. 28, 2017, received in Japanese Patent Application No. 2016017396, which corresponds with U.S. Appl. No. 12/566,660, 2 pages.
Office Action, dated Jul. 13, 2018, received in Japanese Patent Application No. 2017-139218, which corresponds with U.S. Appl. No. 12/566,660, 5 pages.
Notice of Allowance, dated Sep. 3, 2018, received in Japanese Patent Application No. 2017-139218, which corresponds with U.S. Appl. No. 12/566,660, 5 pages.
Patent, dated Sep. 28, 2018, received in Japanese Patent Application No. 2017-139218, which corresponds with U.S. Appl. No. 12/566,660, 2 pages.
Office Action, dated Oct. 7, 2019, received in Japanese Patent Application No. 2018-175226, which corresponds with U.S. Appl. No. 12/566,660, 5 pages.
Notice of Allowance, dated Apr. 3, 2020, received in Japanese Patent Application No. 2018-175226, which corresponds with U.S. Appl. No. 12/566,660, 5 pages.
Notice of Allowance, dated May 29, 2013, received in Korean Patent Application No. 2011-7024288, which corresponds with U.S. Appl. No. 12/566,660, 2 pages.
Office Action, dated Oct. 4, 2013, received in U.S. Appl. No. 12/789,684, 19 pages.
Final Office Action, dated Mar. 7, 2014, received in U.S. Appl. No. 12/789,684, 23 pages.
Office Action, dated Jul. 18, 2014, received in U.S. Appl. No. 12/789,684, 29 pages.
Office Action, dated Jan. 28, 2015, received in U.S. Appl. No. 12/789,684, 29 pages.
Notice of Allowance, dated Aug. 14, 2015, received in U.S. Appl. No. 12/789,684, 15 pages.
Office Action, dated Mar. 4, 2013, received in U.S. Appl. No. 12/789,695, 13 pages.
Office Action, dated Oct. 24, 2013, received in U.S. Appl. No. 12/789,695, 14 pages.
Final Office Action, dated May 7, 2014, received in U.S. Appl. No. 12/789,695, 17 pages.
Office Action, dated Jul. 1, 2015, received in U.S. Appl. No. 12/789,695, 15 pages.
Final Office Action, dated Feb. 22, 2016, received in U.S. Appl. No. 12/789,695, 17 pages.
Notice of Acceptance, dated May 1, 2014, received in Australian Patent Application No. 2011209720, which corresponds with U.S. Appl. No. 12/789,695, 3 pages.
Office Action, dated Jun. 28, 2013, received in Australian Patent Application No. 2011209720, which corresponds with U.S. Appl. No. 12/789,695, 4 pages.
Office Action, dated Aug. 27, 2015, received in Australian Patent Application No. 2014213525, which corresponds with U.S. Appl. No. 12/789,695, 6 pages.
Notice of Allowance, dated Apr. 14, 2016, received in Australian Patent Application No. 2014213525, which corresponds with U.S. Appl. No. 12/789,695, 1 page.
Certificate of Grant, dated Aug. 11, 2016, received in Australian Patent Application No. 2014213525, which corresponds with U.S. Appl. No. 12/789,695, 1 page.
Office Action, dated Jun. 13, 2017, received in Australian Patent Application No. 2016204905, which corresponds with U.S. Appl. No. 12/789,695, 4 pages.
Office Action, dated May 25, 2018, received in Australian Patent Application No. 2016204905, which corresponds with U.S. Appl. No. 12/789,695, 4 pages.
Office Action, dated Jul. 5, 2018, received in Australian Patent Application No. 2016204905, which corresponds with U.S. Appl. No. 12/789,695, 3 pages.
Office Action, dated Oct. 22, 2012, received in Chinese Patent Application No. 201110063183.8, which corresponds with U.S. Appl. No. 12/789,695, 2 pages.
Office Action, dated Aug. 26, 2013, received in Chinese Patent Application No. 201110063183.8, which corresponds with U.S. Appl. No. 12/789,695, 2 pages.
Decision to Grant, dated Feb. 24, 2014, received in Chinese Application No. 201110063183.8, which corresponds with U.S. Appl. No. 12/789,695, 1 page.
Office Action, dated Dec. 3, 2015, received in Chinese Patent Application No. 201310557439.X, which corresponds with U.S. Appl. No. 12/789,695, 2 pages.
Notice of Allowance, dated Jul. 27, 2016, received in Chinese Patent Application No. 201310557439.X, which corresponds with U.S. Appl. No. 12/789,695, 3 pages.
Patent Certificate, dated Aug. 31, 2016, received in Chinese Patent Application No. 201310557439.X, which corresponds with U.S. Appl. No. 12/789,695, 2 pages.
Office Action, dated Feb. 2, 2016, received in Chinese Patent Application No. 201310557440.2, which corresponds with U.S. Appl. No. 12/789,695, 5 pages.
Office Action, dated Nov. 9, 2016, received in Chinese Patent Application No. 201310557440.2, which corresponds with U.S. Appl. No. 12/789,695, 3 pages.
Office Action, dated May 24, 2016, received in Chinese Patent Application No. 201310557440.2, which corresponds with U.S. Appl. No. 12/789,695, 4 pages.
Notice of Allowance, dated Oct. 24, 2017, received in Chinese Patent Application No. 201310557440.2, which corresponds with U.S. Appl. No. 12/789,695, 3 pages.
Patent Certificate, dated Dec. 5, 2017, received in Chinese Patent Application No. 201310557440.2, which corresponds with U.S. Appl. No. 12/789,695, 4 pages.
Office Action, dated Aug. 24, 2016, received in Chinese Patent Application No. 201410198170.5, which corresponds with U.S. Appl. No. 12/789,695, 2 pages.
Office Action, dated Jul. 10, 2017, received in Chinese Patent Application No. 201410198170.5, which corresponds with U.S. Appl. No. 12/789,695, 3 pages.
Office Action, dated Jan. 26, 2018, received in Chinese Patent Application No. 201410198170.5, which corresponds with U.S. Appl. No. 12/789,695, 4 pages.
Notice of Allowance, dated Aug. 16, 2018, received in Chinese Patent Application No. 201410198170.5, which corresponds with U.S. Appl. No. 12/789,695, 5 pages.
Office Action, dated Jul. 26, 2013, received in European Patent Application No. 11152015.1, which corresponds with U.S. Appl. No. 12/789,695, 6 pages.

(56) References Cited

OTHER PUBLICATIONS

Office Action, dated Mar. 29, 2017, received in European Patent Application No. 11152015.1, which corresponds with U.S. Appl. No. 12/789,695, 11 pages.
Office Action, dated Aug. 23, 2018, received in European Patent Application No. 11152015.1, which corresponds with U.S. Appl. No. 12/789,695, 7 pages.
Summons, dated Mar. 15, 2019, received in European Patent Application No. 11152015.1, which corresponds with U.S. Appl. No. 12/789,695, 4 pages.
Office Action, dated Jul. 17, 2015, received in Japanese Patent Application No. 2014-044208, which corresponds with U.S. Appl. No. 12/789,695, 5 pages.
Notice of Allowance, dated Apr. 15, 2016, received in Japanese Patent Application No. 2014-044208, which corresponds with U.S. Appl. No. 12/789,695, 3 pages.
Patent Certificate, dated May 20, 2016, received in Japanese Patent Application No. 2014-044208, which corresponds with U.S. Appl. No. 12/789,695, 2 page.
Notice of Allowance, date Jul. 28, 2017, received in Japanese Patent Application No. 2016-098113, which corresponds with U.S. Appl. No. 12/789,695, 5 pages.
Patent, dated Sep. 1, 2017, received in Japanese Patent Application No. 2016-098113, which corresponds with U.S. Appl. No. 12/789,695, 3 pages.
Office Action, dated Apr. 30, 2014, received in Korean Patent Application No. 2012-7022239, which corresponds with U.S. Appl. No. 12/789,695, 2 pages.
Notice of Allowance, dated Mar. 30, 2015, received in Korean Patent Application No. 2012-7022239, which corresponds with U.S. Appl. No. 12/789,695, 2 pages. (KR version only).
Notice of Allowance, dated May 23, 2016, received in Korean Patent Application No. 10-2014-7030745, which corresponds with U.S. Appl. No. 12/789,695, 3 pages.
Letters Patent, dated Jul. 29, 2016, received in Korean Patent Application No. 10- 2014-7030745, which corresponds with U.S. Appl. No. 12/789,695, 2 pages.
Notice of Allowance, dated Nov. 9, 2016, received in Korean Patent Application No. 10-2016-7020780, which corresponds with U.S. Appl. No. 12/789,695, 4 pages.
Patent, dated Jan. 5, 2017, received in Korean Patent Application No. 10-2016-7020780, which corresponds with U.S. Appl. No. 12/789,695, 3 pages.
Notice of Allowance, dated May 15, 2013, received in U.S. Appl. No. 12/892,848, 10 pages.
Office Action, dated Aug. 14, 2013, received in Australian Patent Application No. 2011268047, which corresponds with U.S. Appl. No. 12/892,848, 2 pages.
Notice of Allowance, dated Mar. 18, 2016, received in Australian Patent Application No. 2014200702, which corresponds with U.S. Appl. No. 12/892,848, 2 pages.
Certificate of Grant, dated Sep. 22, 2016, received in Australian Patent Application No. 2014200702, which corresponds with U.S. Appl. No. 12/892,848, 1 page.
Office Action, dated May 12, 2017, received in Australian Patent Application No. 2016204284, which corresponds with U.S. Appl. No. 12/892,848, 2 pages.
Notice of Acceptance, dated Nov. 15, 2017, received in Australian Patent Application No. 2016204284, which corresponds with U.S. Appl. No. 12/892,848, 3 pages.
Certificate of Grant, dated Mar. 22, 2018, received in Australian Patent Application No. 2016204284, which corresponds with U.S. Appl. No. 12/892,848, 1 page.
Office Action, dated Dec. 3, 2014, received in Chinese Patent Application No. 201180022994.1, which corresponds with U.S. Appl. No. 12/892,848, 2 pages.
Office Action, dated Nov. 24, 2015, received in Chinese Patent Application No. 201180022994.1, which corresponds with U.S. Appl. No. 12/892,848, 2 pages.
Notice of Allowance, dated Apr. 6, 2016, received in Chinese Patent Application No. 201180022994.1, which corresponds with U.S. Appl. No. 12/892,848, 2 pages.
Patent Certificate, dated May 18, 2016, received in Chinese Patent Application No. 201180022994.1, which corresponds with U.S. Appl. No. 12/892,848, 1 page.
Office Action, dated Aug. 27, 2018, received in Chinese Patent Application No. 201610455059.9, which corresponds with U.S. Appl. No. 12/892,848, 5 pages.
Office Action, dated May 17, 2019, received in Chinese Patent Application No. 201610455059.9, which corresponds with U.S. Appl. No. 12/892,848, 4 pages.
Office Action, dated Oct. 21, 2019, received in Chinese Patent Application No. 201610455059.9, which corresponds with U.S. Appl. No. 12/892,848, 4 pages.
Notice of Allowance, dated Apr. 8, 2020, received in Chinese Patent Application No. 201610455059.9, which corresponds with U.S. Appl. No. 12/892,848, 3 pages.
Office Action, dated Aug. 22, 2013, received in European Patent Application No. 11727371.4, which corresponds with U.S. Appl. No. 12/892,848, 6 pages.
Office Action, dated Aug. 26, 2015, received in European Patent Application No. 11727371.4, which corresponds with U.S. Appl. No. 12/892,848, 9 pages.
Oral Summons, dated Apr. 23, 2018, received in European Patent Application No. 11727371.4, which corresponds with U.S. Appl. No. 12/892,848, 11 pages.
Intention to Grant, dated Nov. 2, 2018, received in European Patent Application No. 11727371.4, which corresponds with U.S. Appl. No. 12/892,848, 5 pages.
Patent, dated Apr. 17, 2019, received in European Patent Application No. 11727371.4, which corresponds with U.S. Appl. No. 12/892,848, 3 pages.
Decision to Grant, dated Mar. 21, 2019, received in European Patent Application No. 11727371.4, which corresponds with U.S. Appl. No. 12/892,848, 4 pages.
Patent, dated Dec. 13, 2019, received in Hong Kong Patent Application No. 13107104.3, which corresponds with U.S. Appl. No. 12/892,848, 6 pages.
Notice of Allowance, dated Aug. 22, 2014, received in Japanese Patent Application No. 2013-515382, which corresponds with U.S. Appl. No. 12/892,848, 3 pages.
Office Action, dated Nov. 13, 2015, received in Japanese Patent Application No. 2014-191701, which corresponds with U.S. Appl. No. 12/892,848, 3 pages.
Notice of Allowance, dated Jun. 27, 2016, received in Japanese Patent Application No. 2014-191701, which corresponds with U.S. Appl. No. 12/892,848, 3 pages.
Certificate of Patent, dated Jul. 29, 2016, received in Japanese Patent Application No. 2014-191701, which corresponds with U.S. Appl. No. 12/892,848, 2 pages.
Notice of Allowance, dated Jun. 5, 2017, received in Japanese Patent Application No. 2016-144701, which corresponds with U.S. Appl. No. 12/892,848, 5 pages.
Patent, dated Jun. 23, 2017, received in Japanese Patent Application No. 2016-144701, which corresponds with U.S. Appl. No. 12/892,848, 2 pages.
Office Action, dated Oct. 9, 2012, received in U.S. Appl. No. 12/892,851, 11 pages.
Final Office Action, dated Jul. 19, 2013, received in U.S. Appl. No. 12/892,851, 12 pages.
Office Action, dated May 22, 2014, received in U.S. Appl. No. 12/892,851, 11 pages.
Office Action, dated Nov. 4, 2016, received in U.S. Appl. No. 12/892,851, 13 pages.
Final Office Action, dated Jun. 30, 2017, received in U.S. Appl. No. 12/892,851, 17 pages.
Notice of Allowance, dated Jun. 27, 2018, received in U.S. Appl. No. 12/892,851, 7 pages.
Notice of Allowance, dated Nov. 8, 2018, received in U.S. Appl. No. 12/892,851, 7 pages.
Notice of Allowance, dated Jun. 27, 2013, received in U.S. Appl. No. 13/077,925, 10 pages.

(56) References Cited

OTHER PUBLICATIONS

Office Action, dated Dec. 10, 2014, received in Australian Patent Application No. 2011349513, which corresponds with U.S. Appl. No. 13/077,925, 3 pages.
Certificate of Grant, dated Jul. 16, 2015, received in Australian Patent Application No. 2011349513, which corresponds with U.S. Appl. No. 13/077,925, 2 pages.
Office Action, dated Mar. 15, 2016, received in Australian Patent Application No. 2015203638, which corresponds with U.S. Appl. No. 13/077,925, 3 pages.
Office Action, dated Oct. 24, 2017, received in Australian Patent Application No. 2017200807, which corresponds with U.S. Appl. No. 13/077,925, 3 pages.
Notice of Acceptance, dated Apr. 20, 2018, received in Australian Patent Application No. 2017200807, which corresponds with U.S. Appl. No. 13/077,925, 3 pages.
Certificate of Grant, dated Aug. 23, 2018, received in Australian Patent Application No. 2017200807, which corresponds with U.S. Appl. No. 13/077,925, 1 page.
Office Action, dated Jun. 29, 2019, received in Australian Patent Application No. 2018211275, which corresponds with U.S. Appl. No. 13/077,925, 2 pages.
Office Action, dated Apr. 30, 2014, received in Chinese Patent Application No. 201110463262.8, which corresponds with U.S. Appl. No. 13/077,925, 2 pages.
Office Action, dated Sep. 23, 2015, received in Chinese Patent Application No. 201110463262.8, which corresponds with U.S. Appl. No. 13/077,925, 2 pages.
Notice of Allowance, dated Apr. 1, 2016, received in Chinese Patent Application No. 20110463262.8, which corresponds with U.S. Appl. No. 13/077,925, 2 pages.
Letters Patent, dated May 4, 2016, received in Chinese Patent Application No. 20110463262.8, which corresponds with U.S. Appl. No. 13/077,925, 3 pages.
Office Action, dated Oct. 19, 2012, received in Chinese Patent Application No. 201120580018.5, which corresponds with U.S. Appl. No. 13/077,925, 2 pages.
Office Action, dated Apr. 22, 2013, received in Chinese Patent Application No. 201120580018.5, which corresponds with U.S. Appl. No. 13/077,925, 2 pages.
Notification of Grant, dated Jul. 26, 2013, received in Chinese Patent Application No. 201120580018.5, which corresponds with U.S. Appl. No. 13/077,925, 1 page.
Office Action, dated Jan. 11, 2019, received in Chinese Patent Application No. 201610383388.7, which corresponds with U.S. Appl. No. 13/077,925, 5 pages.
Notice of Allowance, dated Aug. 9, 2019, received in Chinese Patent Application No. 201610383388.7, which corresponds with U.S. Appl. No. 13/077,925, 3 pages.
Patent, dated Sep. 13, 2019, received in Chinese Patent Application No. 201610383388.7, which corresponds with U.S. Appl. No. 13/077,925, 6 pages.
Office Action, dated Jul. 1, 2014, received in European Patent Application No. 11808779.0, which corresponds with U.S. Appl. No. 13/077,925, 5 pages.
Decision to Grant, dated Jul. 20, 2017, received in European Patent Application No. 11808779.0, which corresponds with U.S. Appl. No. 13/077,925, 2 pages.
Patent, Aug. 16, 2017, received in European Patent Application No. 11808779.0, which corresponds with U.S. Appl. No. 13/077,925, 2 pages.
Office Action, dated Sep. 14, 2018, received in European Patent Application No. 17177247.8, which corresponds with U.S. Appl. No. 13/077,925, 6 pages.
Office Action, dated Jul. 11, 2019, received in European Patent Application No. 17177247.8, which corresponds with U.S. Appl. No. 13/077,925, 7 pages.
Grant, dated Aug. 4, 2017, received in Hong Kong Patent Application No. 13104376.1, which corresponds with U.S. Appl. No. 13/077,925, 1 page.

Grant, dated May 4, 2018, received in Hong Kong Patent Application No. 14104128.1, which corresponds with U.S. Appl. No. 13/077,925, 2 pages.
Notice of Allowance, dated Jun. 27, 2016, received in Japanese Patent Application No. 2015-077922, which corresponds with U.S. Appl. No. 13/077,925, 5 pages.
Certificate of Patent, dated Aug. 5, 2016, received in Japanese Patent Application No. 2015-077922, which corresponds with U.S. Appl. No. 13/077,925, 2 pages.
Office Action, dated Jun. 2, 2017, received in Japanese Patent Application No. 2016-146769 which corresponds with U.S. Appl. No. 13/077,925, 7 pages.
Office Action, dated Feb. 23, 2018, received in Japanese Patent Application No. 2016-146769, which corresponds with U.S. Appl. No. 13/077,925, 6 pages.
Final Office Action, dated Jan. 28, 2019, received in Japanese Patent Application No. 2016-146769, which corresponds with U.S. Appl. No. 13/077,925, 8 pages.
Office Action, dated Jun. 26, 2014, received in Korean Patent Application No. 2013-7019463, which corresponds with U.S. Appl. No. 13/077,925, 2 pages.
Office Action, dated Oct. 20, 2015, received in Korean Patent Application No. 2014-7036632, which corresponds with U.S. Appl. No. 13/077,925, 2 pages.
Notice of Allowance, dated Apr. 29, 2016, received in Korean Patent Application No. 2014-7036632, which corresponds with U.S. Appl. No. 13/077,925, 3 pages.
Letters Patent, dated Jul. 29, 2016, received in Korean Patent Application No. 2014-7036632, which corresponds with U.S. Appl. No. 13/077,925, 3 pages.
Office Action, dated Aug. 23, 2016, received in Korean Patent Application No. 2016-7020964, which corresponds with U.S. Appl. No. 13/077,925, 2 pages.
Notice of Allowance, dated Mar. 31, 2017, received in Korean Patent Application No. 2016-7020964, which corresponds with U.S. Appl. No. 13/077,925, 4 pages.
Patent, dated Jun. 30, 2017, received in Korean Patent Application No. 2016-7020964, which corresponds with U.S. Appl. No. 13/077,925, 3 pages.
Office Action, dated Jul. 20, 2017, received in Korean Patent Application No. 2017-7018175, which corresponds with U.S. Appl. No. 13/077,925, 5 pages.
Notice of Allowance, dated Jan. 31, 2018, received in Korean Patent Application No. 2017-7018175, which corresponds with U.S. Appl. No. 13/077,925, 4 pages.
Patent, dated Apr. 26, 2018, received in Korean Patent Application No. 2017-7018175, which corresponds with U.S. Appl. No. 13/077,925, 2 pages.
Office Action, dated Apr. 8, 2014, received in Taiwanese Patent Application No. 100147539, which corresponds with U.S. Appl. No. 13/077,925, 4 pages.
Notice of Allowance, dated Oct. 5, 2015, received in Taiwanese Patent Application No. 103144867, which corresponds with U.S. Appl. No. 13/077,925, 3 pages.
Certificate of Grant, dated Feb. 1, 2016, received in Taiwanese Patent Application No. 103144867, which corresponds with U.S. Appl. No. 13/077,925, 2 pages.
Office Action, dated Feb. 16, 2011, received in U.S. Appl. No. 12/042,318, 25 pages.
Final Office Action, dated Sep. 15, 2011, received in U.S. Appl. No. 12/042,318, 39 pages.
Notice of Allowance, dated Dec. 16, 2013, received in U.S. Appl. No. 12/042,318, 30 pages.
Office Action, dated Feb. 25, 2011, received in Australian Patent Application No. 2009200493, which corresponds with U.S. Appl. No. 12/042,318, 3 pages.
Office Action, dated Aug. 9, 2011, received in Australian Patent Application No. 2009200493, which corresponds with U.S. Appl. No. 12/042,318, 2 pages.
Office Action, dated Feb. 22, 2012, received in Australian Patent Application No. 2011205170, which corresponds with U.S. Appl. No. 12/042,318, 3 pages.

(56) References Cited

OTHER PUBLICATIONS

Notice of Acceptance, dated Jul. 3, 2013, received in Australian Patent Application No. 2011205170, which corresponds with U.S. Appl. No. 12/042,318, 2 pages.
Office Action, dated Dec. 13, 2011, received in Australian Patent Application No. 2011101154, which corresponds with U.S. Appl. No. 12/042,318, 4 pages.
Letters Patent, dated May 7, 2012, received in Australian Patent Application No. 2011101154, which corresponds with U.S. Appl. No. 12/042,318, 1 page.
Office Action, dated Dec. 13, 2011, received in Australian Patent Application No. 2011101157, which corresponds with U.S. Appl. No. 12/042,318, 4 pages.
Letters Patent, dated May 8, 2012, received in Australian Patent Application No. 2011101157, which corresponds with U.S. Appl. No. 12/042,318, 1 page.
Notice of Allowance, dated Oct. 6, 2017, received in Australian Patent Application No. 2016206268, which corresponds with U.S. Appl. No. 12/042,318, 3 pages.
Office Action, dated Dec. 13, 2011, received in Australian Patent Application No. 2011101156, which corresponds with U.S. Appl. No. 12/042,318, 3 pages.
Letters Patent, dated May 8, 2012, received in Australian Patent Application No. 2011101156, which corresponds with U.S. Appl. No. 12/042,318, 1 page.
Office Action, dated Dec. 13, 2011, received in Australian Patent Application No. 2011101155, which corresponds with U.S. Appl. No. 12/042,318, 3 pages.
Letters Patent, May 8, 2012, received in Australian Patent Application No. 2011101155, which corresponds with U.S. Appl. No. 12/042,318, 1 page.
Office Action, dated Sep. 3, 2012, received in Australian Patent Application No. 2011265335, which corresponds with U.S. Appl. No. 12/042,318, 2 pages.
Notice of Acceptance, dated Nov. 8, 2012, received in Australian Patent Application No. 2011265335, which corresponds with U.S. Appl. No. 12/042,318, 3 pages.
Notice of Acceptance, dated Jul. 14, 2016, received in Australian Patent Application No. 2013242854, which corresponds with U.S. Appl. No. 12/042,318, 2 pages.
Certificate of Grant, dated Nov. 24, 2016, received in Australian Patent Application No. 2013242854, which corresponds with U.S. Appl. No. 12/042,318, 1 page.
Office Action, dated Feb. 17, 2017, received in Australian Patent Application No. 2016206268, which corresponds with U.S. Appl. No. 12/042,318, 2 pages.
Certificate of Grant, dated Feb. 1, 2018, received in Australian Patent Application No. 2013242854, which corresponds with U.S. Appl. No. 12/042,318, 1 page.
Office Action, dated Dec. 14, 2018, received in Australian Patent Application No. 2017279639, which corresponds with U.S. Appl. No. 12/042,318, 2 page.
Intention to Grant, dated Feb. 12, 2019, received in Australian Patent Application No. 2017279639, which corresponds with U.S. Appl. No. 12/042,318, 3 pages.
Certificate of Grant, dated Jun. 6, 2019, received in Australian Patent Application No. 2017279639, which corresponds with U.S. Appl. No. 12/042,318, 1 page.
Office Action, dated Jan. 18, 2012, received in Canadian Patent Application No. 2,653,363, which corresponds with U.S. Appl. No. 12/042,318, 2 pages.
Office Action, dated Sep. 3, 2013, received in Canadian Patent Application No. 2,653,363, which corresponds with U.S. Appl. No. 12/042,318, 3 pages.
Notice of Allowance, dated Apr. 29, 2014, received in Canadian Patent Application No. 2653363, which corresponds with U.S. Appl. No. 12/042,318, 1 page.
Office Action, dated Jan. 7, 2016, received in Canadian Patent Application No. 2653363, which corresponds with U.S. Appl. No. 12/042,318, 4 pages.
Office Action, dated Dec. 28, 2016, received in Canadian Patent Application No. 2653363, which corresponds with U.S. Appl. No. 12/042,318, 1 page.
Office Action, dated Mar. 15, 2017, received in Canadian Patent Application No. 2,931,604, which corresponds with U.S. Appl. No. 12/042,318, 3 pages.
Office Action, dated Feb. 2, 2018, received in Canadian Patent Application No. 2,931,604, which corresponds with U.S. Appl. No. 12/042,318, 6 pages.
Notice of Allowance, dated Dec. 10, 2018, received in Canadian Patent Application No. 2,931,604, which corresponds with U.S. Appl. No. 12/042,318, 3 pages.
Patent, dated Jul. 9, 2019, received in Canadian Patent Application No. 2,931,604, which corresponds with U.S. Appl. No. 12/042,318, 5 pages.
Notice of Allowance, dated Apr. 2, 2019, received in Canadian Patent Application No. 3,011,844, which corresponds with U.S. Appl. No. 12/042,318, 4 pages.
Patent, dated Jul. 9, 2019, received in Canadian Patent Application No. 3,011,844, which corresponds with U.S. Appl. No. 12/042,318, 4 pages.
Office Action, dated Aug. 6, 2010, received in Chinese Patent Application No. 200910118596.4, which corresponds with U.S. Appl. No. 12/042,318, 2 pages.
Decision to Grant, dated Mar. 22, 2011, received in Chinese Patent Application No. 200910118596.4, 3 pages.
Office Action, dated Aug. 5, 2013, received in Chinese Patent Application No. 201110148738.9, which corresponds with U.S. Appl. No. 12/042,318, 6 pages.
Office Action, dated Feb. 8, 2014, received in Chinese Patent Application No. 201110148738.9, which corresponds with U.S. Appl. No. 12/042,318, 2 pages.
Office Action, dated Jun. 5, 2014, received in Chinese Patent Application No. 201110148738.9, which corresponds with U.S. Appl. No. 12/042,318, 2 pages.
Office Action, dated Jan. 21, 2013, received in Chinese Patent Application No. 201110148738.9, which corresponds with U.S. Appl. No. 12/042,318, 2 pages.
Office Action, dated Jun. 22, 2010, received in German Patent Application No. 102009011687.7, which corresponds with U.S. Appl. No. 12/042,318, 5 pages.
Oral Summons, dated Jul. 11, 2018, received in German Patent Application No. 102009011687.7, which corresponds with U.S. Appl. No. 12/042,318, 30 pages.
Patent, dated Feb. 7, 2019, received in German Patent Application No. 102009011687.7, which corresponds with U.S. Appl. No. 12/042,318, 3 pages.
Office Action, dated Feb. 12, 2010, received in European Patent Application No. 09154313.2, which corresponds with U.S. Appl. No. 12/042,318, 1 page.
Decision revoking the European Patent, dated Apr. 2, 2014, received in European Patent Application No. 09154313.2, which corresponds with U.S. Appl. No. 12/042,318, 28 pages.
Summons to Oral Proceedings, dated May 15, 2013, received in European Patent Application No. 09154313.2, which corresponds with U.S. Appl. No. 12/042,318, 30 pages.
New Summons to Oral Proceedings, dated Jul. 18, 2013, received in European Patent Application No. 09154313.2, which corresponds with U.S. Appl. No. 12/042,318, 3 pages.
Decision to Grant, dated Jul. 26, 2012, received in European Patent Application No. 11150786.9, which corresponds with U.S. Appl. No. 12/042,318, 1 page.
Office Action, dated May 9, 2014, received in European Patent Application No. 11150788.5, which corresponds with U.S. Appl. No. 12/042,318, 6 pages.
Decision to Grant, dated Sep. 17, 2015, received in European Patent Application No. 11150788.5, which corresponds with U.S. Appl. No. 12/042,318, 1 page.
Patent, dated Oct. 14, 2015, received in European Patent Application No. 11150788.5, which corresponds with U.S. Appl. No. 12/042,318, 1 page.

(56) References Cited

OTHER PUBLICATIONS

Office Action, dated May 14, 2014, received in European Patent Application No. 11184167.2, which corresponds with U.S. Appl. No. 12/042,318, 6 pages.
Office Action, dated Apr. 15, 2015, received in European Patent Application No. 11184167.2, which corresponds with U.S. Appl. No. 12/042,318, 3 pages.
Office Action, dated Nov. 25, 2015, received in European Patent Application No. 11184167.2, which corresponds with U.S. Appl. No. 12/042,318, 7 pages.
Office Action, dated Feb. 16, 2016, received in European Patent Application No. 11184167.2, which corresponds with U.S. Appl. No. 12/042,318, 6 pages.
Intention to Grant, dated Sep. 28, 2016, received in European Patent Application No. 11184167.2, which corresponds with U.S. Appl. No. 12/042,318, 5 pages.
Decision to Grant, dated Mar. 23, 2017, received in European Patent Application No. 11184167.2, which corresponds with U.S. Appl. No. 12/042,318, 1 page.
Patent, dated Apr. 19, 2017, received in European Patent Application No. 11184167.2, which corresponds with U.S. Appl. No. 12/042,318, 1 page.
Office Action, dated May 14, 2014, received in Patent Application No. 11184169.8, which corresponds with U.S. Appl. No. 12/042,318, 6 pages.
Office Action, dated Nov. 25, 2015, received in European Patent Application No. 11184169.8, which corresponds with U.S. Appl. No. 12/042,318, 8 pages.
Office Action, dated Feb. 16, 2016, received in European Patent Application No. 11184169.8, which corresponds with U.S. Appl. No. 12/042,318, 6 pages.
Intention to Grant, dated Sep. 29, 2016, received in European Patent Application No. 11184169.8, which corresponds with U.S. Appl. No. 12/042,318, 5 pages.
Decision to Grant, dated Mar. 23, 2017, received in European Patent Application No. 11184169.8, which corresponds with U.S. Appl. No. 12/042,318, 1 page.
Office Action, dated May 16, 2014, received in European Patent Application No. 11184170.6, which corresponds with U.S. Appl. No. 12/042,318, 5 pages.
Office Action, dated Apr. 16, 2015, received in European Patent Application No. 11184170.6, which corresponds with U.S. Appl. No. 12/042,318, 2 pages.
Office Action, dated Nov. 30, 2015, received in European Patent Application No. 11184170.6, which corresponds with U.S. Appl. No. 12/042,318, 4 pages.
Intention to Grant, dated Jul. 8, 2016, received in European Patent Application No. 11184170.6, which corresponds with U.S. Appl. No. 12/042,318, 7 pages.
Office Action, dated May 16, 2014, received in European Patent Application No. 11184172.2, which corresponds with U.S. Appl. No. 12/042,318, 5 pages.
Office Action, dated Apr. 17, 2015, received in European Patent Application No. 11184172.2, which corresponds with U.S. Appl. No. 12/042,318, 6 pages.
Office Action, dated Nov. 30, 2015, received in European Patent Application No. 11184172.2, which corresponds with U.S. Appl. No. 12/042,318, 4 pages.
Intention to Grant, dated Jul. 8, 2016, received in European Patent Application No. 11184172.2, which corresponds with U.S. Appl. No. 12/042,318, 5 pages.
Office Action, dated May 16, 2014, received in European Patent Application No. 11184409.8, which corresponds with U.S. Appl. No. 12/042,318, 6 pages.
Office Action, dated Apr. 22, 2015, received in European Patent Application No. 11184409.8, which corresponds with U.S. Appl. No. 12/042,318, 6 pages.
Office Action, dated Nov. 30, 2015, received in European Patent Application No. 11184409.8, which corresponds with U.S. Appl. No. 12/042,318, 4 pages.
Intention to Grant, dated Jul. 1, 2016, received in European Patent Application No. 11184409.8, which corresponds with U.S. Appl. No. 12/042,318, 5 pages.
Office Action, dated Oct. 22, 2014, received in European Patent Application No. 12156394.4, which corresponds with U.S. Appl. No. 12/042,318, 6 pages.
Office Action, dated Nov. 25, 2015, received in European Patent Application No. 12156394.4, which corresponds with U.S. Appl. No. 12/042,318, 8 pages.
Decision to Grant, dated Jul. 28, 2016, received in European Patent Application No. 12156394.4, which corresponds with U.S. Appl. No. 12/042,318, 1 page.
Office Action, dated Oct. 22, 2014, received in European Patent Application No. 12156395.1, which corresponds with U.S. Appl. No. 12/042,318, 6 pages.
Office Action, dated Nov. 25, 2015, received in European Patent Application No. 12156395.1, which corresponds with U.S. Appl. No. 12/042,318, 9 pages.
Intention to Grant, dated Aug. 9, 2016, received in European Patent Application No. 12156395.1, which corresponds with U.S. Appl. No. 12/042,318, 3 pages.
Intention to Grant, dated Mar. 20, 2020, received in European Patent Application No. 17158104.4, which corresponds with U.S. Appl. No. 12/042,318, 7 pages.
Intention to Grant, dated Jun. 12, 2020, received in European Patent Application No. 17158104.4, which corresponds with U.S. Appl. No. 12/042,318, 7 pages.
Certificate of Grant, dated Nov. 30, 2012, received in Hong Kong Patent Application No. 11110416.2, which corresponds with U.S. Appl. No. 12/042,318, 1 page.
Certificate of Grant, dated Jul. 17, 2015, received in Hong Kong Patent Application No. 12105027.2, which corresponds with U.S. Appl. No. 12/042,318, 2 pages.
Certificate of Grant, dated Jan. 26, 2018, received in Hong Kong Patent Application No. 12106620.1, which corresponds with U.S. Appl. No. 12/042,318, 4 pages.
Certificate of Granted, dated Oct. 27, 2017, received in Hong Kong Patent Application No. 12106622.9, which corresponds with U.S. Appl. No. 12/042,318, 2 pages.
Certificate of Granted, dated Nov. 3, 2017, received in Hong Kong Patent Application No. 12106623.8, which corresponds with U.S. Appl. No. 12/042,318, 2 pages.
Certificate of Grant, dated Nov. 3, 2017, received in Hong Kong Patent Application No. 12106624.7, which corresponds with U.S. Appl. No. 12/042,318, 2 pages.
Office Action, dated Nov. 3, 2017, received in Hong Kong Patent Application No. 13100042.3, which corresponds with U.S. Appl. No. 12/042,318, 2 pages.
Certificate of Grant, dated Oct. 13, 2017, received in Hong Kong Patent Application No. 13100043.2, which corresponds with U.S. Appl. No. 12/042,318, 2 pages.
Office Action, dated Jul. 20, 2015, received in Israel Patent Application No. 197386, which corresponds with U.S. Appl. No. 12/042,318, 3 pages.
Notice of Allowance, dated Nov. 23, 2015, received in Israel Patent Application No. 197386, which corresponds with U.S. Appl. No. 12/042,318, 2 pages.
Patent, dated May 30, 2016, received in Israel Patent Application No. 197386, which corresponds with U.S. Appl. No. 12/042,318, 2 pages.
Notice of Allowance, dated May 20, 2019, received in Israel Patent Application No. 244139, which corresponds with U.S. Appl. No. 12/042,318, 6 pages.
Patent, dated Oct. 1, 2019, received in Israel Patent Application No. 244139, which corresponds with U.S. Appl. No. 12/042,318, 6 pages.
Office Action, dated Aug. 26, 2011, received in Japanese Patent Application No. 2009-080377, which corresponds with U.S. Appl. No. 12/042,318, 2 pages.
Decision to Grant, dated Jul. 27, 2012, received in Japanese Patent Application No. 2009-080377, which corresponds with U.S. Appl. No. 12/042,318, 4 pages.

(56) References Cited

OTHER PUBLICATIONS

Decision to Grant, dated Nov. 1, 2013, received in Japanese Patent Application No. 2012-186775, which corresponds with U.S. Appl. No. 12/042,318, 3 pages.
Office Action, dated Apr. 4, 2016, received in Japanese Patent Application No. 2015-085361, which corresponds with U.S. Appl. No. 12/042,318, 3 pages.
Office Action, dated Sep. 8, 2017, received in Japanese Patent Application No. 2015-085361, which corresponds with U.S. Appl. No. 12/042,318, 4 pages.
Patent, dated Oct. 13, 2017, received in Japanese Patent Application No. 2015-085361, which corresponds with U.S. Appl. No. 12/042,318, 2 pages.
Office Action, dated Jul. 9, 2018, received in Japanese Patent Application No. 2017-195359, which corresponds with U.S. Appl. No. 12/042,318, 5 pages.
Office Action, dated Jun. 3, 2019, received in Japanese Patent Application No. 2017-195359, which corresponds with U.S. Appl. No. 12/042,318, 6 pages.
Notice of Allowance, dated Jan. 10, 2020, received in Japanese Patent Application No. 2017-195359, which corresponds with U.S. Appl. No. 12/042,318, 5 pages.
Patent, dated Feb. 10, 2020, received in Japanese Patent Application No. 2017-195359, which corresponds with U.S. Appl. No. 12/042,318, 3 pages.
Office Action, dated Jan. 18, 2011, received in U.S. Appl. No. 12/042,067, 13 pages.
Final Office Action, dated Jul. 28, 2011, received in U.S. Appl. No. 12/042,067, 12 pages.
Office Action, dated Mar. 14, 2013, received in U.S. Appl. No. 12/042,067, 15 pages.
Notice of Allowance, dated Dec. 6, 2013, received in U.S. Appl. No. 12/042,067, 9 pages.
Notice of Allowance, dated Sep. 27, 2013, received in U.S. Appl. No. 12/042,067, 10 pages.
Office Action, dated Jun. 13, 2012, received in Chinese Patent Application No. 200980000014.0, which corresponds with U.S. Appl. No. 12/042,067, 2 pages.
Office Action, dated Oct. 19, 2011, received in Chinese Patent Application No. 200980000014.0, which corresponds with U.S. Appl. No. 12/042,067, 2 pages.
Decision to Grant, dated Nov. 27, 2012, received in Chinese Patent Application No. 200980000014.0, which corresponds with U.S. Appl. No. 12/042,067, 1 page.
Office Action, dated May 4, 2015, received in Chinese Patent Application No. 20130053142.X, which corresponds with U.S. Appl. No. 12/042,067, 6 pages.
Office Action, dated Mar. 21, 2016, received in Chinese Patent Application No. 20130053142.X, which corresponds with U.S. Appl. No. 12/042,067, 7 pages.
Office Action, dated Oct. 10, 2016, received in Chinese Patent Application No. 20130053142.X, which corresponds with U.S. Appl. No. 12/042,067, 8 pages.
Office Action, dated Jun. 2, 2017, received in Chinese Patent Application No. 20130053142.X, which corresponds with U.S. Appl. No. 12/042,067, 2 pages.
Office Action, dated May 31, 2019, received in Chinese Patent Application No. 20130053142.X, which corresponds with U.S. Appl. No. 12/042,067, 3 pages.
Notice of Allowance, dated Sep. 4, 2019, received in Patent Application No. 20130053142.X, which corresponds with U.S. Appl. No. 12/042,067, 3 pages.
Patent, dated Oct. 11, 2019, received in Chinese Patent Application No. 20130053142.X, which corresponds with U.S. Appl. No. 12/042,067, 3 pages.
Decision to Grant, dated Apr. 14, 2016, received in European Patent Application No. 09700006.1, which corresponds with U.S. Appl. No. 12/042,067, 1 page.

Office Action, dated Oct. 19, 2010, received in German Patent Application No. 11200900000.1, which corresponds with U.S. Appl. No. 12/042,067, 5 pages.
Office Action, dated Sep. 26, 2012, received in German Patent Application No. 112009000001.0, which corresponds with U.S. Appl. No. 12/042,067, 5 pages.
Office Action, dated Oct. 15, 2010, received in European Patent Application No. 09700006.1, which corresponds with U.S. Appl. No. 12/042,067, 4 pages.
Decision to Refuse, dated Jul. 15, 2013, received in European Patent Application No. 09700006.1, which corresponds with U.S. Appl. No. 12/042,067, 12 pages.
Summons to Oral Proceedings, dated Mar. 7, 2013, received in European Patent Application No. 09700006.1, which corresponds with U.S. Appl. No. 12/042,067, 5 pages.
Summons to Oral Proceedings, dated Mar. 10, 2015, received in European Patent Application No. 09700006.1, which corresponds with U.S. Appl. No. 12/042,067, 9 pages.
Decision to Grant, dated Apr. 12, 2015, received in European Patent Application No. 09700006.1, which corresponds with U.S. Appl. No. 12/042,067, 5 pages.
Office Action, dated Oct. 30, 2013, received in European Patent Application No. 12188748.3, which corresponds with U.S. Appl. No. 12/042,067, 5 pages.
Decision to refuse, dated Dec. 12, 2014, received in Patent Application No. 12188748.3, which corresponds with U.S. Appl. No. 12/042,067, 12 pages.
Summons to Attend Oral Proceedings, dated Apr. 22, 2014, received in European Patent Application No. 12188748.3, which corresponds with U.S. Appl. No. 12/042,067, 3 pages.
Appeal Decision, dated Oct. 9, 2017, received in European Patent Application No. 12188748.3, which corresponds with U.S. Appl. No. 12/042,067, 16 pages.
Patent, dated Aug. 4, 2017, received in Hong Kong Patent Application No. 10111901.3, which corresponds with U.S. Appl. No. 12/042,067, 2 pages.
Office Action, dated Oct. 24, 2011, received in Japanese Patent Application No. 2010-502356, which corresponds with U.S. Appl. No. 12/042,067, 2 pages.
Office Action, dated Jan. 6, 2014, received in Japanese Patent Application No. 2012-224838, which corresponds with U.S. Appl. No. 12/042,067, 1 page.
Office Action, dated Jan. 4, 2011, received in U.S. Appl. No. 12/042,299, 9 pages.
Final Office Action, dated Jul. 8, 2011, received in U.S. Appl. No. 12/042,299, 8 pages.
Office Action, dated May 3, 2012, received in U.S. Appl. No. 12/042,299, 9 pages.
Notice of Allowance, dated Dec. 12, 2012, received in U.S. Appl. No. 12/042,299, 8 pages.
Office Action, dated Oct. 26, 2011, received in Chinese Patent Application No. 200980000013.6, which corresponds with U.S. Appl. No. 12/042,299, 2 pages.
Office Action, dated Dec. 5, 2012, received in Chinese Patent Application No. 200980000013.6, which corresponds with U.S. Appl. No. 12/042,299, 2 pages.
Office Action, dated Jun. 6, 2012, received in Chinese Patent Application No. 200980000013.6, which corresponds with U.S. Appl. No. 12/042,299, 2 pages.
Office Action, dated Jul. 3, 2013, received in Chinese Patent Application No. 200980000013.6, which corresponds with U.S. Appl. No. 12/042,299, 6 pages.
Notification of Grant, dated Nov. 6, 2013, received in Chinese Patent Application No. 200980000013.6, which corresponds with U.S. Appl. No. 12/042,299, 3 pages.
Office Action, dated Apr. 28, 2016, received in Chinese Patent Application No. 2016042501712900, which corresponds with U.S. Appl. No. 12/042,299, 2 pages.
Office Action, dated Jul. 20, 2017, received in Chinese Patent Application No. 201410028534.5, which corresponds with U.S. Appl. No. 12/042,299, 5 pages.

(56) References Cited

OTHER PUBLICATIONS

Office Action, dated Feb. 9, 2018, received in Chinese Patent Application No. 201410028534.5, which corresponds with U.S. Appl. No. 12/042,299, 3 pages.
Notice of Allowance, dated Jul. 31, 2018, received in Chinese Patent Application No. 201410028534.5, which corresponds with U.S. Appl. No. 12/042,299, 3 pages.
Office Action, dated Jun. 1, 2016, received in Chinese Patent Application No. 2014100285627, which corresponds with U.S. Appl. No. 12/042,299, 3 pages.
Office Action, dated Apr. 26, 2017, received in Chinese Patent Application No. 2014100285627, which corresponds with U.S. Appl. No. 12/042,299, 5 pages.
Notice of Allowance, dated Nov. 28, 2017, received in Chinese Patent Application No. 2014100285627, which corresponds with U.S. Appl. No. 12/042,299, 3 pages.
Patent, dated Feb. 9, 2018, received in Chinese Patent Application No. 2014100285627, which corresponds with U.S. Appl. No. 12/042,299, 4 pages.
Office Action, dated Aug. 10, 2010, received in German Patent Application No. 112009000003.7, which corresponds with U.S. Appl. No. 12/042,299, 3 pages.
Office Action, dated Sep. 26, 2012, received in German Patent Application No. 112009000003.7, which corresponds with U.S. Appl. No. 12/042,299, 5 pages.
Summons, dated Feb. 8, 2019, received in German Patent Application No. 112009000003.7, which corresponds with U.S. Appl. No. 12/042,299, 10 pages.
Office Action, dated May 21, 2019, received in German Patent Application No. 112009000003.7, which corresponds with U.S. Appl. No. 12/042,299, 4 pages.
Decision to Grant, dated Aug. 13, 2019, received in German Patent Application No. 112009000003.7, which corresponds with U.S. Appl. No. 12/042,299, 10 pages.
Patent, dated Nov. 21, 2019, received in German Patent Application No. 112009000003.7, which corresponds with U.S. Appl. No. 12/042,299, 4 pages.
Office Action, dated Mar. 9, 2012, received in European Patent Application No. 09700007.9, which corresponds with U.S. Appl. No. 12/042,299, 7 pages.
Office Action, dated Nov. 26, 2010, received in European Patent Application No. 09700007.9, which corresponds with U.S. Appl. No. 12/042,299, 5 pages.
Office Action, dated Aug. 28, 2014, received in European Patent Application No. 09700007.9, which corresponds with U.S. Appl. No. 12/042,299, 8 pages.
Summons to oral proceedings, dated Oct. 30, 2013, received in European Patent Application No. 09700007.9, which corresponds with U.S. Appl. No. 12/042,299, 5 pages.
Decision to Refuse Application, dated Sep. 6, 2017, received in European Patent Application No. 09700007.9, which corresponds with U.S. Appl. No. 12/042,299, 15 pages.
Office Action, dated Sep. 12, 2012, received in European Patent Application No. 11184226.6, which corresponds with U.S. Appl. No. 12/042,299, 5 pages.
Office Action, dated Jul. 25, 2016, received in European Patent Application No. 11184226.6, which corresponds with U.S. Appl. No. 12/042,299, 9 pages.
Summons to Attend Oral Proceedings, dated Dec. 6, 2017, received in European Patent Application No. 11184226.6, which corresponds with U.S. Appl. No. 12/042,299, 8 pages.
Decision to Refuse, dated Jun. 5, 2018, received in European Patent Application No. 11184226.6, which corresponds with U.S. Appl. No. 12/042,299, 14 pages.
Office Action, dated Sep. 12, 2012, received in European Patent Application No. 11184224.1, which corresponds with U.S. Appl. No. 12/042,299, 4 pages.
Decision to Refuse, dated Feb. 11, 2015, received in European Patent Application No. 11184224.1, which corresponds with U.S. Appl. No. 12/042,299, 10 pages Summons to Attend Oral Proceedings, dated Oct. 30, 2013, received in European U.S. Appl. No. 12/042,299 (5344EP02), which corresponds with U.S. Appl. No. 12/042,299, 5 pages.
Office Action, dated Sep. 1, 2017, received in European Patent Application No. 11184224.1, which corresponds with U.S. Appl. No. 12/042,299, 6 pages.
Oral Summons, dated Sep. 3, 2018, received in European Patent Application No. 11184224.1, which corresponds with U.S. Appl. No. 12/042,299, 7 pages.
Decision to Refuse an EP App, dated Feb. 26, 2019, received in European Patent Application No. 11184224.1, which corresponds with U.S. Appl. No. 12/042,299, 5 pages.
Office Action, dated Sep. 12, 2012, received in European Patent Application No. 11184223.3, which corresponds with U.S. Appl. No. 12/042,299, 4 pages.
Summons to Attend Oral Proceedings, dated Oct. 30, 2013, received in European Patent Application No. 11184223.3, which corresponds with U.S. Appl. No. 12/042,299, 5 pages.
Decision to refuse, dated Feb. 11, 2015, received in European Patent Application No. 11184223.3, which corresponds with U.S. Appl. No. 12/042,299, 10 pages.
Oral Summons, dated Sep. 5, 2018, received in European Patent Application No. 11184223.3, which corresponds with U.S. Appl. No. 12/042,299, 6 pages.
Decision to Refuse a EP App, dated Feb. 26, 2019, received in European Patent Application No. 11184223.3, which corresponds with U.S. Appl. No. 12/042,299, 4 pages.
Office Action, dated Sep. 12, 2012, received in European Patent Application No. 11184222.5, which corresponds with U.S. Appl. No. 12/042,299, 4 pages.
Summons to Attend Oral Proceedings, dated Oct. 30, 2013, received in European Patent Application No. 11184222.5, which corresponds with U.S. Appl. No. 12/042,299, 5 pages.
Decision to refuse dated Feb. 11, 2015, received in European Patent Application No. 11184222.5, which corresponds with U.S. Appl. No. 12/042,299, 10 pages.
Oral Summons, dated Sep. 3, 2018, received in European Patent Application No. 11184222.5, which corresponds with U.S. Appl. No. 12/042,299, 6 pages.
Certificate of Grant, dated Sep. 6, 2019, received in Hong Kong Patent Application No. 14110202.7, which corresponds with U.S. Appl. No. 12/042,299, 5 pages.
Office Action, dated Aug. 15, 2011, received in Japanese Patent Application No. 2010-502358, which corresponds with U.S. Appl. No. 12/042,299, 2 pages.
Decision to Grant, dated Mar. 23, 2012, received in Japanese Patent Application No. 2010-502358, which corresponds with U.S. Appl. No. 12/042,299, 5 pages.
Office Action, dated Sep. 6, 2013, received in Japanese Patent Application No. 2012-088747, which corresponds with U.S. Appl. No. 12/042,299, 4 pages.
Office Action, dated Aug. 11, 2014, received in Japanese Patent Application No. 2012-088747, which corresponds with U.S. Appl. No. 12/042,299, 1 page.
Decision to Grant, dated Feb. 16, 2015, received in Japanese Patent Application No. 2012-088747, which corresponds with U.S. Appl. No. 12/042,299, 3 pages.
Office Action, dated Nov. 30, 2015, received in Japanese Patent Application No. 2014-250268, which corresponds with U.S. Appl. No. 12/042,299, 4 pages.
Letters Patent, dated Jul. 15, 2016, received in Japanese Patent Application No. 2014-250268, which corresponds with U.S. Appl. No. 12/042,299, 2 pages.
Office Action, dated Jun. 2, 2017, received in Japanese Patent Application No. 2016-133582, which corresponds with U.S. Appl. No. 12/042,299, 5 pages.
Notice of Allowance, dated Nov. 17, 2017, received in Japanese Patent Application No. 2016-133582, which corresponds with U.S. Appl. No. 12/042,299, 5 pages.
Patent, dated Jan. 5, 2018, received in Japanese Patent Application No. 2016-133582, which corresponds with U.S. Appl. No. 12/042,299, 2 pages.

(56) References Cited

OTHER PUBLICATIONS

Notice of Allowance, dated Sep. 25, 2018, received in Japanese Patent Application No. 2017-238833, which correspond with U.S. Appl. No. 12/042,299, 5 pages.
Patent, dated Nov. 2, 2018, received in Japanese Patent Application No. 2017-238833, which correspond with U.S. Appl. No. 12/042,299, 2 pages.
Office Action, dated Nov. 15, 2019, received in Japanese Patent Application No. 2018-200268, 5 pages.
Notice of Allowance, dated Jun. 13, 2013, received in U.S. Appl. No. 13/077,927, 10 pages.
Office Action, dated Jan. 3, 2013, received in U.S. Appl. No. 13/077,931, 13 pages.
Final Office Action, dated Sep. 9, 2013, received in U.S. Appl. No. 13/077,931, 14 pages.
Office Action, dated Jul. 17, 2014, received in U.S. Appl. No. 13/077,931, 21 pages.
Office Action, dated Aug. 20, 2015, received in U.S. Appl. No. 13/077,931, 22 pages.
Notice of Allowance, dated Dec. 31, 2014, received in U.S. Appl. No. 13/077,931, 8 pages.
Notice of Allowance, dated Jan. 14, 2016, received in U.S. Appl. No. 13/077,931, 8 pages.
Office Action, dated Nov. 21, 2012, received in U.S. Appl. No. 13/163,624, 9 pages.
Office Action, dated Mar. 22, 2013, received in U.S. Appl. No. 13/163,624, 9 pages.
Office Action, dated Oct. 24, 2013, received in U.S. Appl. No. 13/163,624, 8 pages.
Notice of Allowance, dated May 12, 2014, received in U.S. Appl. No. 13/163,624, 5 pages.
Office Action, dated Mar. 20, 2013, received in U.S. Appl. No. 13/163,626, 8 pages.
Office Action, dated Nov. 26, 2012, received in U.S. Appl. No. 13/163,626, 8 pages.
Office Action, dated Oct. 24, 2013, received in U.S. Appl. No. 13/163,626, 8 pages.
Notice of Allowance, dated Mar. 31, 2014, received in U.S. Appl. No. 13/163,626, 5 pages.
Office Action, dated Dec. 30, 2010, received in U.S. Appl. No. 12/042,237, 9 pages.
Final Office Action, dated Jun. 2, 2011, received in U.S. Appl. No. 12/042,237, 9 pages.
Office Action, dated Sep. 14, 2011, received in U.S. Appl. No. 12/042,237, 8 pages.
Notice of Allowance, dated Mar. 6, 2012, received in U.S. Appl. No. 12/042,237, 8 pages.
Office Action, dated Jul. 14, 2011, received in Chinese Patent Application No. 200980000015.5, which corresponds with U.S. Appl. No. 12/042,237, 2 pages.
Office Action, dated Feb. 22, 2012, received in Chinese Patent Application No. 200980000015.5, which corresponds with U.S. Appl. No. 12/042,237, 2 pages.
Office Action, dated Sep. 11, 2012, received in Chinese Patent Application No. 200980000015.5, which corresponds with U.S. Appl. No. 12/042,237, 1 page.
Office Action, dated Apr. 27, 2017, received in Chinese Patent Application No. 201510175905.7, which corresponds with U.S. Appl. No. 12/042,237, 5 pages.
Office Action, dated Feb. 1, 2018, received in Chinese Patent Application No. 201510175905.7, which corresponds with U.S. Appl. No. 12/042,237, 3 pages.
Office Action, dated Oct. 8, 2018, received in Chinese Patent Application No. 201510175905.7, which corresponds with U.S. Appl. No. 12/042,237, 3 pages.
Rejection Decision, dated Apr. 24, 2019, received in Chinese Patent Application No. 201510175905.7, which corresponds with U.S. Appl. No. 12/042,237, 2 pages.
Notice of Allowance, dated Oct. 10, 2019, received in Chinese Patent Application No. 201510175905.7, which corresponds with U.S. Appl. No. 12/042,237, 3 pages.
Patent, dated Nov. 26, 2019, received in Chinese Patent Application No. 201510175905.7, which corresponds with U.S. Appl. No. 12/042,237, 6 pages.
Office Action, dated Jun. 30, 2017, received in Chinese Patent Application No. 201510175915.0, which corresponds with U.S. Appl. No. 12/042,237, 5 pages.
Office Action, dated Jan. 17, 2018, received in Chinese Patent Application No. 201510175915.0, which corresponds with U.S. Appl. No. 12/042,237, 3 pages.
Office Action, dated Jul. 11, 2018, received in Chinese Patent Application No. 201510175915.0, which corresponds with U.S. Appl. No. 12/042,237, 4 pages.
Notice of Allowance, dated Feb. 18, 2019, received in Chinese Patent Application No. 201510175915.0, which corresponds with U.S. Appl. No. 12/042,237, 3 pages.
Patent, dated May 3, 2019, received in Chinese Patent Application No. 201510175915.0, which corresponds with U.S. Appl. No. 12/042,237, 4 pages.
Office Action, dated Sep. 26, 2012, received in German Patent Application No. 112009000002.9, which corresponds with U.S. Appl. No. 12/042,237, 5 pages.
Oral Summons, dated Jan. 24, 2019, received in German Patent Application No. 112009000002.9, which corresponds with U.S. Appl. No. 12/042,237, 3 pages.
Decision to Grant, dated Sep. 27, 2019, received in Patent Application No. 112009000002.9, which corresponds with U.S. Appl. No. 12/042,237, 2 pages.
Patent, dated Jan. 9, 2020, received in German Patent Application No. 112009000002.9, which corresponds with U.S. Appl. No. 12/042,237, 3 pages.
Office Action, dated Jul. 12, 2010, received in European Patent Application No. 09700008.7, which corresponds with U.S. Appl. No. 12/042,237, 3 pages.
Summons to oral proceedings, dated Mar. 10, 2015, received in European Patent Application No. 09700008.7, which corresponds with U.S. Appl. No. 12/042,299, 12 pages.
Summons to oral proceedings, dated Mar. 27, 2013, received in European Patent Application No. 09700008.7, which corresponds with U.S. Appl. No. 12/042,299, 4 pages.
Decision to Refuse, dated Oct. 8, 2013, received in European Patent Application No. 09700008.7, which corresponds with U.S. Appl. No. 12/042,237, 15 pages.
Decision to Grant, dated Dec. 2, 2015, received in European Patent Application No. 09700008.7, which corresponds with U.S. Appl. No. 12/042,237, 5 pages.
Decision to Grant, dated Apr. 14, 2016, received in European Patent Application No. 09700008.7, which corresponds with U.S. Appl. No. 12/042,237, 1 page.
Patent Certificate, May 11, 2016, received in European Patent Application No. 09700008.7, which corresponds with U.S. Appl. No. 12/042,237, 2 pages.
Office Action, dated Nov. 16, 2016, received in European Patent Application No. 15175530.3, which corresponds with U.S. Appl. No. 12/042,237, 4 pages.
Summons, dated Feb. 18, 2019, received in European Patent Application No. 15175530.3, which corresponds with U.S. Appl. No. 12/042,237, 6 pages.
Decision to Refuse, dated Jan. 2, 2020, received in European Patent Application No. 15175530.3, which corresponds with U.S. Appl. No. 12/042,237, 12 pages.
Patent, dated Aug. 4, 2017, received in Hong Kong Patent Application No. 10100282.5, which corresponds with U.S. Appl. No. 12/042,237, 2 pages.
Patent, dated Feb. 28, 2020, received in Hong Kong Patent Application No. 15112846.4, which corresponds with U.S. Appl. No. 12/042,237, 7 pages.
Office Action, dated Sep. 2, 2013, received in Japanese Patent Application No. 2010-502357, which corresponds with U.S. Appl. No. 12/042,237, 11 pages.

(56) References Cited

OTHER PUBLICATIONS

Office Action, dated Mar. 4, 2013, received in Japanese Patent Application No. 2010-502357, which corresponds with U.S. Appl. No. 12/042,237, 2 pages.
Office Action, dated Jan. 16, 2012, received in Japanese Patent Application No. 2010-502357, which corresponds with U.S. Appl. No. 12/042,237, 2 pages.
Office Action, dated Sep. 24, 2013, received in Japanese Patent Application No. 2012-218235, which corresponds with U.S. Appl. No. 12/042,237, 3 pages.
Letters Patent, dated Oct. 31, 2014, received in Japanese Patent Application No. 2012-218235, which corresponds with U.S. Appl. No. 12/042,237, 2 pages.
Office Action, dated May 20, 2015, received in U.S. Appl. No. 13/221,827, 26 pages.
Office Action, dated Jun. 23, 2014, received in U.S. Appl. No. 13/221,827, 18 pages.
Office Action, dated Oct. 4, 2016, received in U.S. Appl. No. 13/221,827, 20 pages.
Notice of Allowance, dated May 5, 2017, received in U.S. Appl. No. 13/221,827, 20 pages.
Notice of Allowance, dated Dec. 3, 2012, received in U.S. Appl. No. 13/221,830, 6 pages.
Notice of Allowance, dated May 23, 2012, received in U.S. Appl. No. 13/221,830, 7 pages.
Office Action, dated Nov. 4, 2011, received in U.S. Appl. No. 11/620,727, 15 pages.
Final Office Action, dated Mar. 12, 2012, received in U.S. Appl. No. 11/620,727, 20 pages.
Office Action, dated Aug. 15, 2012, received in U.S. Appl. No. 11/620,727, 19 pages.
Final Office Action, dated Mar. 7, 2013, received in U.S. Appl. No. 11/620,727, 23 pages.
Examiner's Answer, dated Feb. 13, 2014, received in U.S. Appl. No. 11/620,727, 23 pages.
Office Action, dated Jan. 6, 2012, received in Chinese Patent Application No. 200880001811.6, which corresponds with U.S. Appl. No. 11/620,727, 2 pages.
Office Action, dated Aug. 10, 2011, received in Chinese Patent Application No. 200880001811.6, which corresponds with U.S. Appl. No. 11/620,727, 3 pages.
Office Action, dated Oct. 21, 2010, received in Chinese Patent Application No. 200880001811.6, which corresponds with U.S. Appl. No. 11/620,727, 2 pages.
Office Action, dated Feb. 21, 2014, received in Chinese Patent Application No. 201210128932.5, which corresponds with U.S. Appl. No. 11/620,727, 2 pages.
Office Action, dated Oct. 30, 2014, received in Chinese Patent Application No. 201210128932.5, which corresponds with U.S. Appl. No. 11/620,727, 2 pages.
Office Action, dated May 11, 2015, received in Chinese Patent Application No. 201210128932.5, which corresponds with U.S. Appl. No. 11/620,727, 4 pages.
Office Action, dated Dec. 24, 2014, received in Chinese Patent Application No. 201210128915.1, which corresponds with U.S. Appl. No. 11/620,727, 2 pages.
Notice of Allowance, dated Feb. 5, 2016, received in Chinese Patent Application No. 201210128915.1, which corresponds with U.S. Appl. No. 11/620,727, 2 pages.
Certificate of Patent, dated Mar. 16, 2016, received in Chinese Patent Application, No. 201210128915.1, which corresponds with U.S. Appl. No. 11/620,727, 1 page.
Office Action, dated Nov. 15, 2014, received in Chinese Patent Application No. 201210128911.3, which corresponds with U.S. Appl. No. 11/620,727, 2 pages.
Office Action, dated Jan. 29, 2016, received in Chinese Patent Application No. 201210128911.3, which corresponds with U.S. Appl. No. 11/620,727, 6 pages.
Office Action, dated Dec. 19, 2011, received in European Patent Application No. 08705471.4, which corresponds with U.S. Appl. No. 11/620,727, 6 pages.
Office Action, dated Jan. 29, 2015, received in Patent Application No. 08705471.4, which corresponds with U.S. Appl. No. 11/620,727, 8 pages.
Summons to Attend Oral Proceedings, dated Dec. 6, 2017, received in European Patent Application No. 08705471.4, which corresponds with U.S. Appl. No. 11/620,727, 6 pages.
Decision to Refuse a European Patent Application, dated Jul. 20, 2018, received in European Patent Application No. 08705471.4, which corresponds with U.S. Appl. No. 11/620,727, 14 pages.
Patent, dated Jun. 2, 2017, received in Hong Kong Patent Application No. 13104177.2, which corresponds with U.S. Appl. No. 11/620,727, 2 pages.
Office Action, dated Nov. 5, 2012, received in U.S. Appl. No. 13/221,836, 16 pages.
Final Office Action, dated May 15, 2013, received in U.S. Appl. No. 13/221,836, 22 pages.
Office Action, dated Oct. 30, 2013, received in U.S. Appl. No. 13/221,836, 31 pages.
Final Office Action, dated May 20, 2014, received in U.S. Appl. No. 13/221,836, 36 pages.
Decision on Appeal, dated Jan. 3, 2017, received in U.S. Appl. No. 13/221,836, 6 pages.
Notice of Allowance, dated Feb. 21, 2017, received in U.S. Appl. No. 13/221,836, 10 pages.
Office Action, dated Jul. 24, 2012, received in U.S. Appl. No. 13/221,837, 13 pages.
Final Office Action, dated Feb. 14, 2013, received in U.S. Appl. No. 13/221,837, 13 pages.
Examiner's Answer, dated Feb. 11, 2014, received in U.S. Appl. No. 13,221,837, 19 pages.
Office Action, dated Jan. 10, 2012, received in U.S. Appl. No. 13/251,121, 16 pages.
Final Office Action, dated Jul. 9, 2012, received in U.S. Appl. No. 13/251,121, 21 pages.
Final Office Action, dated Sep. 23, 2013, received in U.S. Appl. No. 13/251,121, 24 pages.
Office Action, dated May 1, 2013, received in U.S. Appl. No. 13/251,121, 17 pages.
Examiner's Answer, dated Apr. 29, 2014, received in U.S. Appl. No. 13/251,121, 41 pages.
Notice of Allowance, dated Sep. 20, 2016, received in U.S. Appl. No. 13/251,121, 7 pages.
Office Action, dated Jan. 31, 2012, received in U.S. Appl. No. 13/251,146, 16 pages.
Final Office Action, dated Jun. 20, 2012, received in U.S. Appl. No. 13/251,146, 14 pages.
Office Action, dated Apr. 11, 2013, received in U.S. Appl. No. 13/251,146, 15 pages.
Final Office Action, dated Oct. 2, 2013, received in U.S. Appl. No. 13/251,146, 20 pages.
Examiner's Answer, dated May 7, 2014, received in U.S. Appl. No. 13/251,146, 43 pages.
Office Action, dated Feb. 10, 2012, received in U.S. Appl. No. 13/251,150, 23 pages.
Final Office Action, dated Jul. 5, 2012, received in U.S. Appl. No. 13/251,150, 27 pages.
Office Action, dated Jun. 7, 2013, received in U.S. Appl. No. 13/251,150, 34 pages.
Final Office Action, dated Dec. 11, 2013, received in U.S. Appl. No. 13/251,150, 44 pages.
Examiner's Answer, dated Jun. 17, 2014, received in U.S. Appl. No. 13/251,150, 47 pages.
Notice of Allowance, dated Dec. 21, 2016, received in U.S. Appl. No. 13/251,150, 10 pages.
Office Action, dated Jan. 20, 2012, received in U.S. Appl. No. 13/251,152, 20 pages.
Final Office Action, dated Jun. 20, 2012, received in U.S. Appl. No. 13/251,152, 24 pages.
Office Action, dated Apr. 23, 2013, received in U.S. Appl. No. 13/251,152, 29 pages.

(56) References Cited

OTHER PUBLICATIONS

Final Office Action, dated Oct. 18, 2013, received in U.S. Appl. No. 13/251,152, 29 pages.
Examiner's Answer, dated May 21, 2014, received in U.S. Appl. No. 13/251,152, 45 pages.
Notice of Allowance, dated Sep. 7, 2016, received in U.S. Appl. No. 13/251,152, 8 pages.
Notice of Allowance, dated Dec. 1, 2016, received in U.S. Appl. No. 13/251,152, 8 pages.
Office Action, dated Aug. 29, 2012, received in U.S. Appl. No. 11/620,715, 15 pages.
Final Office Action, dated Mar. 1, 2013, received in U.S. Appl. No. 11/620,715, 15 pages.
Examiner's Answer, dated Feb. 13, 2014, received in U.S. Appl. No. 11/620,715, 22 pages.
Decision on Appeal, dated Jun. 2, 2017, received in U.S. Appl. No. 11/620,715, 10 pages.
Office Action, dated Jul. 21, 2011, received in Chinese Patent Application No. 200880001855.9, which corresponds with U.S. Appl. No. 11/620,715, 2 pages.
Office Action, dated Jun. 6, 2012, received in Chinese Patent Application No. 200880001855.9, which corresponds with U.S. Appl. No. 11/620,715 (5583CN), 3 pages.
Office Action, dated Nov. 5, 2012, received in Chinese Patent Application No. 200880001855.9, which corresponds with U.S. Appl. No. 11/620,715, 2 pages.
Office Action, dated Mar. 7, 2013, received in Chinese Patent Application No. 200880001855.9, which corresponds with U.S. Appl. No. 11/620,715, 1 page.
Office Action, dated Jul. 29, 2014, received in Chinese Patent Application No. 200880001855.9, which corresponds with U.S. Appl. No. 11/620,715, 14 pages.
Office Action, dated Feb. 2, 2018, received in Chinese Patent Application No. 201510379780.X, which corresponds with U.S. Appl. No. 11/620,715, 5 pages.
Office Action, dated Dec. 24, 2018, received in Chinese Patent Application No. 201510379780.X, which corresponds with U.S. Appl. No. 11/620,715, 5 pages.
Office Action, dated Jul. 23, 2019, received in Chinese Patent Application No. 201510379780.X, which corresponds with U.S. Appl. No. 11/620,715, 6 pages.
Office Action, dated Nov. 1, 2019, received in Chinese Patent Application No. 201510379780.X, which corresponds with U.S. Appl. No. 11/620,715, 3 pages.
Office Action, dated Oct. 20, 2014, received in European Patent Application No. 08712946.6, which corresponds with U.S. Appl. No. 11/620,715, 6 pages.
Office Action, dated Oct. 30, 2012, received in European Patent Application No. 08712946.6, which corresponds with U.S. Appl. No. 11/620,715, 5 pages.
Notice of Allowance, dated Dec. 21, 2016, received in European Patent Application No. 08712946.6, which corresponds with U.S. Appl. No. 11/620,715, 7 pages.
Decision to Grant, dated May 11, 2017, received in European Patent Application No. 08712946.6, which corresponds with U.S. Appl. No. 11/620,715, 1 page.
Patent, dated Jul. 6, 2017, received in European Patent Application No. 08712946.6, which corresponds with U.S. Appl. No. 11/620,715, 1 page.
Office Action, dated Feb. 28, 2019, received in European Patent Application No. 17165698.6, which corresponds with U.S. Appl. No. 11/620,715, 7 pages.
Office Action, dated Jun. 18, 2012, received in U.S. Appl. No. 13/464,800, 10 pages.
Notice of Allowance, dated Nov. 13, 2012, received in U.S. Appl. No. 13/464,800, 8 pages.
Notice of Allowance, dated Dec. 19, 2012, received in U.S. Appl. No. 13/464,800, 9 pages.
Office Action, dated Oct. 9, 2012, received in U.S. Appl. No. 13/084,472, 14 pages.
Final Office Action, dated Jun. 20, 2013, received in U.S. Appl. No. 13/084,472, 20 pages.
Office Action, dated Dec. 6, 2013, received in U.S. Appl. No. 13/084,472, 23 pages.
Final Office Action, dated Jun. 17, 2014, received in U.S. Appl. No. 13/084,472, 31 pages.
Office Action, dated Dec. 10, 2014, received in U.S. Appl. No. 13/084,472, 24 pages.
Notice of Allowance, dated Jul. 7, 2015, received in U.S. Appl. No. 13/084,472, 8 pages.
Notice of Allowance, dated Oct. 26, 2015, received in U.S. Appl. No. 13/084,472, 8 pages.
Notice of Allowance, dated Jan. 15, 2014, received in U.S. Appl. No. 13/620,390, 10 pages.
Supplemental Notice of Allowance, dated Jan. 27, 2014, received in U.S. Appl. No. 13/620,390, 2 pages.
Office Action, dated Mar. 5, 2013, received in U.S. Appl. No. 13/670,378, 28 pages.
Notice of Allowance, dated Jul. 24, 2013, received in U.S. Appl. No. 13/670,378, 9 pages.
Office Action, dated Feb. 26, 2016, received in U.S. Appl. No. 14/043,774, 5 pages.
Notice of Allowance, dated Jun. 27, 2016, received in U.S. Appl. No. 14/043,774, 7 pages.
Office Action, dated Apr. 28, 2015, received in U.S. Appl. No. 13/791,621, 6 pages.
Notice of Allowance, dated Nov. 5, 2015, received in U.S. Appl. No. 13/791,621, 5 pages.
Notice of Allowance, dated Mar. 1, 2016, received in U.S. Appl. No. 13/791,621, 7 pages.
Office Action, dated Apr. 27, 2016, received in U.S. Appl. No. 14/290,931,12 pages.
Final Office Action, dated Nov. 25, 2016, received in U.S. Appl. No. 14/290,931, 13 pages.
Notice of Allowance, dated Apr. 7, 2017, received in U.S. Appl. No. 14/290,931, 11 pages.
Office Action, dated Apr. 2, 2018, received in Chinese Patent Application No. 201480032919.7, which corresponds with U.S. Appl. No. 14/290,931, 4 pages.
Office Action, dated Nov. 13, 2018, received in Chinese Patent Application No. 201480032919.7, which corresponds with U.S. Appl. No. 14/290,931, 4 pages.
Notice of Allowance, dated Mar. 29, 2019, received in Chinese Patent Application No. 201480032919.7, which corresponds with U.S. Appl. No. 14/290,931, 3 pages.
Patent, dated Jun. 14, 2019, received in Chinese Patent Application No. 201480032919.7, which corresponds with U.S. Appl. No. 14/290,931, 6 pages.
Office Action, dated Oct. 24, 2018, received in European Patent Application No. 14734672.0, which corresponds with U.S. Appl. No. 14/290,931, 8 pages.
Office Action, dated Nov. 2, 2016, received in U.S. Appl. No. 14/290,931, 21 pages.
Notice of Allowance, dated Apr. 20, 2017, received in U.S. Appl. No. 14/188,635, 11 pages.
Notice of Allowance, dated May 18, 2017, received in U.S. Appl. No. 14/188,635, 5 pages.
Office Action, dated Jan. 4, 2016, received in U.S. Appl. No. 14/171,680, 7 pages.
Notice of Allowance, dated Apr. 18, 2016, received in U.S. Appl. No. 14/171,680, 5 pages.
Notice of Allowance, dated May 28, 2015, received in U.S. Appl. No. 14/180,267, 11 pages.
Notice of Allowance, dated Sep. 15, 2015, received in U.S. Appl. No. 14/180,267, 5 pages.
Notice of Allowance, dated Dec. 31, 2015, received in U.S. Appl. No. 14/180,267, 5 pages.
Notice of Allowance, dated Feb. 11, 2016, received in U.S. Appl. No. 14/180,267, 2 pages.
Office Action, dated Jun. 30, 2017, received in U.S. Appl. No. 15/046,252, 8 pages.
Notice of Allowance, dated Dec. 19, 2017, received in U.S. Appl. No. 15/046,252, 5 pages.

(56) References Cited

OTHER PUBLICATIONS

Office Action, dated Feb. 15, 2018, received in U.S. Appl. No. 15/139,260, 22 pages.
Notice of Allowance, dated Aug. 13, 2018, received in U.S. Appl. No. 15/139,260, 10 pages.
Office Action, dated Sep. 12, 2016, received in U.S. Appl. No. 15/197,704, 7 pages.
Notice of Allowance, dated Jan. 20, 2017, received in U.S. Appl. No. 15/197,704, 5 pages.
Notice of Allowance, dated May 5, 2017, received in U.S. Appl. No. 15/197,704, 5 pages.
Office Action, dated Apr. 30, 2019, received in U.S. Appl. No. 15/339,768, 19 pages.
Final Office Action, dated Nov. 22, 2019, received in U.S. Appl. No. 15/339,768, 22 pages.
Notice of Allowance, dated Mar. 24, 2020, received in U.S. Appl. No. 15/339,768, 17 pages.
Office Action, dated Apr. 21, 2017, received in U.S. Appl. No. 15/432,746, 9 pages.
Office Action, dated Aug. 30, 2017, received in U.S. Appl. No. 15/432,746, 9 pages.
Final Office Action, dated Jan. 18, 2018, received in U.S. Appl. No. 15/432,746, 9 pages.
Notice of Allowance, dated Mar. 20, 2018, received in U.S. Appl. No. 15/432,746, 5 pages.
Office Action, dated Jan. 19, 2018, received in U.S. Appl. No. 14/978,655, 13 pages.
Office Action, dated Jan. 25, 2018, received in U.S. Appl. No. 15/623,322, 14 pages.
Final Office Action, dated Aug. 8, 2018, received in U.S. Appl. No. 15/623,322, 13 pages.
Office Action, dated May 2, 2019, received in U.S. Appl. No. 15/623,322, 13 pages.
Final Office Action, dated Dec. 11, 2019, received in U.S. Appl. No. 15/623,322, 17 pages.
Notice of Allowance, dated Apr. 1, 2020, received in U.S. Appl. No. 15/623,322, 8 pages.
Office Action, dated Oct. 19, 2018, received in U.S. Appl. No. 15/647,180, 12 pages.
Final Office Action, dated May 8, 2019, received in U.S. Appl. No. 15/647,180, 15 pages.
Office Action, dated Oct. 10, 2019, received in U.S. Appl. No. 15/647,180, 14 pages.
Final Office Action, dated Feb. 27, 2020, received in U.S. Appl. No. 15/647,180, 15 pages.
Office Action, dated Apr. 4, 2018, received in U.S. Appl. No. 15/786,323, 11 pages.
Final Office Action, dated Dec. 10, 2018, received in U.S. Appl. No. 15/786,323, 12 pages.
Office Action, dated May 30, 2019, received in U.S. Appl. No. 15/786,323, 13 pages.
Final Office Action, dated Dec. 11, 2019. U.S. Appl. No. 15/786,323, 17 pages.
Office Action, dated Jun. 12, 2018, received in U.S. Appl. No. 15/676,954, 10 pages.
Final Office Action, dated Mar. 1, 2019, received in U.S. Appl. No. 15/676,954, 13 pages.
Office Action, dated Jul. 8, 2019, received in U.S. Appl. No. 15/676,954, 13 pages.
Final Office Action, dated Feb. 6, 2020, received in U.S. Appl. No. 15/676,954, 12 pages.
Notice of Allowance, dated Aug. 21, 2019, received in U.S. Appl. No. 15/979,357, 21 pages.
Notice of Allowance, dated Nov. 22, 2019, received in U.S. Appl. No. 16/240,662, 12 pages.
Extended European Search Report, dated Dec. 7, 2011, received in European Patent Application No. 11184186.2, which corresponds to U.S. Appl. No. 12/566,660, 6 pages.
International Search Report and Written Opinion, dated Oct. 5, 2010, received in International Patent Application No. PCT/US2010/027118, which corresponds with U.S. Appl. No. 12/566,660, 15 pages.
International Preliminary Report on Patentability, dated Sep. 20, 2011, received in International Patent Application No. PCT/US2010/027118, which corresponds with U.S. Appl. No. 12/566,660, 10 pages.
Invitation to Pay Additional Fees, PCT Application PCT/US2010/027118, Jul. 13, 2010, 5 pages.
International Search Report and Written Opinion, dated Jun. 1, 2011, received in International Patent Application No. PCT/US2011/020404, which corresponds with U.S. Appl. No. 12/789,684, 7 pages.
International Preliminary Report on Patentability, dated Jul. 10, 2012, received in International Patent Application No. PCT/US2011/020404, which corresponds with U.S. Appl. No. 12/789,684, 5 pages.
Extended European Search Report, dated May 20, 2011, received in European Patent Application No. 11152015.1, which corresponds with U.S. Appl. No. 12/789,695, 9 pages.
International Search Report and Written Opinion, dated May 20, 2011, received in International Patent Application No. PCT/US2011/022516, which corresponds with U.S. Appl. No. 12/789,695, 13 pages.
International Preliminary Report on Patentability, dated Aug. 9, 2012, received in International Patent Application No. PCT/US2011/022516, which corresponds with U.S. Appl. No. 12/789,695, 11 pages.
International Search Report and Written Opinion, dated Dec. 13, 2011, received in International Patent Application No. U.S. Appl. No. 12/892,848, which corresponds with U.S. Appl. No. 12/892,848, 10 pages.
International Preliminary Report on Patentability, dated Dec. 14, 2012, received in International Patent Application No. PCT/US2011/039583, which corresponds with U.S. Appl. No. 12/892,848, 7 pages.
Extended European Search Report, dated Oct. 18, 2017, received in European Patent Application No. 17177247.8, which corresponds to U.S. Appl. No. 13/077,925, 11 pages.
International Search Report and Written Opinion, dated Jun. 1, 2012, received in International Patent Application No. PCT/US2011/065859, which corresponds with U.S. Appl. No. 13/077,925, 21 pages.
International Preliminary Report on Patentability, dated Jun. 25, 2013, received in International Patent Application No. PCT/US2011/065859, which corresponds with U.S. Appl. No. 13/077,925, 15 pages.
Invitation to Pay Additional Fees, PCT Application PCT/US2011/065859, Mar. 12, 2012, 5 pages.
Extended European Search Report, dated Apr. 21, 2009, received in European Patent Application No. 09154313.2, which corresponds with U.S. Appl. No. 12/042,318, 6 pages.
Extended European Search Report, dated Mar. 2, 2011, received in European Patent Application No. 11150786.9, which corresponds with U.S. Appl. No. 12/042,318, 5 pages.
Extended European Search Report, dated Mar. 1, 2011, received in European Patent Application No. 11150788.5, which corresponds with U.S. Appl. No. 12/042,318, 6 pages.
Extended European Search Report, dated Nov. 23, 2011, received in European Patent Application No. 11184167.2, which corresponds with U.S. Appl. No. 12/042,318, 6 pages.
Extended European Search Report, dated Nov. 24, 2011, received in European Patent Application No. 11184169.8, which corresponds with U.S. Appl. No. 12/042,318, 6 pages.
Extended European Search Report, dated Nov. 18, 2011, received in European Patent Application No. 11184170.6, which corresponds with U.S. Appl. No. 12/042,318, 6 pages.
Extended European Search Report, dated Nov. 18, 2011, received in European Patent Application No. 11184172.2, which corresponds with U.S. Appl. No. 12/042,318, 6 pages.

(56) References Cited

OTHER PUBLICATIONS

Extended European Search Report, dated Nov. 30, 2011, received in European Patent Application No. 11184409.8, which corresponds with U.S. Appl. No. 12/042,318, 6 pages.
Extended European Search Report, dated Jun. 5, 2012, received in European Patent Application No. 12156394.4, which corresponds with U.S. Appl. No. 12/042,318, 4 pages.
Extended European Search Report, dated Jul. 9, 2012, received in European Patent Application No. 12156395.1, which corresponds with U.S. Appl. No. 12/042,318, 8 pages.
Extended European Search Report, dated Aug. 4, 2017, received in European Patent Application No. 17158104.4, which corresponds with U.S. Appl. No. 12/042,318, 7 pages.
International Search Report and Written Opinion, dated Apr. 16, 2009, received in International Patent Application No. PCT/US2009/034772, which corresponds with U.S. Appl. No. 12/042,318, 9 pages.
International Preliminary Report on Patentability, dated Sep. 7, 2010, received in International Patent Application No. PCT/US2009/034772, which corresponds with U.S. Appl. No. 12/042,318, 7 pages.
Extended European Search Report, dated Feb. 28, 2013, received in European Patent Application No. 12188748.3, which corresponds with U.S. Appl. No. 12/042,067, 8 pages.
Extended European Search Report, dated Dec. 22, 2015, received in European Patent Application No. 15175530.3, which corresponds with U.S. Appl. No. 12/042,067, 9 pages.
International Search Report and Written Opinion, dated Jul. 3, 2009, received in International Patent Application No. PCT/US2009/035856, which corresponds with U.S. Appl. No. 12/042,067, 10 pages.
International Preliminary Report on Patentability, dated Sep. 16, 2010, received in International Patent Application No. PCT/US2009/035856, which corresponds with U.S. Appl. No. 12/042,067, 6 pages.
Extended European Search Report, dated Jan. 13, 2012, received in European Patent Application No. 11184226.6, which corresponds with U.S. Appl. No. 12/042,299, 7 pages.
Extended European Search Report, dated Jan. 13, 2012, received in European Patent Application No. 11184224.1, which corresponds with U.S. Appl. No. 12/042,299, 7 pages.
Extended European Search Report, dated Jan. 13, 2012, received in European Patent Application No. 11184223.3, which corresponds with U.S. Appl. No. 12/042,299, 4 pages.
Extended European Search Report, dated Jan. 13, 2012, received in European Patent Application No. 11184222.5, which corresponds with U.S. Appl. No. 12/042,299, 4 pages.
International Search Report and Written Opinion, dated Nov. 11, 2009, received in International Patent Application No. PCT/US2009/035874, which corresponds with U.S. Appl. No. 12/042,299, 10 pages.
International Preliminary Report on Patentability, dated Sep. 16, 2010, received in International Patent Application No. PCT/US2009/035874, which corresponds with U.S. Appl. No. 12/042,299, 7 pages.
International Search Report and Written Opinion, dated Jul. 3, 2009, received in International Patent Application No. PCT/US2009/035858, which corresponds with U.S. Appl. No. 12/042,237, 10 pages.
International Preliminary Report on Patentability, dated Sep. 7, 2010, received in International Patent Application No. PCT/US2009/035858, which corresponds with U.S. Appl. No. 12/042,237, 6 pages.
International Search Report and Written Opinion, dated Jun. 4, 2008, received in International Patent Application No. PCT/US2008/000089, which corresponds with U.S. Appl. No. 11/620,717, 10 pages.
International Preliminary Report on Patentability, dated Jul. 7, 2009, received in International Patent Application No. PCT/US2008/000089, which corresponds with U.S. Appl. No. 11/620,717, 9 pages.
International Search Report and Written Opinion, dated Apr. 22, 2008, received in International Patent Application No. PCT/US2008/000060, which corresponds with U.S. Appl. No. 11/620,717, 8 pages.
International Preliminary Report on Patentability, dated Jul. 7, 2009, received in International Patent Application No. PCT/US2008/000060, which corresponds with U.S. Appl. No. 11/620,727, 7 pages.
Extended European Search Report, dated Nov. 3, 2017, received in European Patent Application No. 17165698.6, which corresponds with U.S. Appl. No. 11/620,715, 9 pages.
International Search Report and Written Opinion, dated May 2, 2008, received in International Patent Application No. PCT/US2008/000069, which corresponds with U.S. Appl. No. 11/620,715, 12 pages.
International Preliminary Report on Patentability, dated Jul. 7, 2009, received in International Patent Application No. PCT/US2008/000069, which corresponds with U.S. Appl. No. 11/620,715, 8 pages.
International Search Report and Written Opinion, dated Dec. 4, 2014, received in International Patent Application No. PCT/US2014/040406, which corresponds with U.S. Appl. No. 14/290,931, 9 pages.
International Preliminary Report on Patentability, dated Dec. 15, 2015, received in International Patent Application No. PCT/US2014/040406, which corresponds with U.S. Appl. No. 14/290,931, 6 pages.
Office Action, dated Feb. 10, 2021, received in Indian Patent Application No. 201948009456, which corresponds with U.S. Appl. No. 12/566,660, 8 pages.
Certificate of Grant, dated Apr. 23, 2021, received in Hong Kong Patent Application No. 12101230.4, which corresponds with U.S. Appl. No. 12/789,695, 8 pages.
Patent, dated Oct. 28, 2020, received in Japanese Patent Application No. 2016-146769, which corresponds with U.S. Appl. No. 13/077,925, 3 pages.
Patent, dated Jan. 14, 2021, received in German Patent Application No. 112009000001.0, which corresponds with U.S. Appl. No. 12/042,067, 5 pages.
Decision to Grant, dated Apr. 1, 2021, received in European Patent Application No. 09700007.9, which corresponds with U.S. Appl. No. 12/042,299, 15 pages.
Intention to Grant, dated May 14, 2021, received in European Patent Application No. 14734672.0, which corresponds with U.S. Appl. No. 14/290,931, 10 pages.
Notice of Acceptance, dated Oct. 29, 2020, received in Australian Patent Application No. 2019203290, which corresponds with U.S. Appl. No. 14/171,680, 3 pages.
Grant Certificate, dated Feb. 25, 2021, received in Australian Patent Application No. 2019203290, which corresponds with U.S. Appl. No. 14/171,680, 4 pages.
Notice of Allowance, dated Oct. 28, 2020, received in U.S. Appl. No. 15/647,180, 12 pages.
Notice of Allowance, dated Nov. 25, 2020, received in U.S. Appl. No. 15/647,180, 5 pages.
Office Action, dated May 11, 2020, received in German Patent Application No. 112010001143.5, which corresponds with U.S. Appl. No. 12/566,660, 7 pages.
Certificate of Grant, dated Jul. 3, 2020, received in Hong Kong Patent Application No. 12107271.1, which corresponds with U.S. Appl. No. 12/566,660, 7 pages.
Patent, dated Apr. 23, 2020, received in Japanese Patent Application No. 2018-175226, which corresponds with U.S. Appl. No. 12/566,660, 4 pages.
Decision to Grant, dated Jul. 30, 2020, received in European Patent Application No. 11152015.1, which corresponds with U.S. Appl. No. 12/789,695, 2 pages.

(56) References Cited

OTHER PUBLICATIONS

Patent, dated Jun. 5, 2020, received in Chinese Patent Application No. 201610455059.9, which corresponds with U.S. Appl. No. 12/892,848, 6 pages.
Notice of Acceptance, dated Apr. 6, 2020, received in Australian Patent Application No. 2018211275, which corresponds with U.S. Appl. No. 13/077,925, 3 pages.
Certificate of Grant, dated Aug. 13, 2020, received in Australian Patent Application No. 2018211275, which corresponds with U.S. Appl. No. 13/077,925, 3 pages.
Office Action, dated May 4, 2020, received in European Patent Application No. 17177247.8, which corresponds with U.S. Appl. No. 13/077,925, 6 pages.
Notice of Allowance, dated Oct. 9, 2020, received in Japanese Patent Application No. 2016-146769, which corresponds with U.S. Appl. No. 13/077,925, 2 pages.
Decision to Grant, dated Jul. 30, 2020, received in European Patent Application No. 17158104.4, which corresponds with U.S. Appl. No. 12/042,318, 2 pages.
Patent, dated Aug. 26, 2020, received in European Patent Application No. 17158104.4, which corresponds with U.S. Appl. No. 12/042,318, 6 pages.
Office Action, dated May 18, 2020, received in German Patent Application No. 112009000001.0, which corresponds with U.S. Appl. No. 12/042,067, 2 pages.
Decision to Grant, dated Oct. 1, 2020, received in German Patent Application No. 112009000001.0, which corresponds with U.S. Appl. No. 12/042,067, 2 pages.
Notice of Allowance, dated Jun. 15, 2020, received in Japanese Patent Application No. 2018-200268, 5 pages.
Patent, dated Jul. 7, 2020, received in Japanese Patent Application No. 2018-200268, 3 pages.
Office Action, dated May 7, 2020, received in Chinese Patent Application No. 201510379780.X, which corresponds with U.S. Appl. No. 11/620,715, 11 pages.
Office Action, dated Apr. 16, 2020, received in Australian Patent Application No. 2019203290, which corresponds with U.S. Appl. No. 14/171,680, 4 pages.
Office action, dated Jul. 23, 2020, received in U.S. Appl. No. 16/721,746, 13 pages.
Notice of Allowance, dated Sep. 30, 2020, received in U.S. Appl. No. 16/721,746, 11 pages.
Extended European Search Report, dated Jul. 8, 2020, received in European Patent Application No. 20174181.6, which corresponds to U.S. Appl. No. 15/432,746, 6 pages.
Office Action, dated Jul. 28, 2021, received in U.S. Appl. No. 16/840,190, 18 pages.
Notice of Allowance, dated Jul. 1, 2021, received in U.S. Appl. No. 16/898,345, 17 pages.
Office Action, dated Jul. 1, 2022, received in Japanese Patent Application No. 2020-115933, which corresponds with U.S. Appl. No. 12/042,299, 1 page.
Office Action, dated Jun. 2, 2022, received in Chinese Patent Application No. 200880001855.9, which corresponds with U.S. Appl. No. 11/620,715, 2 pages.
Intent to Grant, dated May 16, 2022, received in European Patent Application No. 20174181.6, which corresponds with U.S. Appl. No. 15/432,746 (7463), 7 pages.
Notice of Allowance, dated May 17, 2022, received in U.S. Appl. No. 16/840,190, 11 pages.
Patent, dated May 26, 2022, received in Australian Patent Application No. 2020210251, which corresponds with U.S. Appl. No. 16/898,345, 3 pages.
Extended European Search Report, dated May 25, 2022, received in European Patent Application No. 21207867.9, which corresponds with U.S. Appl. No. 16/898,345, 13 pages.
Office Action, dated Oct. 25, 2021, received in European Patent Application No. 19217917.4, which corresponds with U.S. Appl. No. 12/789,695, 7 pages.
Intention to Grant, dated Sep. 13, 2021, Office Action, dated May 4, 2020, received in European Patent Application No. 17177247.8, which corresponds with U.S. Appl. No. 13/077,925, 6 pages.
Decision to Grant, dated Nov. 11, 2021, received in European Patent Application No. 17177247.8, which corresponds with U.S. Appl. No. 13/077,925, 3 pages.
Office Action, dated Oct. 27, 2021, received in Australian Patent Application No. 2020270466, which corresponds with U.S. Appl. No. 12/042,318, 4 pages.
Patent, dated Dec. 8, 2021, received in European Patent Application No. 12188748.3, which corresponds with U.S. Appl. No. 12/042,067, 5 pages.
Office Action, dated Sep. 1, 2021, received in Japanese Patent Application No. 2020-115933, which corresponds with U.S. Appl. No. 12/042,299, 1 page.
Decision to Grant, dated Oct. 7, 2021, received in European Patent Application No. 14734672.0, which corresponds with U.S. Appl. No. 14/290,931, 2 pages.
Patent, dated Nov. 3, 2021, received in European Patent Application No. 14734672.0, which corresponds with U.S. Appl. No. 14/290,931, 4 pages.
Final Office Action, dated Dec. 29, 2021, received in U.S. Appl. No. 16/840,190, 21 pages.
Extended European Search Report, dated Dec. 22, 2021, received in European Patent Application No. 21199055.1, which corresponds to U.S. Appl. No. 15/676,954, 8 pages.
Notice of Allowance, dated Mar. 4, 2022, received in U.S. Appl. No. 15/676,954, 8 pages.
Notice of Allowance, dated Apr. 27, 2022, received in U.S. Appl. No. 15/676,954, 5 pages.
Notice of Allowance, dated Jan. 25, 2022, received in Australian U.S. Appl. No. 16/898,345, which corresponds with U.S. Appl. No. 16/898,345, 3 pages.
Extended European Search Report, dated Dec. 22, 2021, received in European U.S. Appl. No. 15/676,954, which corresponds to U.S. Appl. No. 15/676,954, 8 pages.
Office Action, dated Jul. 20, 2022, received in Indian Patent Application No. 202148051151, which corresponds with U.S. Appl. No. 15/046,252, 8 pages.
Patent, dated Sep. 15, 2022, received in Australian Patent Application No. 2020270466, which corresponds with U.S. Appl. No. 12/042,318, 4 pages.
Patent, dated Jul. 25, 2022, received in European Patent Application No. 7111772, which corresponds with U.S. Appl. No. 12/042,299, 2 pages.
Decision to Grant, dated Sep. 22, 2022, received in European Patent Application No. 20174181.6, which corresponds with U.S. Appl. No. 15/432,746, 2 pages.
Patent, dated Oct. 19, 2022, received in European Patent Application No. 20174181.6, which corresponds with U.S. Appl. No. 15/432,746 (7463), 4 pages.
Office Action, dated Sep. 1, 2022, received in U.S. Appl. No. 17/138,687, 28 pages.
Office Action, dated Dec. 15, 2022, received in U.S. Appl. No. 17/515,281, 8 pages.
Office Action, dated Dec. 15, 2022, received in Australian Patent Application No. 2021290380, which corresponds with U.S. Appl. No. 17/515,281, 2 pages.
Intention to Grant, dated Jan. 31, 2023, received in European Patent Application No. 19217917.4, which corresponds with U.S. Appl. No. 12/789,695, 7 pages.
Decision to Grant, dated Jun. 9, 2023, received in European Patent Application No. 19217917.4, which corresponds with U.S. Appl. No. 12/789,695, 7 pages.
Patent, dated Aug. 21, 2020, received in Hong Kong Patent Application No. 13113557.3, which corresponds with U.S. Appl. No. 12/042,067, 8 pages.
Patent, dated Jan. 25, 2019, received in Hong Kong Patent Application No. 14111484.4, which corresponds with U.S. Appl. No. 12/042,299, 6 pages.
Notice of Allowance, dated Apr. 12, 2023, received in U.S. Appl. No. 17/138,687, 9 pages.

(56) References Cited

OTHER PUBLICATIONS

Notice of Allowance, dated Apr. 26, 2023, received in U.S. Appl. No. 17/515,281, 11 pages.
Office Action, dated Jun. 8, 2023, received in U.S. Appl. No. 17/716,975, 14 pages.
Office Action, dated Jul. 6, 2023, received in U.S. Appl. No. 17/945,962, 20 pages.
Patent, dated Jan. 1, 2024, received in Indian Patent Application No. 201948009456, which corresponds with U.S. Appl. No. 12/566,660, 3 pages.
Patent, dated Jul. 5, 2023, received in European Patent Application No. 19217917.4, which corresponds with U.S. Appl. No. 12/789,695, 4 pages.
Office Action, dated Aug. 8, 2023, received in Chinese Patent Application No. 201910452791.4, which corresponds with U.S. Appl. No. 15/676,954, 4 pages.
Notice of Allowance, dated Dec. 16, 2023, received in Chinese Patent Application No. 201910452791.4, which corresponds with U.S. Appl. No. 15/676,954, 2 pages.
Patent, dated Feb. 23, 2024, received in Chinese Patent Application No. 201910452791.4, which corresponds with U.S. Appl. No. 15/676,954, 6 pages.
Office Action, dated Jan. 29, 2024, received in European Patent Application No. 21199055.1, which corresponds with U.S. Appl. No. 15/676,954, 10 pages.
Intent to Grant, dated Nov. 29, 2023, received in European Patent Application No. 21207867.9, which corresponds with U.S. Appl. No. 16/898,345, 9 pages.
Notice of Allowance, dated Dec. 1, 2023, received in Australian Patent Application No. 2021290380, which corresponds with U.S. Appl. No. 17/515,281, 3 pages.
Final Office Action, dated Jan. 5, 2024, received in U.S. Appl. No. 17/716,975, 19 pages.
Office Action, dated Mar. 6, 2024, received in U.S. Appl. No. 17/898,378, 14 pages.
Notice of Allowance, dated Nov. 2, 2023, received in U.S. Appl. No. 17/945,962, 10 pages.
Decision to Grant, dated Jun. 6, 2024, received in European Patent Application No. 15175530.3, which corresponds with U.S. Appl. No. 12/042,237, 2 pages.
Decision to Grant, dated Apr. 5, 2024, received in European Patent Application No. 21207867.9, which corresponds with U.S. Appl. No. 16/898,345, 3 pages.
Patent, dated May 1, 2024, received in European Patent Application No. 21207867.9, which corresponds with U.S. Appl. No. 16/898,345, 4 pages.
Intention to Grant, dated Jun. 19, 2024, received in European Patent Application No. 10712825.8, which corresponds with U.S. Appl. No. 12/566,660, 6 pages.

* cited by examiner

600

602 — At an electronic device having one or more event sensors and configured to execute a software application that includes a plurality of views and an application state of the software application

604 — Display one or more views of the plurality of views. A respective view of the one or more displayed views includes one or more gesture recognizers.

606 — Assign a respective delegate to the respective gesture recognizer.

608 — The one or more displayed views include a plurality of gesture recognizers. Assign distinct delegates to at least a subset of the plurality of gesture recognizers.

610 — Detect one or more events.

612 — Process a respective event of the one or more events using the respective gesture recognizer. The processing of the respective event includes
processing the respective event at the respective gesture recognizer in accordance with a respective gesture definition corresponding to the respective gesture recognizer, executing the corresponding delegate to determine one or more values in accordance with the application state, and conditionally sending information corresponding to the respective event to the software application in accordance with an outcome of the processing of the respective event by the respective gesture recognizer and in accordance with the one or more values determined by the corresponding delegate.

614 — Execute the software application in accordance with information, received from the respective gesture recognizer, corresponding to the respective event.

616 — The one or more event sensors include a touch sensitive surface configured to detect one or more touches. The one or more events include the one or more touches. Processing the respective event comprises processing a respective touch.

Figure 6A

The one or more event sensors include a touch sensitive surface configured to detect one or more touches. The one or more events include the one or more touches. Processing the respective event comprises processing a respective touch. ⟶ 616

Conditionally receive the respective touch at the respective gesture recognizer in accordance with the one or more values determined by the corresponding delegate. ⟶ 618

Processing the respective touch includes the respective gesture recognizer disregarding the respective touch when the one or more values determined by the corresponding delegate matches predefined touch disregard criteria. ⟶ 620

Processing the respective touch includes blocking the respective gesture recognizer from receiving the respective touch when the one or more values determined by the corresponding delegate match predefined touch disregard criteria. ⟶ 622

Processing the respective touch at the respective gesture recognizer includes, when the detected touch is consistent with the respective gesture definition, enabling a corresponding state transition in the respective gesture recognizer when the state transition is enabled by the corresponding delegate. ⟶ 624

Processing the respective touch at the respective gesture recognizer includes, when the detected touch is consistent with the respective gesture definition, conditionally enabling a corresponding state transition in the respective gesture recognizer when the state transition is enabled by the corresponding delegate ⟶ 626

Processing the respective touch at the respective gesture recognizer includes simultaneously processing the gesture at a second gesture recognizer in accordance with one or more values determined by a delegate corresponding to the second gesture recognizer. ⟶ 628

Processing the respective touch at the respective gesture recognizer includes simultaneously processing the gesture at a second gesture recognizer in accordance with one or more values determined by the delegate corresponding to the respective gesture recognizer. ⟶ 630

702 — At an electronic device having a touch-sensitive surface and configured to execute a software application that includes a plurality of views and an application state of the software application 704 — Display one or more views of the plurality of views. A respective view of the one or more displayed views includes one or more gesture recognizers. A respective gesture recognizer has a corresponding delegate.

706 — Detect one or more touches, on the touch-sensitive surface, having a touch position that falls within one or more of the displayed views.

708 — Process a respective touch of the one or more touches.

710 — Execute the delegate corresponding to the respective gesture recognizer to obtain a receive touch value in accordance with the application state.
When the receive touch value meets predefined criteria, process the respective touch at the respective gesture recognizer.
Conditionally send information corresponding to the respective touch to the software application.

712 — The plurality of views include a plurality of gesture recognizers. Assign distinct delegates to at least a subset of the plurality of gesture recognizers. Processing the respective touch of the one or more touches includes: identifying a set of candidate gesture recognizers of the plurality of gesture recognizers; for each candidate gesture recognizer having a corresponding delegate, executing the delegate to obtain a receive touch value in accordance with the application state; identifying one or more receiving gesture recognizers in accordance with the obtained receive touch values; and processing the respective touch at each gesture recognizer of the one or more of receiving gesture recognizers. The one or more receiving gesture recognizers comprise a subset of the candidate gesture recognizers.

7B (See Figure 7B)

716 — Execute the software application in accordance with information, received from the respective gesture recognizer, corresponding to the respective touch.

Processing the respective touch at each gesture recognizer of the one or more receiving gesture recognizers includes processing the respective touch at a respective receiving gesture recognizer having a corresponding delegate in accordance with a respective gesture definition corresponding to the respective gesture recognizer, executing the delegate to determine one or more values in accordance with the application state, and conditionally sending information corresponding to the respective touch to the software application in accordance with an outcome of the processing of the respective touch by the respective gesture recognizer and in accordance with the one or more values determined by the delegate.
Execute the software application in accordance with information, received from one or more of the receiving gesture recognizers, corresponding to one or more of the touches. — 718

Processing the respective touch at the respective receiving gesture recognizer includes, when the detected touch is consistent with the respective gesture definition, enabling a corresponding state transition in the respective gesture recognizer when the state transition is enabled by the corresponding delegate — 720

Processing the respective touch at the respective receiving gesture recognizer includes, when the detected touch is consistent with the respective gesture definition, conditionally enabling a corresponding state transition in the respective gesture recognizer when the state transition is enabled by the corresponding delegate — 722

Processing the respective touch at the respective receiving gesture recognizer includes simultaneously processing the gesture at a second gesture recognizer in accordance with one or more values determined by the delegate corresponding to the second gesture recognizer — 724

Processing the respective touch at the respective receiving gesture recognizer includes simultaneously processing the gesture at a second gesture recognizer in accordance with one or more values determined by the delegate corresponding to the respective gesture recognizer. — 726

At an electronic device having a touch-sensitive surface and configured to execute a software application — 802

> Display one or more views of the software application. The one or more displayed views include a plurality of gesture recognizers. The plurality of gesture recognizers include at least one discrete gesture recognizer, and at least one continuous gesture recognizer. — 804
>
>> The discrete gesture recognizer is configured to send a single action message in response to a respective gesture. The continuous gesture recognizer is configured to send action messages at successive recognized sub-events of a respective recognized gesture. — 806

Detect one or more touches. — 808

Process each of the touches using one or more of the gesture recognizers. — 810

> The processing of a respective touch includes processing the respective touch at a respective gesture recognizer in accordance with a respective gesture definition corresponding to the respective gesture recognizer, and conditionally sending one or more respective action messages to the software application in accordance with an outcome of the processing of the respective touch at the respective gesture recognizer. — 812
>
>> The software application has an application state. Conditionally sending the one or more respective action messages includes conditionally sending the one or more respective action messages further in accordance with the application state of the software application. — 814

Execute the software application in accordance with one or more action messages received from one or more of the gesture recognizers corresponding to one or more of the touches — 816

> Request additional information from the respective gesture recognizer. Executing the software application includes executing the software application further in accordance with the additional information. — 818
>
>> The additional information includes the number and locations of respective touches processed at the respective gesture recognizer. — 820

Figure 8A

Display one or more views of the software application. The one or more displayed views include a plurality of gesture recognizers. The plurality of gesture recognizers include at least one discrete gesture recognizer, and at least one continuous gesture recognizer. — 804

Each gesture recognizer has a set of gesture recognizer states. — 822

The discrete gesture recognizer has a first set of gesture recognizer states including: a gesture possible state, corresponding to an initial state of the discrete gesture recognizer; a gesture recognized state, corresponding to recognition of the respective gesture; and a gesture failed state, corresponding to failure of the discrete gesture recognizer to recognize the one or more touches as the respective gesture. — 824

The continuous gesture recognizer has a second set of gesture recognizer states including: a gesture possible state; a gesture began state, corresponding to initial recognition of the respective gesture; a gesture changed state, corresponding to a respective change in location of the respective touch; a gesture ended state, corresponding to completion of the respective recognized gesture; a gesture canceled state, corresponding to interruption of the recognition of the respective gesture; and a gesture failed state, corresponding to failure of the continuous gesture recognizer to recognize the one or more touches as the respective gesture.

The gesture recognized state and the gesture ended state have an identical gesture recognizer state value. — 826

The at least one discrete gesture recognizer includes: one or more of a tap gesture recognizer, and a swipe gesture recognizer. The at least one continuous gesture recognizer includes: one or more of a long press gesture recognizer, a pinch gesture recognizer, a pan gesture recognizer, a rotate gesture recognizer, and a transform gesture recognizer. — 828

The at least one discrete gesture recognizer includes: a tap gesture recognizer, and a swipe gesture recognizer. The at least one continuous gesture recognizer includes: a long press gesture recognizer, a pinch gesture recognizer, a pan gesture recognizer, a rotate gesture recognizer, and a transform gesture recognizer. — 830

Figure 8B

GESTURE RECOGNIZERS WITH DELEGATES FOR CONTROLLING AND MODIFYING GESTURE RECOGNITION

RELATED APPLICATIONS

This application is a continuation of U.S. patent application Ser. No. 15/623,322, filed Jun. 14, 2017, which is a continuation of U.S. patent application Ser. No. 12/789,695, filed May 28, 2010, now U.S. Pat. No. 9,684,521, which claims priority to U.S. Provisional Application Ser. No. 61/298,531, filed Jan. 26, 2010, entitled "Gesture Recognizers with Delegates for Controlling and Modifying Gesture Recognition," each of which is incorporated herein by reference in its entirety.

This relates to the following application, which is hereby incorporated by reference: U.S. patent application Ser. No. 12/566,660, "Event Recognition," filed Sep. 24, 2009, now U.S. Pat. No. 8,285,499, which in turn claims priority to U.S. Provisional Patent Application No. 61/210,332, "Event Recognition," filed on Mar. 16, 2009, which are incorporated herein by reference in their entirety.

TECHNICAL FIELD

This relates generally to user interface processing, including but not limited to, apparatuses and methods for recognizing gesture inputs.

BACKGROUND

An electronic device typically includes a user interface that may be used to interact with the computing device. The user interface may include a display and/or input devices such as a keyboard, mice, and touch-sensitive surfaces for interacting with various aspects of the user interface. In some devices with a touch-sensitive surface as an input device, a first set of touch-based gestures (e.g., two or more of: tap, double tap, horizontal swipe, vertical swipe, pinch, depinch, two finger swipe) are recognized as proper inputs in a particular context (e.g., in a particular mode of a first application), and other, different sets of touch-based gestures are recognized as proper inputs in other contexts (e.g., different applications and/or different modes or contexts within the first application). As a result, the software and logic required for recognizing and responding to touch-based gestures can become complex, and can require revision each time an application is updated or a new application is added to the computing device. These and similar issues may arise in user interfaces that utilize input sources other than touch-based gestures.

Thus, it would be desirable to have a comprehensive framework or mechanism for recognizing touch-based gestures and events, as well as gestures and events from other input sources, that is easily adaptable to virtually all contexts or modes of all application programs on a computing device, and that requires little or no revision when an application is updated or a new application is added to the computing device.

SUMMARY

To address the aforementioned drawbacks, in accordance with some embodiments, a method is performed at an electronic device having one or more event sensors and configured to execute a software application that includes a plurality of views and an application state of the software application. The method includes displaying one or more views of the plurality of views. A respective view of the one or more displayed views includes one or more gesture recognizers, and a respective gesture recognizer has a corresponding delegate. The method includes detecting one or more events, and processing a respective event of the one or more events using the respective gesture recognizer. The processing of the respective event includes: processing the respective event at the respective gesture recognizer in accordance with a respective gesture definition corresponding to the respective gesture recognizer, executing the respective gesture recognizer's corresponding delegate to determine one or more values in accordance with the application state, and conditionally sending information corresponding to the respective event to the software application in accordance with an outcome of the processing of the respective event by the respective gesture recognizer and in accordance with the one or more values determined by the corresponding delegate. The method furthermore includes executing the software application in accordance with information, received from the respective gesture recognizer, corresponding to the respective event.

In accordance with some embodiments, an electronic device includes: one or more event sensors for detecting events, one or more processors, memory, and one or more programs stored in the memory and configured to be executed by the one or more processors. The one or more programs include a software application having a plurality of views and an application state. The software application includes instructions for displaying one or more views of the plurality of views. A respective view of the one or more displayed views includes one or more gesture recognizers, and a respective gesture recognizer has a corresponding delegate. The software application further includes instructions for processing a respective event of the detected events using the respective gesture recognizer. The instructions for processing of the respective event include instructions for: processing the respective event at the respective gesture recognizer in accordance with a respective gesture definition corresponding to the respective gesture recognizer, executing the corresponding delegate to determine one or more values in accordance with the application state, and conditionally sending information corresponding to the respective event to the software application in accordance with an outcome of the processing of the respective event by the respective gesture recognizer and in accordance with the one or more values determined by the corresponding delegate. The software application furthermore includes instructions for executing the software application in accordance with information, received from the respective gesture recognizer, corresponding to the respective event.

In accordance with some embodiments, a computer readable storage medium stores one or more programs for execution by one of more processors of an electronic device having one or more event sensors for detecting events. The one or more programs include a software application including a plurality of views and an application state of the software application. The software application includes instructions for displaying one or more views of the plurality of views. A respective view of the one or more displayed views includes one or more respective gesture recognizers, and a respective gesture recognizer has a corresponding delegate. The software application further includes instructions for processing a respective event of the detected events using the respective gesture recognizer. The instructions for processing of the respective event include instructions for: processing the respective event at the respective gesture recognizer in accordance with a respective gesture definition corresponding to the respective gesture recognizer, executing the corresponding delegate to determine one or more values in accordance with the application state, and conditionally sending information corresponding to the respective event to the software application in accordance with an outcome of the processing of the respective event by the respective gesture recognizer and in accordance with the one or more values determined by the corresponding delegate. The software application furthermore includes instructions for executing the software application in accordance with information, received from the respective gesture recognizer, corresponding to the respective event.

In accordance with some embodiments, a method is performed at an electronic device having a touch-sensitive surface and configured to execute a software application that includes a plurality of views and an application state of the software application. The method includes displaying one or more views of the plurality of views. A respective view of the one or more displayed views includes a respective gesture recognizer. The respective gesture recognizer has a corresponding delegate. The method also includes detecting one or more touches, on the touch-sensitive surface, having a touch position that falls within one or more of the displayed views. The method further includes processing a respective touch of the one or more touches. Processing the respective touch includes executing the delegate corresponding to the respective gesture recognizer to obtain a receive touch value in accordance with the application state, and when the receive touch value meets predefined criteria, processing the respective touch at the respective gesture recognizer. Processing the respective touch also includes conditionally sending information corresponding to the respective touch to the software application. The method furthermore includes executing the software application in accordance with information, received from the respective gesture recognizer, corresponding to the respective touch.

In accordance with some embodiments, an electronic device includes a touch-sensitive surface, one or more processors, memory, and one or more programs stored in the memory and configured to be executed by the one or more processors. The one or more programs include a software application including a plurality of views and an application state of the software application. The software application includes instructions for displaying one or more views of the plurality of views. A respective view of the one or more displayed views includes a respective gesture recognizer. The respective gesture recognizer has a corresponding delegate. The software application also includes instructions for detecting one or more touches, on the touch-sensitive surface, having a touch position that falls within one or more of the displayed views. The software application further includes instructions for processing a respective touch of the one or more touches. The instructions for processing the respective touch include instructions for: executing the delegate corresponding to the respective gesture recognizer to obtain a receive touch value in accordance with the application state, and when the receive touch value meets predefined criteria, processing the respective touch at the respective gesture recognizer. The instructions for processing the respective touch also include instructions for conditionally sending information corresponding to the respective touch to the software application. The software application furthermore includes instructions for executing the software application in accordance with information, received from the respective gesture recognizer, corresponding to the respective touch.

In accordance with some embodiments, a computer readable storage medium stores one or more programs for execution by one of more processors of an electronic device having a touch-sensitive surface. The one or more programs include a software application including a plurality of views and an application state of the software application. The software application includes instructions for displaying one or more views of the plurality of views. A respective view of the one or more displayed views includes a respective gesture recognizer. The respective gesture recognizer has a corresponding delegate. The software application also includes instructions for detecting one or more touches, on the touch-sensitive surface, having a touch position that falls within one or more of the displayed views. The software application further includes instructions for processing a respective touch of the one or more touches. The instructions for processing the respective touch include instructions for: executing the delegate corresponding to the respective gesture recognizer to obtain a receive touch value in accordance with the application state, and when the receive touch value meets predefined criteria, processing the respective touch at the respective gesture recognizer. The instructions for processing the respective touch also include instructions for conditionally sending information corresponding to the respective touch to the software application. The software application furthermore includes instructions for executing the software application in accordance with information, received from the respective gesture recognizer, corresponding to the respective touch.

In accordance with some embodiments, a method is performed at an electronic device having a touch-sensitive surface and configured to execute a software application. The method includes displaying one or more views of the software application. The one or more displayed views include a plurality of gesture recognizers. The plurality of gesture recognizers includes at least one discrete gesture recognizer and at least one continuous gesture recognizer. The discrete gesture recognizer is configured to send a single action message in response to a respective gesture, and the continuous gesture recognizer is configured to send action messages at successive recognized sub-events of a respective recognized gesture. The method also includes detecting one or more touches, and processing each of the touches using one or more of the gesture recognizers. The processing of a respective touch includes processing the respective touch at a respective gesture recognizer in accordance with a respective gesture definition corresponding to the respective gesture recognizer, and conditionally sending one or more respective action messages to the software application in accordance with an outcome of the processing of the respective touch at the respective gesture recognizer. The method further includes executing the software application in accordance with one or more action messages received from one or more of the gesture recognizers corresponding to one or more of the touches.

In accordance with some embodiments, an electronic device includes a touch-sensitive surface, one or more processors, memory, and one or more programs stored in the memory and configured to be executed by the one or more processors. The one or more programs include a software application, and the software application includes instructions for displaying one or more views of the software application. The one or more displayed views include a plurality of gesture recognizers. The plurality of gesture recognizers includes at least one discrete gesture recognizer and at least one continuous gesture recognizer. The discrete gesture recognizer is configured to send a single action message in response to a respective gesture, and the continuous gesture recognizer is configured to send action messages at successive recognized sub-events of a respective recognized gesture. The software application also includes instructions for detecting one or more touches and processing each of the touches using one or more of the gesture recognizers. The instructions for processing of a respective touch include instructions for: processing the respective touch at a respective gesture recognizer in accordance with a respective gesture definition corresponding to the respective gesture recognizer, and conditionally sending one or more respective action messages to the software application in accordance with an outcome of the processing of the respective touch at the respective gesture recognizer. The software application further includes instructions for executing the software application in accordance with one or more action messages received from one or more of the gesture recognizers corresponding to one or more of the touches.

In accordance with some embodiments, a computer readable storage medium stores one or more programs for execution by one of more processors of an electronic device having a touch-sensitive surface. The one or more programs include a software application, and the software application includes instructions for displaying one or more views of the software application. The one or more displayed views include a plurality of gesture recognizers. The plurality of gesture recognizers includes at least one discrete gesture recognizer, and at least one continuous gesture recognizer. The discrete gesture recognizer is configured to send a single action message in response to a respective gesture, and the continuous gesture recognizer is configured to send action messages at successive recognized sub-events of a respective recognized gesture. The software application also includes instructions for: detecting one or more touches, and processing each of the touches using one or more of the gesture recognizers. The instructions for the processing of a respective touch includes instructions for processing the respective touch at a respective gesture recognizer in accordance with a respective gesture definition corresponding to the respective gesture recognizer, and conditionally sending one or more respective action messages to the software application in accordance with an outcome of the processing of the respective touch at the respective gesture recognizer. The software application further includes instructions for executing the software application in accordance with one or more action messages received from one or more of the gesture recognizers corresponding to one or more of the touches.

BRIEF DESCRIPTION OF THE DRAWINGS

FIGS. 6A-6B are flow charts illustrating an exemplary method of processing a respective event in accordance with information obtained from a delegate, according to some embodiments.

FIGS. 7A-7B are flow charts illustrating an exemplary method of processing a respective touch in accordance with a receive touch value obtained from a delegate, according to some embodiments.

FIGS. 8A-8B are flow charts illustrating an exemplary method of processing a respective touch in a software application including a discrete gesture recognizer and a continuous gesture recognizer, according to some embodiments.

Like reference numerals refer to corresponding parts throughout the drawings.

DESCRIPTION OF EMBODIMENTS

Figure 1A:
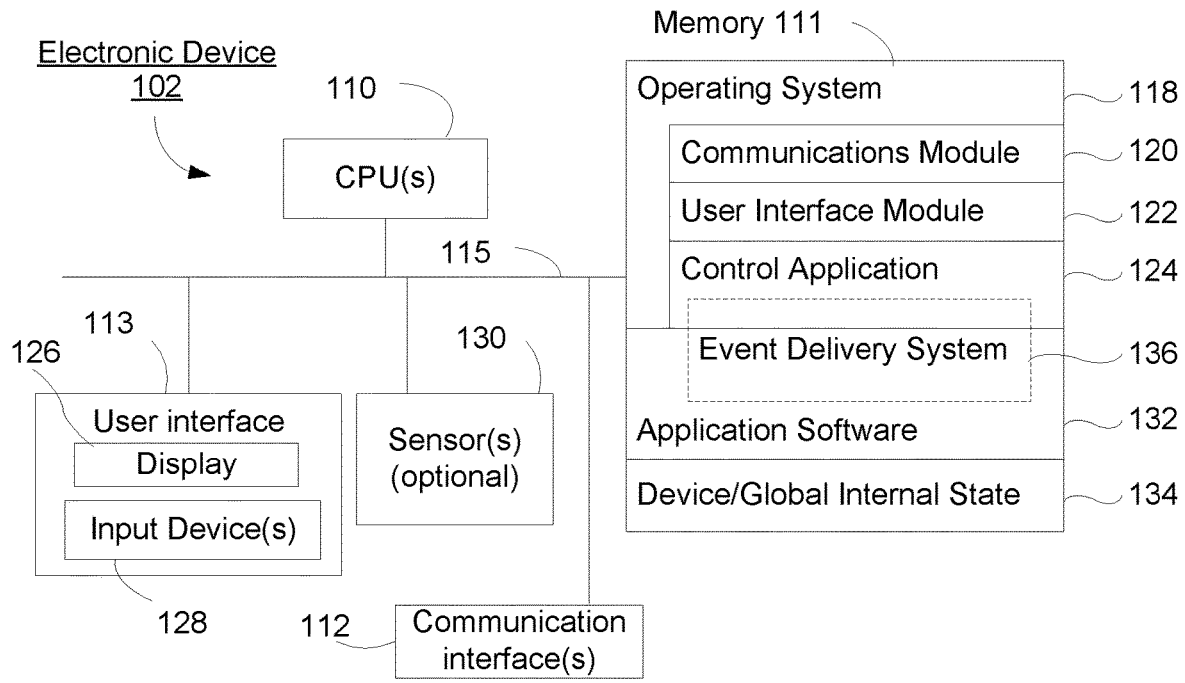
FIGS. 1A and 1B are block diagrams illustrating electronic devices, according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "event" refers to an input detected by one or more sensors of the device. In particular, the term "event" includes a touch on a touch-sensitive surface. An event comprises one or more sub-events. Sub-events typically refer to changes to an event (e.g., a touch-down, touch-move, and lift-off of the touch can be sub-events). Sub-events in the sequence of one or more sub-events can include many forms, including without limitation, key presses, key press holds, key press releases, button presses, button press holds, button press releases, joystick movements, mouse movements, mouse button presses, mouse button releases, pen stylus touches, pen stylus movements, pen stylus releases, oral instructions, detected eye movements, biometric inputs, and detected physiological changes in a user, among others. Since an event may comprise a single sub-event (e.g., a short lateral motion of the device), the term "sub-event" as used herein also refers to an event.

As used herein, the terms "event recognizer" and "gesture recognizer" are used interchangeably to refer to a recognizer that can recognize a gesture or other events (e.g., motion of the device).

As noted above, in some devices with a touch-sensitive surface as an input device, a first set of touch-based gestures (e.g., two or more of: tap, double tap, horizontal swipe, vertical swipe) are recognized as proper inputs in a particular context (e.g., in a particular mode of a first application), and other, different sets of touch-based gestures are recognized as proper inputs in other contexts (e.g., different applications and/or different modes or contexts within the first application). Furthermore, two or more proper inputs (or gestures) may interfere with, or conflict with, each other (e.g., after detecting a single tap, it needs to be decided whether to recognize the single tap as a complete single tap gesture, or as part of a double tap gesture). As a result, the software and logic required for recognizing and responding to touch-based gestures can become complex, and can require revision each time an application is updated or a new application is added to the computing device.

When using touch-based gestures to control an application running in a device having a touch-sensitive surface, touches have both temporal and spatial aspects. The temporal aspect, called a phase, indicates when a touch has just begun, whether it is moving or stationary, and when it ends—that is, when the finger is lifted from the screen. A spatial aspect of a touch is the set of views or user interface windows in which the touch occurs. The views or windows in which a touch is detected may correspond to programmatic levels within a view hierarchy. For example, the lowest level view in which a touch is detected may be called the hit view, and the set of events that are recognized as proper inputs may be determined based, at least in part, on the hit view of the initial touch that begins a touch-based gesture.

Figure 1B:
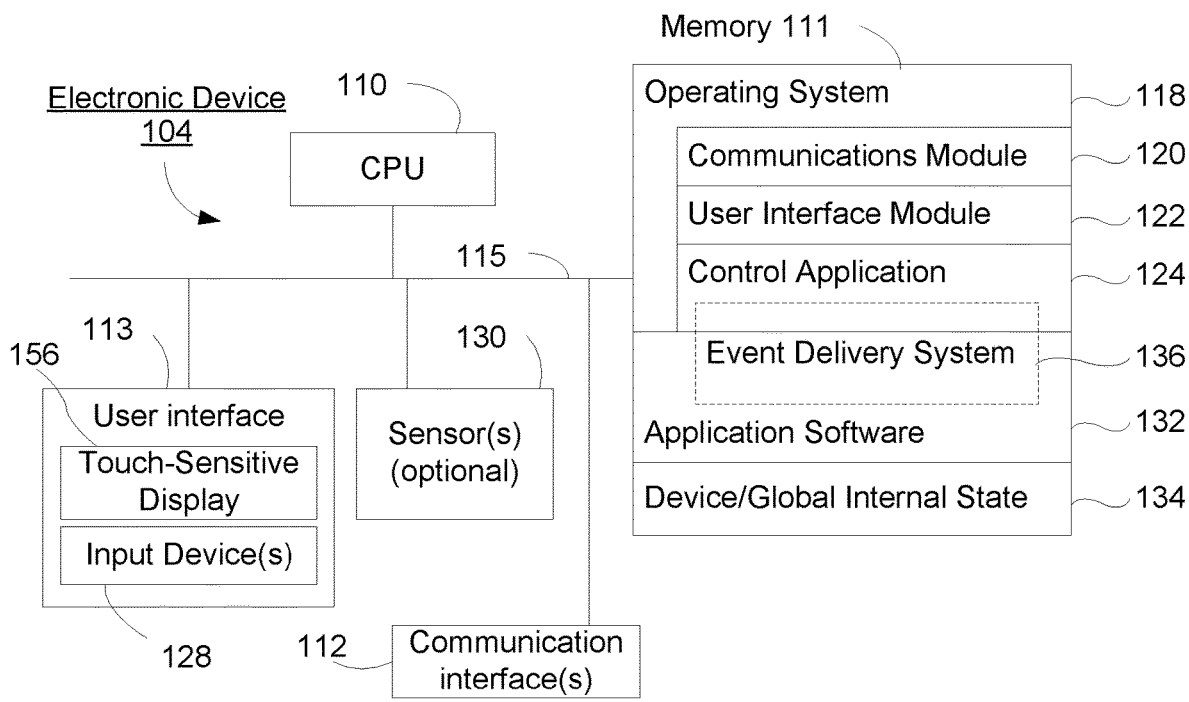

FIGS. 1A and 1B are block diagrams illustrating different embodiments of an electronic device 102, 104, according to some embodiments. The electronic device 102 or 104 may be any electronic device including, but not limited to, a desktop computer system, a laptop computer system, a netbook computer system, mobile phone, a smart phone, a personal digital assistant, or a navigation system. The electronic device may also be a portable electronic device with a touch screen display (e.g., touch-sensitive display 156, FIG. 1B) configured to present a user interface, a computer with a touch screen display configured to present a user interface, a computer with a touch sensitive surface and a display configured to present a user interface, or any other form of computing device, including without limitation, consumer electronic devices, mobile telephones, video game systems, electronic music players, tablet PCs, electronic book reading systems, e-books, PDAs, electronic organizers, email devices, laptops, netbooks or other computers, kiosk computers, vending machines, smart appliances, etc. The electronic device 102 or 104 includes a user interface 113.

In some embodiments, electronic device 104 includes a touch screen display. In these embodiments, user interface 113 may include an on-screen keyboard (not depicted) that is used by a user to interact with electronic devices 102 and 104. Alternatively, a keyboard may be separate and distinct from electronic device 104 (or electronic device 102). For example, a keyboard may be a wired or wireless keyboard coupled to electronic device 102 or 104.

In some embodiments, electronic device 102 includes display 126 and one or more input devices 128 (e.g., keyboard, mouse, trackball, microphone, physical button(s), touchpad, etc.) that are coupled to electronic device 102. In these embodiments, one or more of input devices 128 may optionally be separate and distinct from electronic device 102. For example, the one or more input devices may include one or more of: a keyboard, a mouse, a trackpad, a trackball, and an electronic pen, any of which may optionally be separate from the electronic device. Optionally, device 102 or 104 may include one or more sensors 130, such as one or more accelerometers, gyroscopes, GPS systems, speakers, infrared (IR) sensors, biometric sensors, cameras, etc. It is noted that the description above of various exemplary devices as input devices 128 or as sensors 130 is of no significance to the operation of the embodiments described herein, and that any input or sensor device herein described as an input device may equally well be described as a sensor, and vice versa. In some embodiments, signals produced by one or more sensors 130 are used as input sources for detecting events.

In some embodiments, electronic device 104 includes touch-sensitive display 156 (i.e., a display having a touch-sensitive surface) and one or more input devices 128 that are coupled to electronic device 104. In some embodiments, touch-sensitive display 156 has the ability to detect two or more distinct, concurrent (or partially concurrent) touches, and in these embodiments, display 156 is sometimes herein called a multitouch display or multitouch-sensitive display.

In some embodiments of electronic device 102 or 104 discussed herein, input devices 128 are disposed in electronic device 102 or 104. In other embodiments, one or more of input devices 128 is separate and distinct from electronic device 102 or 104; for example, one or more of input devices 128 may be coupled to electronic device 102 or 104 by a cable (e.g., USB cable) or wireless connection (e.g., Bluetooth connection).

When using input devices 128, or when performing a touch-based gesture on touch-sensitive display 156 of electronic device 104, the user generates a sequence of sub-events that are processed by one or more CPUs 110 of electronic device 102 or 104. In some embodiments, one or more CPUs 110 of electronic device 102 or 104 process the sequence of sub-events to recognize events.

Electronic device 102 or 104 typically includes one or more single- or multi-core processing units ("CPU" or "CPUs") 110 as well as one or more network or other communications interfaces 112, respectively. Electronic device 102 or 104 includes memory 111 and one or more communication buses 115, respectively, for interconnecting these components. Communication buses 115 may include circuitry (sometimes called a chipset) that interconnects and controls communications between system components (not depicted herein). As discussed briefly above, electronic device 102 or 104 includes a user interface 113, including a display (e.g., display 126, or touch-sensitive display 156). Further, electronic device 102 or 104 typically includes input devices 128 (e.g., keyboard, mouse, touch sensitive surfaces, keypads, etc.). In some embodiments, the input devices 128 include an on-screen input device (e.g., a touch-sensitive surface of a display device). Memory 111 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 111 may optionally include one or more storage devices remotely located from the CPU(s) 110. Memory 111, or alternately the non-volatile memory device(s) within memory 111, comprise a computer readable storage medium. In some embodiments, memory 111 (of electronic device 102 or 104) or the computer readable storage medium of memory 111 stores the following programs, modules and data structures, or a subset thereof:

operating system 118, which includes procedures for handling various basic system services and for performing hardware dependent tasks;

communication module 120, which is used for connecting electronic device 102 or 104, respectively, to other devices via their one or more respective communication interfaces 112 (wired or wireless) and one or more communication networks, such as the Internet, other wide area networks, local area networks, metropolitan area networks, and so on;

user interface module 122, which is used for displaying user interfaces including user interface objects on display 126 or touch-sensitive display 156;

control application 124, which is used for controlling processes (e.g., hit view determination, thread management, and/or event monitoring, etc.); in some embodiments, control application 124 includes a run-time application; in other embodiments, the run-time application includes control application 124;

event delivery system 136, which may be implemented in various alternate embodiments within operating system 118 or in application software 132; in some embodiments, however, some aspects of event delivery system 136 may be implemented in operating system 118 while other aspects (e.g., at least a subset of event handlers) are implemented in application software 132;

application software 132, which may include one or more software applications (e.g., an email application, a web browser application, a text messaging application, etc.); a respective software application typically has, at least when executing, an application state, indicating the state of the software application and its components (e.g., gesture recognizers and delegates); see application internal state 317 (FIG. 3B), described below; and device/global internal state 134, which includes one or more of: application state, indicating the state of software applications and their components (e.g., gesture recognizers and delegates); display state, indicating what applications, views or other information occupy various regions of touch-sensitive display 156 or display 126; sensor state, including information obtained from the device's various sensors 130, input devices 128, and/or touch-sensitive display 156; and location information concerning the device's location and/or attitude.

Each of the above identified elements may be stored in one or more of the previously mentioned memory devices, and corresponds to a set of instructions for performing functions described herein. The set of instructions can be executed by one or more processors (e.g., one or more CPUs 110). The above identified modules or programs (i.e., sets of instructions) need not be implemented as separate software programs, procedures or modules, and thus various subsets of these modules may be combined or otherwise rearranged in various embodiments. In some embodiments, memory 111 may store a subset of the modules and data structures identified above. Furthermore, memory 111 may store additional modules and data structures not described above.

Figure 2:
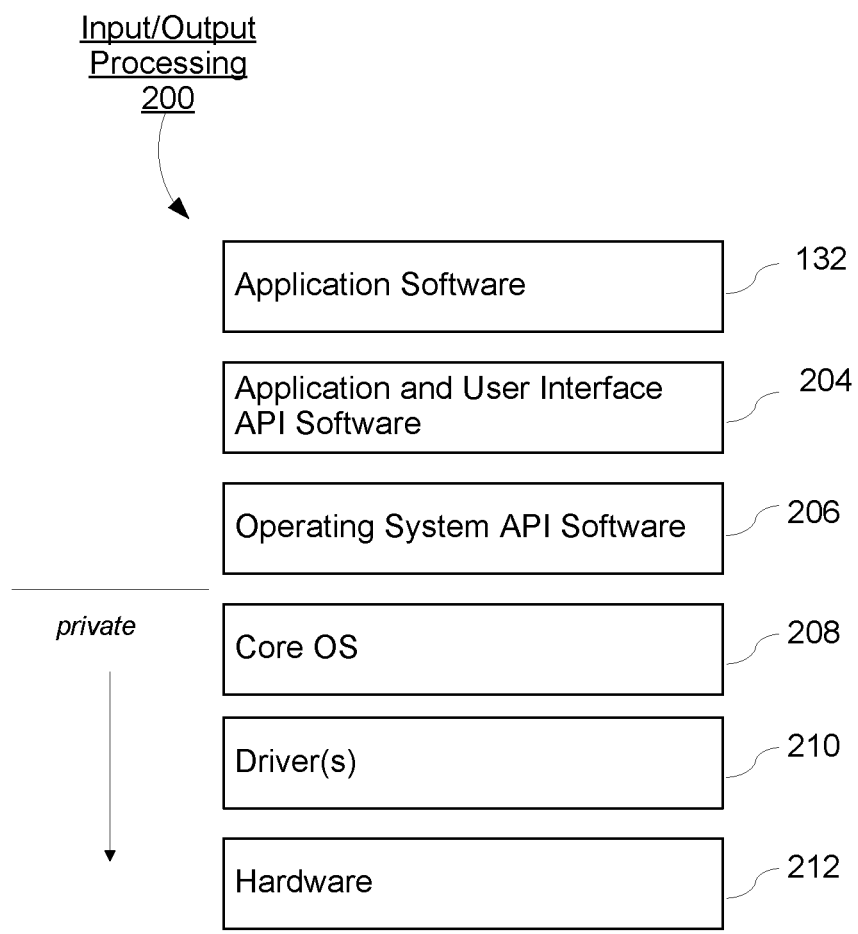
FIG. 2 is a diagram of an input/output processing stack of an exemplary electronic device according to some embodiments.

FIG. 2 is a diagram of input/output processing stack 200 of an exemplary electronic device or apparatus (e.g., device 102 or 104) according to some embodiments of the invention. Hardware (e.g., electronic circuitry) 212 of the device is at the base level of the input/output processing stack 200. Hardware 212 can include various hardware interface components, such as the components depicted in FIGS. 1A and/or 1B. Hardware 212 can also include one or more of above mentioned sensors 130. All the other elements (132, 204-210) of input/output processing stack 200 are software procedures, or portions of software procedures, that process inputs received from hardware 212 and generate various outputs that are presented through a hardware user interface (e.g., one or more of a display, speakers, device vibration actuator).

A driver or a set of drivers 210 communicates with hardware 212. Drivers 210 can receive and process input data received from hardware 212. Core Operating System ("OS") 208 can communicate with driver(s) 210. Core OS 208 can process raw input data received from driver(s) 210. In some embodiments, drivers 210 can be considered to be a part of core OS 208.

A set of OS application programming interfaces ("OS APIs") 206, are software procedures that communicate with core OS 208. In some embodiments, APIs 206 are included in the device's operating system, but at a level above core OS 208. APIs 206 are designed for use by applications running on the electronic devices or apparatuses discussed herein. User interface (UI) APIs 204 can utilize OS APIs 206. Application software ("applications") 132 running on the device can utilize UI APIs 204 in order to communicate with the user. UI APIs 204 can, in turn, communicate with lower level elements, ultimately communicating with various user interface hardware, e.g., multitouch display 156.

While each layer input/output processing stack 200 can utilize the layer underneath it, that is not always required. For example, in some embodiments, applications 132 can occasionally communicate with OS APIs 206. In general, layers at or above OS API layer 206 may not directly access Core OS 208, driver(s) 210, or hardware 212, as these layers are considered private. Applications in layer 132 and UI API 204 usually direct calls to the OS API 206, which in turn, accesses the layers Core OS 208, driver(s) 210, and hardware 212.

Stated in another way, one or more hardware elements 212 of electronic device 102 or 104, and software running on the device, such as, for example, drivers 210 (depicted in FIG. 2), core OS (operating system) 208 (depicted in FIG. 2), operating system API software 206 (depicted in FIG. 2), and Application and User Interface API software 204 (depicted in FIG. 2) detect input events (which may correspond to sub-events in a gesture) at one or more of the input device(s) 128 and/or a touch-sensitive display 156 and generate or update various data structures (stored in memory of device 102 or 104) used by a set of currently active event recognizers to determine whether and when the input events correspond to an event to be delivered to application 132. Embodiments of event recognition methodologies, apparatus and computer program products are described in more detail below.

Figure 3A:
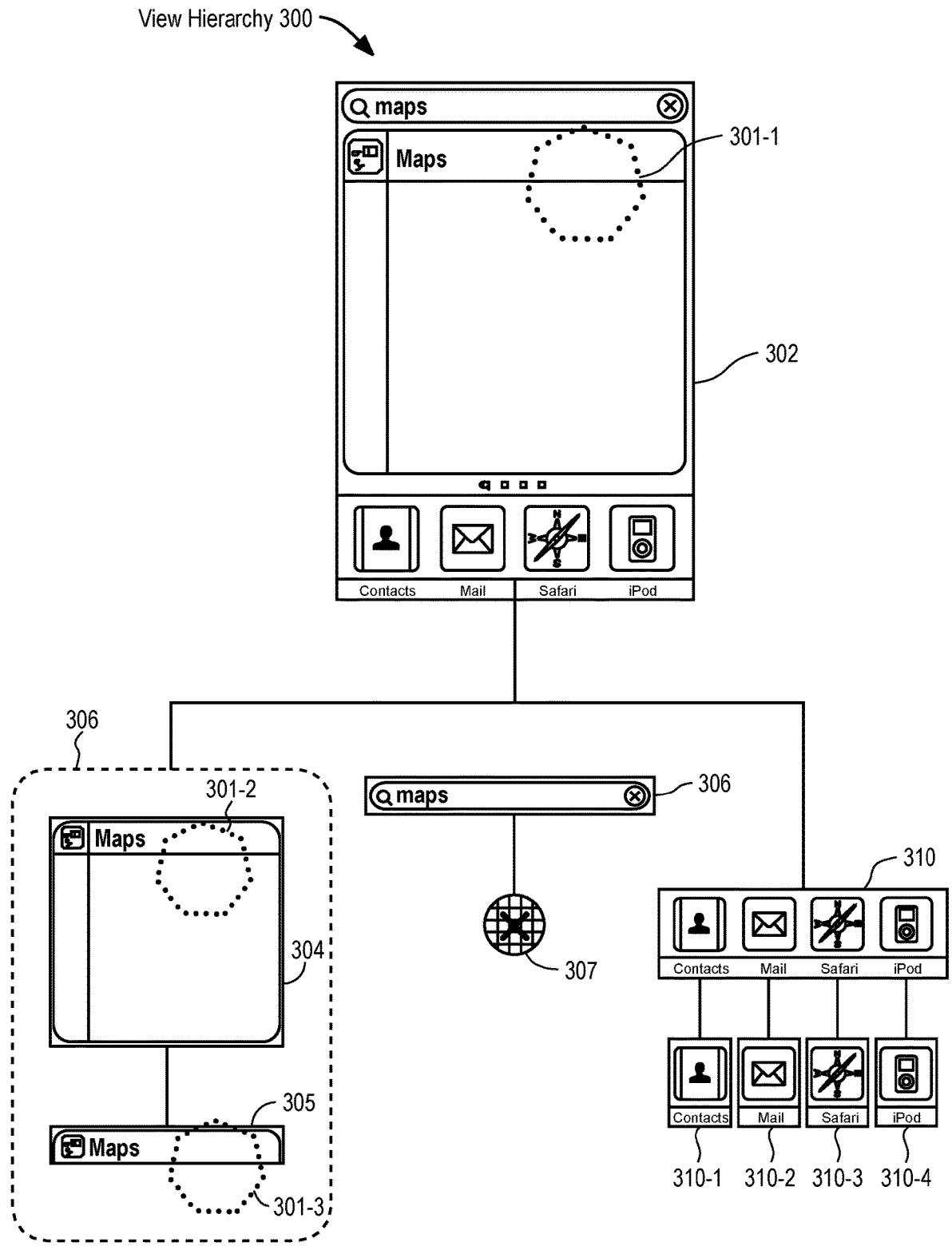
FIG. 3A illustrates an exemplary view hierarchy, according to some embodiments.

FIG. 3A depicts an exemplary view hierarchy 300, which in this example is a search program displayed in outermost view 302. Outermost view 302 generally encompasses the entire user interface a user may directly interact with, and includes subordinate views, e.g., search results panel 304, which groups search results and can be scrolled vertically;

search field 306, which accepts text inputs; and a home row 310, which groups applications for quick access.

In this example, each subordinate view includes lower-level subordinate views. In other examples, the number of view levels in the hierarchy 300 may differ in different branches of the hierarchy, with one or more subordinate views having lower-level subordinate views, and one or more other subordinate views not have any such lower-level subordinate views. Continuing with the example shown in FIG. 3A, search results panel 304 contains separate subordinate views 305 (subordinate to panel 304) for each search result. Here, this example shows one search result in a subordinate view called the maps view 305. Search field 306 includes a subordinate view herein called clear contents icon view 307, which clears the contents of the search field when a user performs a particular action (e.g., a single touch or tap gesture) on the clear contents icon in view 307. Home row 310 includes subordinate views 310-1, 310-2, 310-3, and 310-4, which respectively correspond to a contacts application, an email application, a web browser, and an iPod music interface.

A touch sub-event 301-1 is represented in outermost view 302. Given the location of touch sub-event 301-1 over both the search results panel 304, and maps view 305, the touch sub-event is also represented over those views as 301-2 and 301-3, respectively. Actively involved views of the touch sub-event include the views search results panel 304, maps view 305 and outermost view 302. Additional information regarding sub-event delivery and actively involved views is provided below with reference to FIGS. 3B and 3C.

Views (and corresponding programmatic levels) can be nested. In other words, a view can include other views. Consequently, the software element(s) (e.g., event recognizers) associated with a first view can include or be linked to one or more software elements associated with views within the first view. While some views can be associated with applications, others can be associated with high level OS elements, such as graphical user interfaces, window managers, etc.

Figure 3B:
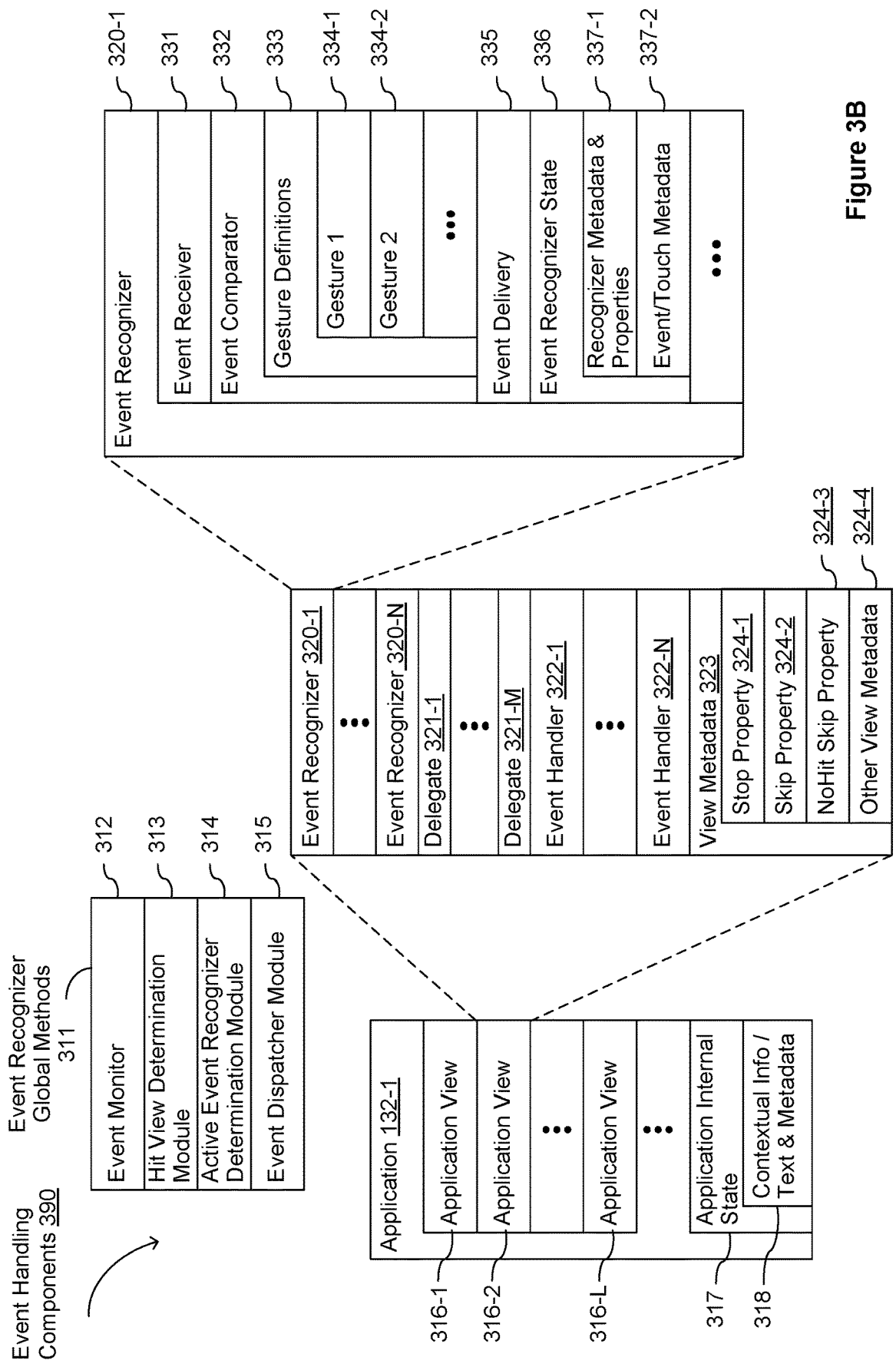
FIG. 3B is a block diagram illustrating exemplary components for event handling in accordance with some embodiments.

FIG. 3B is a block diagram illustrating exemplary components for event handling (e.g., event handling components 390) in accordance with some embodiments. In some embodiments, memory 111 (in FIGS. 1A and 1B) includes event recognizer global methods 311 (e.g., in operating system 118) and a respective application 132-1.

In some embodiments, event recognizer global methods 311 include event monitor 312, hit view determination module 313, active event recognizer determination module 314, and event dispatcher module 315. In some embodiments, event recognizer global methods 311 are located within event delivery system 136. In some embodiments, event recognizer global methods 311 are implemented in operating system 118. Alternatively, event recognizer global methods 311 are implemented in application 132-1. In yet other embodiments, event recognizer global methods 311 are implemented as a stand-alone module, or a part of another module stored in memory 111 (e.g., a contact/motion module (not depicted)).

Event monitor 312 receives event information from sensors 130, touch-sensitive display 156, and/or input devices 128. Event information includes information about an event (e.g., a user touch on touch-sensitive display 156, as part of a multi-touch gesture or a motion of device 102 or 104) and/or a sub-event (e.g., a movement of a touch across touch-sensitive display 156). For example, event information for a touch event includes one or more of: a location and time stamp of a touch. Similarly, event information for a swipe event includes two or more of: a location, time stamp, direction, and speed of a swipe. Sensors 130, touch-sensitive display 156, and input devices 128 transmit information event and sub-event information to event monitor 312 either directly or through a peripherals interface, which retrieves and stores event information. Sensors 130 include one or more of: proximity sensor, accelerometer(s), gyroscopes, microphone, and video camera. In some embodiments, sensors 130 also include input devices 128 and/or touch-sensitive display 156.

In some embodiments, event monitor 312 sends requests to sensors 130 and/or the peripherals interface at predetermined intervals. In response, sensors 130 and/or the peripherals interface transmit event information. In other embodiments, sensors 130 and the peripheral interface transmit event information only when there is a significant event (e.g., receiving an input beyond a predetermined noise threshold and/or for more than a predetermined duration).

Event monitor 312 receives event information and determines the application 132-1 and application view 316-2 of application 132-1 to which to deliver the event information.

In some embodiments, event recognizer global methods 311 also include a hit view determination module 313 and/or an active event recognizer determination module 314.

Hit view determination module 313 provides software procedures for determining where an event or a sub-event has taken place within one or more views, when touch-sensitive display 156 displays more than one view. Views are made up of controls and other elements that a user can see on the display.

Another aspect of the user interface associated with an application 132-1 is a set views 316, sometimes herein called application views or user interface windows, in which information is displayed and touch-based gestures occur. The application views (of a respective application) in which a touch is detected may correspond to a particular view within a view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 313 receives information related to events and/or sub-events. When an application has multiple views organized in a hierarchy, hit view determination module 313 identifies a hit view as the lowest view in the hierarchy which should handle the event or sub-event. In most circumstances, the hit view is the lowest level view in which an initiating event or sub-event occurs (i.e., the first event or sub-event in the sequence of events and/or sub-events that form a gesture). Once the hit view is identified by the hit view determination module, the hit view typically receives all events and/or sub-events related to the same touch or input source for which it was identified as the hit view.

Active event recognizer determination module 314 determines which view or views within a view hierarchy should receive a particular sequence of events and/or sub-events. In some application contexts, active event recognizer determination module 314 determines that only the hit view should receive a particular sequence of events and/or sub-events. In other application contexts, active event recognizer determination module 314 determines that all views that include the physical location of an event or sub-event are actively involved views, and therefore determines that all actively involved views should receive a particular sequence of events and/or sub-events. In other application contexts, even if touch events and/or sub-events are entirely confined to the area associated with one particular view, views higher in the hierarchy still remain as actively involved views.

Event dispatcher module 315 dispatches the event information to an event recognizer (also called herein "gesture recognizer") (e.g., event recognizer 320-1). In embodiments including active event recognizer determination module 314, event dispatcher module 315 delivers the event information to an event recognizer determined by active event recognizer determination module 314. In some embodiments, event dispatcher module 315 stores in an event queue the event information, which is retrieved by a respective event recognizer 320 (or event receiver 331 in a respective event recognizer 320).

In some embodiments, application 132-1 includes application internal state 317, which indicates the current application view(s) displayed on touch-sensitive display 156 when the application is active or executing. In some embodiments, device/global internal state 134 is used by event recognizer global methods 311 to determine which application(s) is(are) currently active, and application internal state 317 is used by event recognizer global methods 311 to determine application views 316 to which to deliver event information.

In some embodiments, application internal state 317 includes additional information (e.g., 344, FIG. 3C), such as one or more of: resume information to be used when application 132-1 resumes execution, user interface state information that indicates information being displayed or that is ready for display by application 132-1, a state queue for enabling the user to go back to a prior state or view of application 132-1, and a redo/undo queue of previous actions taken by the user. In some embodiments, application internal state 317 further includes contextual information/text and metadata 318.

In some embodiments, application 132-1 includes one or more application views 316, each of which includes instructions for handling touch events that occur within a respective view of the application's user interface. At least one application view 316 of the application 132-1 includes one or more event recognizers 320 and one or more event handlers 322. Typically, a respective application view 316 includes a plurality of event recognizers 320 and a plurality of event handlers 322. In other embodiments, one or more of event recognizers 320 are part of a separate module, such as a user interface kit (not shown) or a higher level object from which application 132-1 inherits methods and other properties. In some embodiments, a respective application view 316 also includes one or more of: data updater, object updater, GUI updater, and/or event data received.

A respective event recognizer 320-1 receives event information from event dispatcher module 315, and identifies an event from the event information. Event recognizer 320-1 includes event receiver 331 and event comparator 332.

The event information includes information about an event (e.g., a touch) or a sub-event (e.g., a touch movement). Depending on the event or sub-event, the event information also includes additional information, such as location of the event or sub-event. When the event or sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 332 compares the event information to one or more predefined gesture definitions (also called herein "event definitions") and, based on the comparison, determines an event or sub-event, or determines or updates the state of an event or sub-event. In some embodiments, event comparator 332 includes one or more gesture definitions 333 (as described above, also called herein "event definitions"). Gesture definitions 333 contain definitions of gestures (e.g., predefined sequences of events and/or sub-events), for example, gesture 1 (334-1), gesture 2 (334-2), and others. In some embodiments, sub-events in gesture definitions 333 include, for example, touch begin, touch end, touch movement, touch cancellation, and multiple touching. In one example, the definition for gesture 1 (334-1) is a double tap on a displayed object. The double tap, for example, comprises a first touch (touch begin) on the displayed object for a predetermined phase of the gesture, a first lift-off (touch end) for a next predetermined phase of the gesture, a second touch (touch begin) on the displayed object for a subsequent predetermined phase of the gesture, and a second lift-off (touch end) for a final predetermined phase of the gesture. In another example, the definition for gesture 2 (334-2) is a dragging on a displayed object. The dragging, for example, comprises a touch (or contact) on the displayed object, a movement of the touch across touch-sensitive display 156, and lift-off of the touch (touch end).

In some embodiments, event recognizer 320-1 also includes information for event delivery 335. Information for event delivery 335 includes references to corresponding event handlers 322. Optionally, information for event delivery 335 includes action-target pair(s). In some embodiments, in response to recognizing a gesture (or a part of a gesture), event information (e.g., action message(s)) is sent to one or more targets identified by the action-target pair(s). In other embodiments, in response to recognizing a gesture (or a part of a gesture), the action-target pair(s) are activated.

In some embodiments, gesture definitions 333 include a definition of a gesture for a respective user-interface object. In some embodiments, event comparator 332 performs a hit test to determine which user-interface object is associated with a sub-event. For example, in an application view in which three user-interface objects are displayed on touch-sensitive display 156, when a touch is detected on touch-sensitive display 156, event comparator 332 performs a hit test to determine which of the three user-interface objects, if any, is associated with the touch (event). If each displayed object is associated with a respective event handler 322, event comparator 332 uses the result of the hit test to determine which event handler 322 should be activated. For example, event comparator 332 selects an event handler 322 associated with the event and the object triggering the hit test.

In some embodiments, the definition for a respective gesture 333 also includes delayed actions that delay delivery of the event information until after it has been determined whether the sequence of events and/or sub-events does or does not correspond to the event recognizer's event type.

When a respective event recognizer 320-1 determines that the series of events and/or sub-events do not match any of the events in gesture definitions 333, the respective event recognizer 320-1 enters an event failed state, after which the respective event recognizer 320-1 disregards subsequent events and/or sub-events of the touch-based gesture. In this situation, other event recognizers, if any, that remain active for the hit view continue to track and process events and/or sub-events of an ongoing touch-based gesture.

In some embodiments, a respective event recognizer 320-1 includes event recognizer state 336. Event recognizer state 336 includes a state of the respective event recognizer 320-1. Examples of event recognizer states are described in more detail below with reference to FIGS. 4A-4D.

In some embodiments, event recognizer state 336 includes recognizer metadata and properties 337-1. In some embodiments, recognizer metadata and properties 337-1 include one or more of the following: A) configurable properties, flags, and/or lists that indicate how the event delivery system should perform event and/or sub-event delivery to actively involved event recognizers; B) configurable properties, flags, and/or lists that indicate how event recognizers interact with one another; C) configurable properties, flags, and/or lists that indicate how event recognizers receive event information; D) configurable properties, flags, and/or lists that indicate how event recognizers may recognize a gesture; E) configurable properties, flags, and/or lists that indicate whether events and/or sub-events are delivered to varying levels in the view hierarchy; and F) references to corresponding event handlers 322.

In some embodiments, event recognizer state 336 includes event/touch metadata 337-2. Event/touch metadata 337-2 includes event/touch information about a respective event/touch that has been detected and corresponds to gesture definitions 333. The event/touch information includes one or more of: a location, time stamp, speed, direction, distance, scale (or change in scale), and angle (or change in angle) of the respective event/touch.

In some embodiments, a respective application view includes one or more delegates 321. A respective delegate 321 is assigned to a respective event recognizer 320. Alternately, a respective event recognizer 320 has a corresponding delegate 321, but the delegate 321 is not necessarily assigned to the respective recognizer 320 at a runtime, and instead the delegate for an event recognizer may be established prior to execution of the application (e.g., the delegate for an event recognizer may be indicated by the delegate property of an application view, established when the corresponding applicative view 316 is initialized). In some embodiments, some event recognizers do not have an assigned (or corresponding) delegate. Event recognizers lacking corresponding delegates perform in accordance with default rules, such as default rules governing event recognition exclusivity. In some embodiments, some event recognizers have multiple assigned (or corresponding) delegates. Delegates modify the behavior of the corresponding event recognizer, and can also be used to coordinate the behavior of multiple event recognizers. In some embodiments described below, a delegate, when assigned to a respective event recognizer, modifies multiple aspects of the behavior of the respective event recognizer.

In some embodiments, a respective event recognizer 320 activates event handler 322 associated with the respective event recognizer 320 when one or more particular events and/or sub-events of a gesture are recognized. In some embodiments, respective event recognizer 320 delivers event information associated with the event to event handler 322.

Event handler 322, when activated, performs one or more of: creating and/or updating data, creating and updating objects, and preparing display information and sending it for display on display 126 or touch-sensitive display 156.

In some embodiments, a respective application view 316-2 includes view metadata 323. View metadata 323 include data regarding a view. Optionally, view metadata includes the following properties, which influence event and/or sub-event delivery to event recognizers:

stop property 324-1, which, when set for a view prevents event and/or sub-event delivery to event recognizers associated with the view as well as its ancestors in the view hierarchy;

skip property 324-2, which, when set for a view prevents event and/or sub-event delivery to event recognizers associated with that view, but permits event and/or sub-event delivery to its ancestors in the view hierarchy;

NoHit skip property 324-3, which, when set for a view, prevents delivery of events and/or sub-events to event recognizers associated with the view unless the view is the hit view; as discussed above, the hit view determination module 313 identifies a hit-view as the lowest view in the hierarchy which should handle the sub-event; and other view metadata 324-4.

In some embodiments, a first actively involved view within the view hierarchy may be configured to prevent delivery of a respective sub-event to event recognizers associated with that first actively involved view. This behavior can implement the skip property 324-2. When the skip property is set for an application view, delivery of the respective sub-event is still performed for event recognizers associated with other actively involved views in the view hierarchy.

Alternately, a first actively involved view within the view hierarchy may be configured to prevent delivery of a respective sub-event to event recognizers associated with that first actively involved view unless the first actively involved view is the hit view. This behavior can implement the conditional NoHit skip property 324-3.

In some embodiments, a second actively involved view within the view hierarchy is configured to prevent delivery of the respective sub-event to event recognizers associated with the second actively involved view and to event recognizers associated with ancestors of the second actively involved view. This behavior can implement the stop property 324-1.

It shall be understood that the foregoing discussion regarding event handling of user touches on touch-sensitive displays also applies to other forms of user inputs to operate electronic device 102 or 104 with input-devices, not all of which are initiated on touch screens, e.g., coordinating mouse movement and mouse button presses with or without single or multiple keyboard presses or holds, user movements, taps, drags, scrolls, etc., on touch-pads, pen stylus inputs, movement (e.g., rotation) of the device, oral instructions, detected eye movements, biometric inputs, and/or any combination thereof, which may be utilized as inputs corresponding to events and/or sub-events which define a gesture to be recognized.

Figure 3C:
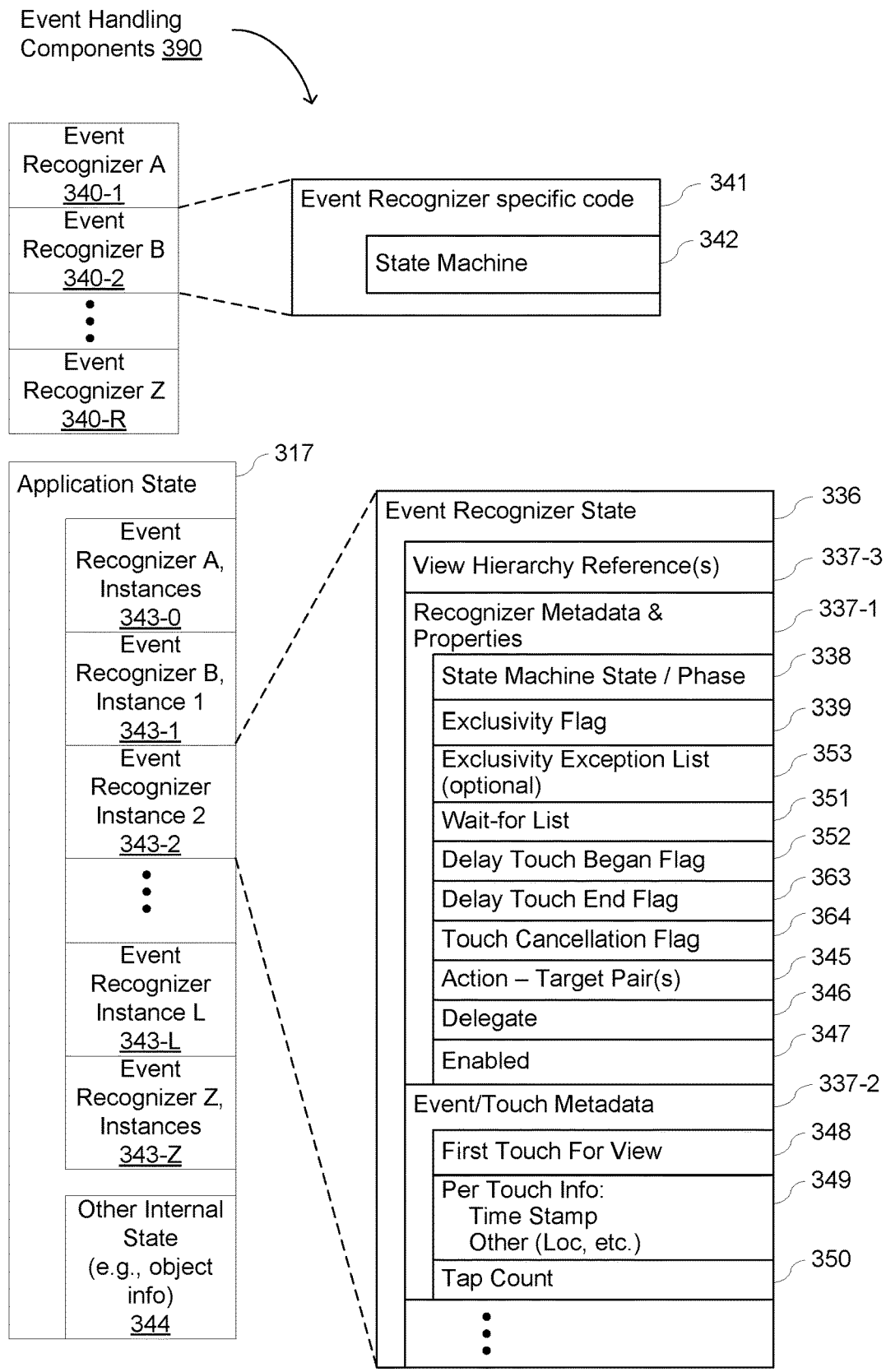
FIG. 3C is a block diagram illustrating exemplary classes and instances of gesture recognizers in accordance with some embodiments.

FIG. 3C is a block diagram illustrating exemplary classes and instances of gesture recognizers (e.g., event handling components 390) in accordance with some embodiments.

A software application (e.g., application 132-1) has one or more event recognizers 340. In some embodiments, a respective event recognizer (e.g., 340-2) is an event recognizer class. The respective event recognizer (e.g., 340-2) includes event recognizer specific code 341 (e.g., a set of instructions defining the operation of event recognizers) and state machine 342.

In some embodiments, application state 317 of a software application (e.g., application 132-1) includes instances of event recognizers. Each instance of an event recognizer is an object having a state (e.g., event recognizer state 336). "Execution" of a respective event recognizer instance is implemented by executing corresponding event recognizer specific code (e.g., 341) and updating or maintaining the state 336 of the event recognizer instance 343. The state 336 of event recognizer instance 343 includes the state 338 of the event recognizer instance's state machine 342.

In some embodiments, application state 317 includes a plurality of event recognizer instances 343, each corresponding to an event recognizer that has been bound (also called "attached") to a view of the application. In some embodiments, application state 317 includes a plurality of instances (e.g., 343-1 to 343-L) of a respective event recognizer (e.g., 340-2). In some embodiments, application state 317 includes instances 343 of a plurality of event recognizers (e.g., 340-1 to 340-R).

In some embodiments, a respective instance 343-2 of a gesture recognizer includes event recognizer state 336. As discussed above, event recognizer state 336 includes recognizer metadata and properties 337-1 and event/touch metadata 337-2. Event recognizer state 336 also includes view hierarchy reference(s) 337-3, indicating to which view the respective instance 343-2 of the gesture recognizer is attached.

Figure 4A:
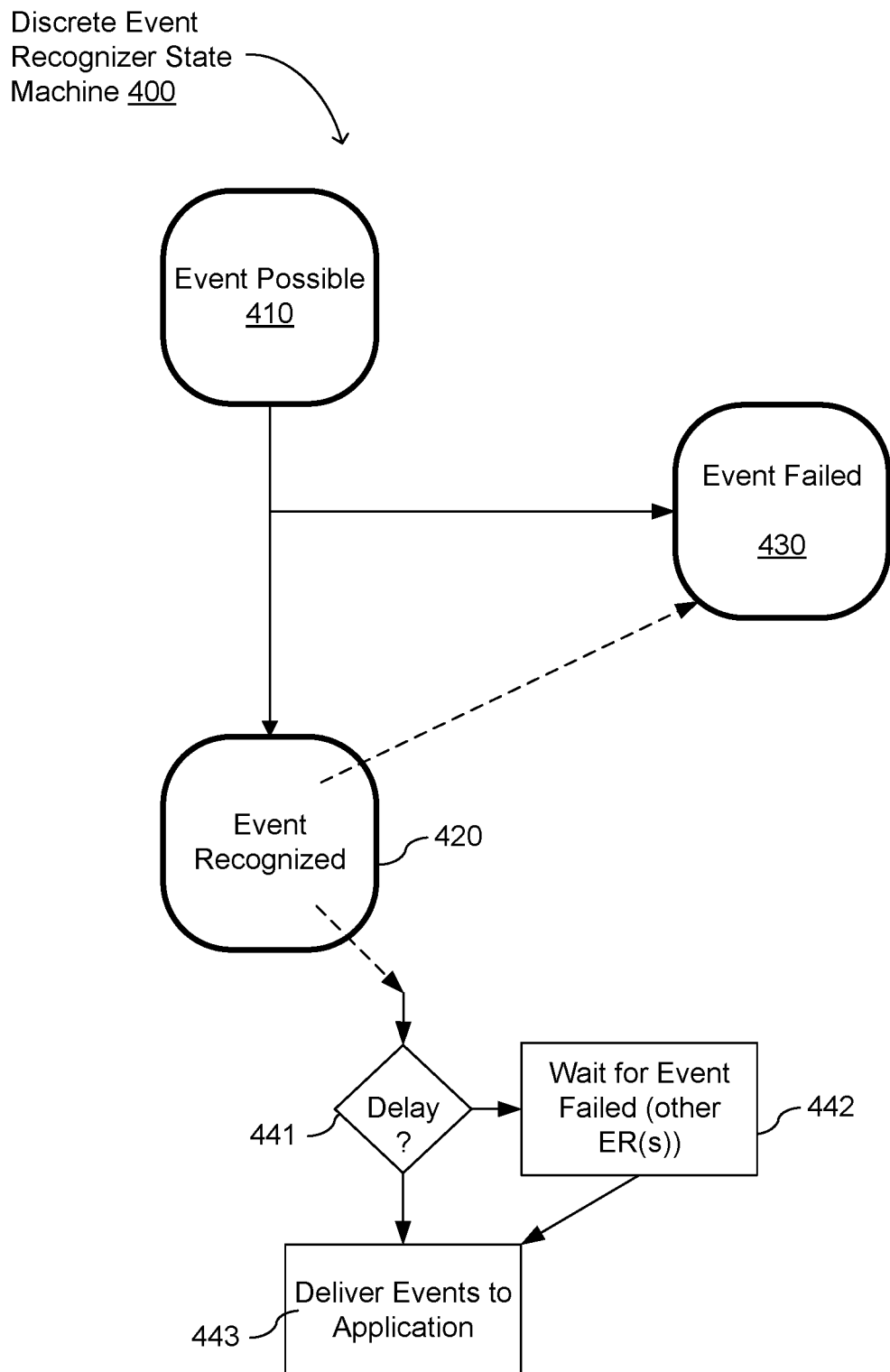
FIGS. 4A-4D are flow charts illustrating exemplary state machines, according to some embodiments.
Figure 4B:
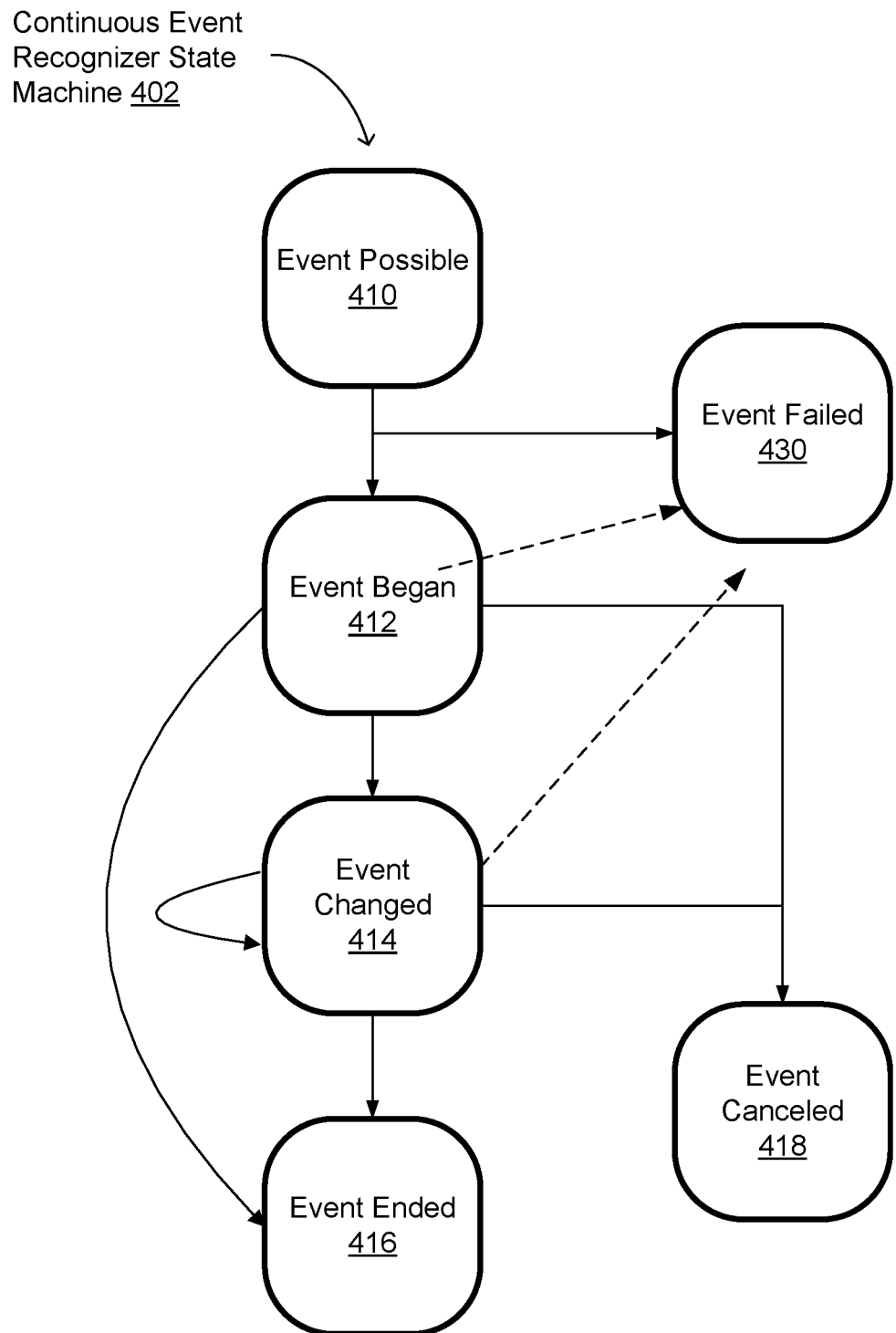

In some embodiments, recognizer metadata and properties 337-1 include the following, or a subset or superset thereof:

exclusivity flag 339, which, when set for an event recognizer, indicates that upon recognition of a gesture by the event recognizer, the event delivery system should stop delivering events and/or sub-events to any other event recognizers of the actively involved views (with the exception of any other event recognizers listed in an exception list 353); when receipt of an event or sub-event causes a particular event recognizer to enter the exclusive state, as indicated by its corresponding exclusivity flag 339, then subsequent events and/or sub-events are delivered only to the event recognizer in the exclusive state (as well as any other event recognizers listed in an exception list 353);

exclusivity exception list 353; when included in the event recognizer state 336 for a respective event recognizer, this list 353 indicates the set of event recognizers, if any, that are to continue receiving events and/or sub-events even after the respective event recognizer has entered the exclusive state; for example, if the event recognizer for a single tap event enters the exclusive state, and the currently involved views include an event recognizer for a double tap event, then the list 353 would list the double tap event recognizer so that a double tap event can be recognized even after a single tap event has been detected. Accordingly, the exclusivity exception list 353 permits event recognizers to recognize different gestures that share common sequences of events and/or sub-events, e.g., a single tap gesture recognition does not preclude subsequent recognition of a double or triple tap gesture by other event recognizers;

wait-for list 351; when included in the event recognizer state 336 for a respective event recognizer, this list 351 indicates the set of event recognizers, if any, that must enter the event failed or event canceled state before the respective event recognizer can recognize a respective event; in effect, the listed event recognizers have higher priority for recognizing an event than the event recognizer with the wait-for list 351;

delay touch began flag 352, which, when set for an event recognizer, causes the event recognizer to delay sending events and/or sub-events (including a touch begin or finger down sub-event, and subsequent events) to the event recognizer's respective hit view until after it has been determined that the sequence of events and/or sub-events does not correspond to this event recognizer's gesture type; this flag can be used to prevent the hit view from ever seeing any of the events and/or sub-events in the case where the gesture is recognized; when the event recognizer fails to recognize a gesture, the touch began sub-event (and subsequent touch end sub-event) can be delivered to the hit view; in one example, delivering such sub-events to the hit view causes the user interface to briefly highlight an object, without invoking the action associated with that object;

delay touch end flag 363, which, when set for an event recognizer, causes the event recognizer to delay sending a sub-event (e.g., a touch end sub-event) to the event recognizer's respective hit view or level until it has been determined that the sequence of sub-events does not correspond to this event recognizer's event type; this can be used to prevent the hit view from acting upon a touch end sub-event, in case the gesture is recognized late; as long as the touch end sub-event is not sent, a touch canceled can be sent to the hit view or level; if an event is recognized, the corresponding action by an application is preformed, and the touch end sub-event is delivered to the hit view or level; and touch cancellation flag 364, which, when set for an event recognizer, causes the event recognizer to send touch or input cancellation to the event recognizer's respective hit view when it has been determined that the sequence of events and/or sub-events does not correspond to this event recognizer's gesture type; the touch or input cancellation sent to the hit view indicates that a prior event and/or sub-event (e.g., a touch began sub-event) has been cancelled; the touch or input cancellation may cause the event recognizer's state to enter the event canceled state 418 (in FIG. 4B).

In some embodiments, one or more event recognizers may be adapted to delay delivering one or more sub-events of the sequence of sub-events until after the event recognizer recognizes the event. This behavior reflects a delayed event. For example, consider a single tap gesture in a view for which multiple tap gestures are possible. In that case, a tap event becomes a "tap+delay" recognizer. In essence, when an event recognizer implements this behavior, the event recognizer will delay event recognition until it is certain that the sequence of sub-events does in fact correspond to its event definition. This behavior may be appropriate when a recipient view is incapable of appropriately responding to cancelled events. In some embodiments, an event recognizer will delay updating its event recognition status to its respective actively involved view until the event recognizer is certain that the sequence of sub-events does not correspond to its event definition. Delay touch began flag 352, delay touch end flag 363, and touch cancellation flag 364 are provided to tailor sub-event delivery techniques, as well as event recognizer and view status information updates to specific needs.

In some embodiments, recognizer metadata and properties 337-1 include the following, or a subset or superset thereof:

state machine state/phase 338, which indicates the state of a state machine (e.g., 342) for the respective event recognizer instance (e.g., 343-2); state machine state/phase 338 can have various state values, such as "event possible", "event recognized", "event failed", and others, as described below; alternatively or additionally, state machine state/phase 338 can have various phase values, such as "touch phase began" which can indicate that the touch data structure defines a new touch that has not been referenced by previous touch data structures; a "touch phase moved" value can indicate that the touch being defined has moved from a prior position; a "touch phase stationary" value can indicate that the touch has stayed in the same position; a "touch phase ended" value can indicate that the touch has ended (e.g., the user has lifted his/her finger from the surface of a multi touch display); a "touch phase cancelled" value can indicate that the touch has been cancelled by the device; a cancelled touch can be a touch that is not necessarily ended by a user, but which the device has determined to ignore; for example, the device can determine that the touch is being generated inadvertently (i.e., as a result of placing a portable multi touch enabled device in one's pocket) and ignore the touch for that reason; each value of state machine state/phase 338 can be an integer number (called herein "gesture recognizer state value");

action-target pair(s) 345, where each pair identifies a target to which the respective event recognizer instance send the identified action message in response to recognizing an event or touch as a gesture or a part of a gesture;

delegate 346, which is a reference to a corresponding delegate when a delegate is assigned to the respective event recognizer instance; when a delegate is not assigned to the respective event recognizer instance, delegate 346 contains a null value; and enabled property 347, indicating whether the respective event recognizer instance is enabled; in some embodiments, when the respective event recognizer instance is not enabled (e.g., disabled), the respective event recognizer instance does not process events or touches.

In some embodiments, exception list 353 can also be used by non-exclusive event recognizers. In particular, when a non-exclusive event recognizer recognizes an event or sub-event, subsequent events and/or sub-events are not delivered to the exclusive event recognizers associated with the currently active views, except for those exclusive event recognizers listed in exception list 353 of the event recognizer that recognized the event or sub-event.

In some embodiments, event recognizers may be configured to utilize the touch cancellation flag 364 in conjunction with the delay touch end flag 363 to prevent unwanted events and/or sub-events from being delivered to the hit view. For example, the definition of a single tap gesture and the first half of a double tap gesture are identical. Once a single tap event recognizer successfully recognizes a single tap, an undesired action could take place. If the delay touch end flag is set, the single tap event recognizer is prevented from sending sub-events to the hit view until a single tap event is recognized. In addition, the wait-for list of the single tap event recognizer may identify the double-tap event recognizer, thereby preventing the single tap event recognizer from recognizing a single tap until the double-tap event recognizer has entered the event impossible state. The use of the wait-for list avoids the execution of actions associated with a single tap when a double tap gesture is performed. Instead, only actions associated with a double tap will be executed, in response to recognition of the double tap event.

Turning in particular to forms of user touches on touch-sensitive surfaces, as noted above, touches and user gestures may include an act that need not be instantaneous, e.g., a touch can include an act of moving or holding a finger against a display for a period of time. A touch data structure, however, defines the state of a touch (or, more generally, the state of any input source) at a particular time. Therefore, the values stored in a touch data structure may change over the course of a single touch, enabling the state of the single touch at different points in time to be conveyed to an application.

Each touch data structure can comprise various entries. In some embodiments, touch data structures may include data corresponding to at least the touch-specific entries in event/touch metadata 337-2 such as the following, or a subset or superset thereof:

"first touch for view" entry 348, indicating whether the touch data structure defines the first touch for the particular view (since the view was instantiated);

"per touch info" entry 349, including "time stamp" information, which indicates the particular time to which the touch data structure relates (e.g., the time of touch); optionally, "per touch info" entry 349 includes other information, such as a location of a corresponding touch; and optional "tap count" entry 350, indicating how many taps have been sequentially performed at the position of the initial touch; a tap can be defined as a quick pressing and lifting of a finger against a touch-sensitive panel at a particular position; multiple sequential taps can occur if the finger is again pressed and released in quick succession at the same position of the panel; an event delivery system 136 can count taps and relay this information to an application through "tap count" entry 350; multiple taps at the same location are sometimes considered to be a useful and easy to remember command for touch enabled interfaces; thus, by counting taps, event delivery system 136 can again alleviate some data processing from the application.

Thus, each touch data structure can define what is happening with a respective touch (or other input source) at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening in the view.

The ability to handle complex touch-based gestures, optionally including multi-touch gestures, can add complexity to the various software applications. In some cases, such additional complexity can be necessary to implement advanced and desirable interface features. For example, a game may require the ability to handle multiple simultaneous touches that occur in different views, as games often require the pressing of multiple buttons at the same time, or combining accelerometer data with touches on a touch-sensitive surface. However, some simpler applications and/or views need not require advanced interface features. For example, a simple soft button (i.e., a button that is displayed on a touch-sensitive display) may operate satisfactorily with single touches, rather than multi-touch functionality. In these cases, the underlying OS may send unnecessary or excessive touch data (e.g., multi-touch data) to a software component associated with a view that is intended to be operable by single touches only (e.g., a single touch or tap on a soft button). Because the software component may need to process this data, it may need to feature all the complexity of a software application that handles multiple touches, even though it is associated with a view for which only single touches are relevant. This can increase the cost of development of software for the device, because software components that have been traditionally easy to program in a mouse interface environment (i.e., various buttons, etc.) may be much more complex in a multi-touch environment.

In order to reduce the complexity in recognizing complex touch-based gestures, delegates can be used to control the behavior of event recognizers in accordance with some embodiments. As described below, delegates can determine, for example, whether a corresponding event recognizer (or gesture recognizer) can receive the event (e.g., touch) information; whether the corresponding event recognizer (or gesture recognizer) can transition from an initial state (e.g., event possible state) of state machine to another state; and/or whether the corresponding event recognizer (or gesture recognizer) can simultaneously recognize the event (e.g., touch) as a corresponding gesture without blocking other event recognizer(s) (or gesture recognizer(s)) from recognizing the event or getting blocked by other event recognizer(s) (or gesture recognizer(s)) recognizing the event.

It shall be understood, however, that the foregoing discussion regarding the complexity of evaluating and processing user touches on touch-sensitive surfaces also applies to all forms of user inputs to operate electronic device 102 or 104, not all of which are initiated on touch screens, e.g., coordinating mouse movement and mouse button presses with or without single or multiple keyboard presses or holds, device rotations or other movements, user movements such as taps, drags, scrolls, etc., on touch-pads, pen stylus inputs, oral instructions, detected eye movements, biometric inputs, detected physiological change in a user, and/or any combination thereof, which may be utilized as inputs corresponding to events and/or sub-events which define an event to be recognized.

FIGS. 4A-4D are flow charts for exemplary state machines, according to some embodiments. Gesture recognizers may include a discrete gesture recognizer and a continuous gesture recognizer. A discrete gesture recognizer is typically useful in recognizing a brief gesture occurring within a predefined time period (e.g., tap or swipe gesture), but more fundamentally is for recognizing a gesture for which only one action message or one set of action messages needs to be delivered to the application upon recognition of the gesture. A continuous gesture recognizer is useful in recognizing a gesture that includes a movement of a touch (and therefore requires tracking of the touch location) (e.g., pan, pinch, or rotate gesture), and more fundamentally is for recognizing a gesture for which a sequence of action messages need to be delivered to the application over the course of the gesture. In some embodiments, discrete event recognizer state machine 400 and continuous event recognizer state machine 402 have different states.

FIG. 4A depicts discrete event recognizer state machine 400 containing three states in accordance with some embodiments. By managing state transitions in event recognizer state machine 342 based on received events and/or sub-events, an event recognizer effectively expresses an event definition. For example, a tap gesture may be effectively defined by a sequence of two, or optionally, three sub-events. First, a touch should be detected, and this will be sub-event 1. For example, the touch sub-event may be a user's finger touching a touch-sensitive surface in a view that includes the event recognizer having event recognizer state machine 342. Second, an optional measured delay where the touch does not substantially move in any given direction (e.g., any movement of the touch position is less than a predefined threshold, which may be measured as a distance (e.g., 5 mm) or as a number of pixels (e.g., 5 pixels) on the display), and the delay is sufficiently short, would serve as sub-event 2. Finally, termination of the touch (e.g., liftoff of the user's finger from the touch-sensitive surface) will serve as sub-event 3. By coding the event recognizer state machine 342 to transition between states based upon receiving these sub-events, the event recognizer state machine 342 effectively expresses a tap gesture event definition. Discrete event recognizer state machine 400 is an exemplary implementation of event recognizer state machine 342 configured to recognize a tap gesture, described above.

Regardless of event type, event recognizer state machine 342 (including event recognizer state machine implemented as discrete event recognizer state machine 400) begins in event possible state 410, which indicates an initial state of the event recognizer state machine. Event recognizer state machine 342 may progress to any of the remaining states depending on what event and/or sub-event is received.

Starting from event possible state 410, if an event or sub-event is received that is not the first event or sub-event in a gesture definition, discrete event recognizer state machine 400 will transition to event failed state 430.

Starting from event possible state 410, if an event or sub-event is received that, by itself comprises the gesture definition for a gesture, discrete event recognizer state machine 400 will transition to event recognized state 420. However, even if the received event or sub-event comprises the gesture definition for the gesture, discrete event recognizer state machine 400 may nevertheless transition to event failed state 430 in accordance with metadata (e.g., a property) of the corresponding event recognizer, one or more values determined by a corresponding delegate, and/or the application state.

In some embodiments, after transitioning to event recognized state 420, the corresponding event recognizer checks (441) a delay flag (e.g., delay touch end flag 363). If the delay flag is raised (441-yes), the corresponding event recognizer delays (442) delivering event information until the delay flag is lowered.

In some embodiments, the corresponding event recognizer includes wait-for list 351, and the corresponding event recognizer waits for the event recognizers listed in wait-for list 351 to reach a certain state. For example, when a view includes a single tap gesture recognizer and a double tap gesture recognizer, a single tap gesture recognizer can be configured to wait for a double tap gesture recognizer to fail. In effect, transition of the single tap gesture recognizer to event recognized state 420 requires (or is conditioned upon) the failure of the double tap gesture recognizer to recognize the event. As a result, when there is a tap event, the single tap gesture recognizer recognizes the tap event as long as the tap event is not part of a multi-tap gesture.

After the delay and wait (442), if any, the corresponding gesture recognizer delivers events to the application (443). In some embodiments, events are delivered in the form of action messages. In some embodiments, action messages are delivered in accordance with action-target pair(s) 345. In some embodiments, the corresponding gesture recognizer activates action-target pair(s) 345.

FIG. 4B depicts continuous event recognizer state machine 402 containing six states in accordance with some embodiments.

As discussed above, continuous event recognizer state machines 402 starts from event possible state 410.

Starting from event possible state 410, if an event or sub-event is received that is not part of a begin sequence of event(s) and/or sub-event(s) in a gesture definition, discrete event recognizer state machine 400 will transition to event failed state 430.

Starting from event possible state 410, if an event or sub-event is received that is part of a begin sequence of event(s) and/or sub-event(s) in a given gesture definition, continuous event recognizer state machine 402 will transition to event began state 412. Similar to discrete event recognizer state machine 400, even if the received event or sub-event comprises part of a begin sequence of event(s) and/or sub-event(s) in the gesture definition, continuous event recognizer state machine 402 may transition to event failed state 430 in accordance with metadata (e.g., a property) of the corresponding event recognizer, one or more values determined by a corresponding delegate, and/or the application state.

From event began state 412, if the next event or sub-event received is an intermediate event or sub-event, but not the final event or sub-event in the given gesture definition, continuous event recognizer state machine 402 will transition to and remain in event changed state 414. Continuous event recognizer state machine 402 can remain in event changed state 414 for as long as the sequence of received events and/or sub-events continues to be part of the gesture definition. If, at any time continuous event recognizer state machine 402 is in event changed state 414, and continuous event recognizer state machine 402 receives an event or sub-event that is not part of the gesture definition, it will transition to event failed state 430, thereby determining that the current event (if any) is not the type of event that corresponds to this event recognizer (i.e., the event recognizer corresponding to continuous event recognizer state machine 402). If, on the other hand, continuous event recognizer state machine 402 is in event began state 412 or event changed state 414, and continuous event recognizer state machine 402 receives the last event or sub-event in a gesture definition, it will transition to event ended state 416, thereby completing a successful event recognition.

In some embodiments, each gesture recognizer state has a gesture recognizer state value. In some embodiments, event recognized state 420 (for discrete event recognizer state machine 400) and event ended state 416 (for continuous event recognizer state machine 402) have an identical gesture recognizer state value, such that a software component configured to response a recognition of a gesture by one type of gesture recognizer can also respond to the other type of gesture recognizer.

While in event began state 412 or event changed state 414, when a predefined interruption event (e.g., predefined in operating system 118 or control application 124, such as an incoming phone call) occurs, continuous event recognizer state machine 402 transitions to event canceled state 418.

Regardless of the gesture recognizer type, each gesture recognizer (e.g., 343) can be reset such that a corresponding event recognizer state machine returns (e.g., 342) to event possible state 410.

Figure 4C:
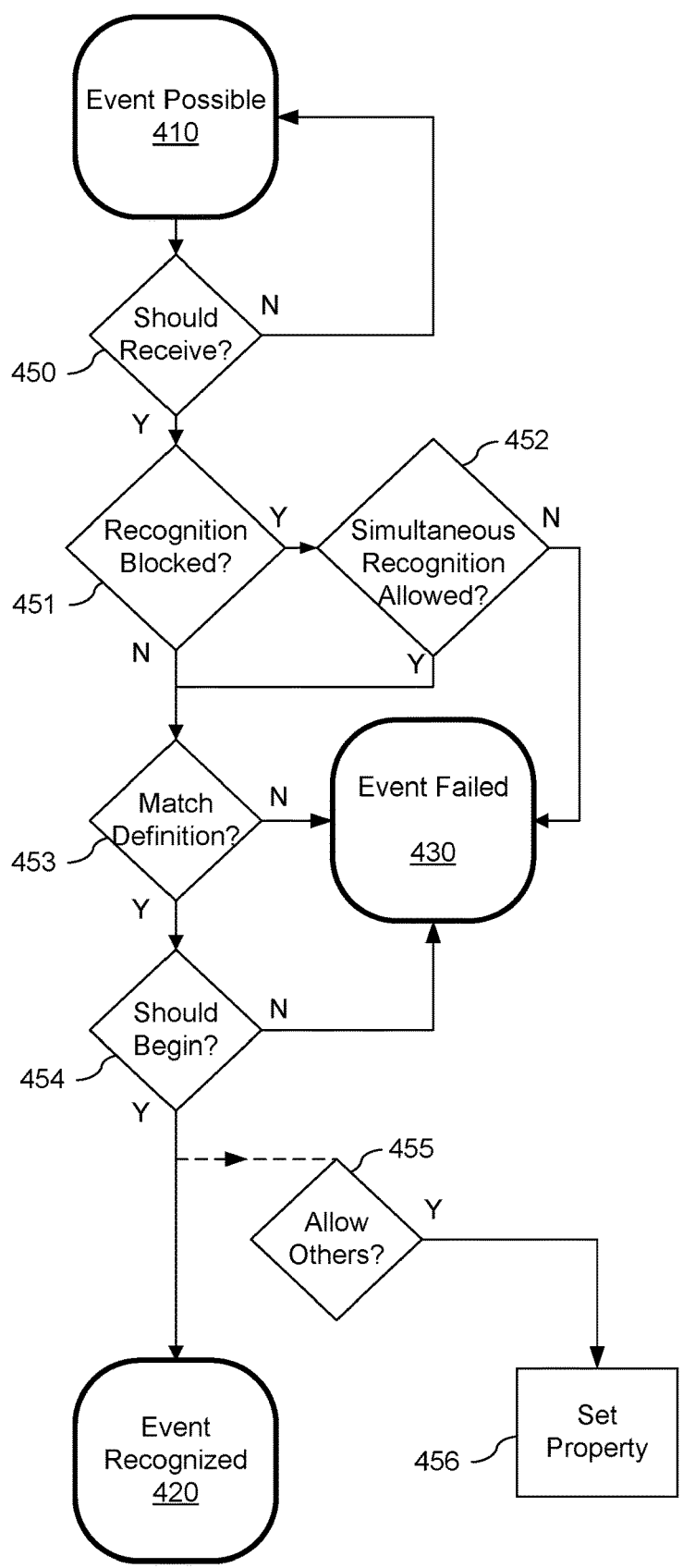
Figure 4D:
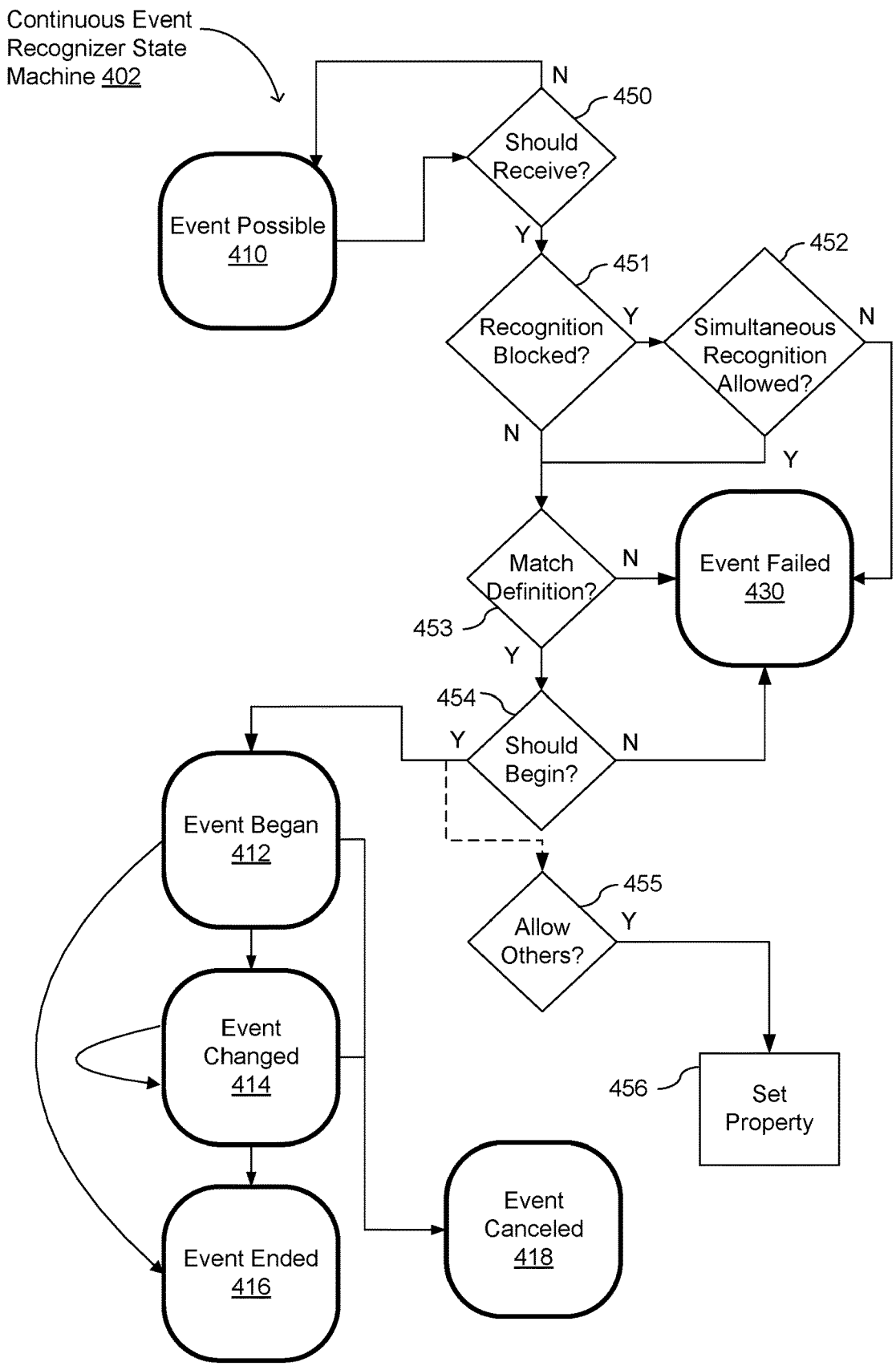

FIGS. 4C and 4D depict the role of delegates in state transitions in accordance with some embodiments. In FIGS. 4C and 4D, the actions (or decisions made) by one or more delegates is indicated by boxes with shadows (e.g., 450-456).

FIG. 4C depicts the role of delegates in state transitions for discrete event recognizer state machine 400 in accordance with some embodiments. In the examples discussed below, state machine 400 corresponds to a particular discrete event recognizer that has a corresponding delegate.

Starting from event possible state 410, if an event or sub-event is detected, the delegate corresponding to an event recognizer decides whether the event recognizer should receive (450) the event or sub-event. If the delegate returns a value that prevents the corresponding event recognizer from receiving the event or sub-event, the corresponding event recognizer does not receive the event or sub-event (or disregards the event or sub-event). As a result, the corresponding event recognizer remains in event possible state 410. If there is no delegate preventing the corresponding event recognizer from receiving the event or sub-event, the default behavior for the corresponding event recognizer is to receive the event or sub-event.

It is noted that the "should receive" operation 450 by the delegates of a set of event recognizers can be used to determine which event recognizers receive which touches on a touch-sensitive display or surface. For example, in a view that allows a user to use two touches to individually and simultaneously reposition two objects, or to select two different objects, the delegates of two event recognizers can be configured to allow one event recognizer to receive only a first one of the two touches and to allow a second event recognizer to receive only a second one of the two touches. All information about each of the two touches is therefore directed to only the event recognizer allowed, by its corresponding delegate, to receive that touch. Much more complex multi-touch inputs can also be recognized and processed through the use of multiple event recognizers and corresponding delegates that determine which touches are processed by which event recognizers.

If the event recognizer is allowed to receive the event or sub-event, the delegate corresponding to the event recognizer (or the control application 124 or operating system 118) decides whether the recognition of the event or sub-event by the event recognizer is blocked (451) by another event recognizer having already recognized the event. This initial level of blocking is based on a default exclusivity rule, and can be overridden by the delegate. If the recognition of the event or sub-event is blocked, the corresponding delegate (or operating system 118 or control application 124) also decides whether simultaneous recognition of the event by the event recognizer is allowed (452) in accordance with one or more values determined by the delegate. For example, if the event recognizer is on the exclusivity exception list 353 of the event recognizer that initially recognized the event, the delegate allows simultaneous recognition by both event recognizers. In another example, if the exclusivity flag 339 of the event recognizer is not set, the delegate allows simultaneous recognition by both event recognizers. If the simultaneous recognition is not allowed, the event recognizer transitions to event failed state 430.

If the corresponding event recognizer is not blocked (451-No) from recognizing the event or sub-event, or if simultaneous recognition is allowed (452-Yes), the corresponding event recognizer determines whether the event or sub-event matches (453) a corresponding gesture definition. If the event or sub-event does not match (453-No) the corresponding gesture definition, the corresponding gesture recognizer transitions to event failed state 430.

If the event or sub-event matches (453-Yes) the corresponding gesture definition, the corresponding delegate (or operating system 118 or control application 124) decides whether it can transition ("should begin" 454) out of event possible state 410 in accordance with one or more values determined by the delegate. If the event recognizer is not allowed (454-No) by the delegate to transition out of event possible state 410, the corresponding event recognizer is put into event failed state 430. If the event recognizer is allowed (454-Yes) to transition out of event possible state 410, the corresponding event recognizer transitions into event recognized state 420.

When the corresponding event recognizer transitions into event recognized state 420, the corresponding event recognizer (or operating system 118 or control application 124) also decides whether to allow the recognition of the event or sub-event by the other event recognizers (455). In some embodiments, the default is to prevent all other event recognizers from recognizing the same event, unless the delegate (or the application) of at least one of the event recognizers sets a property to allow simultaneous recognition. If the delegate corresponding to the event recognizer which has recognized the event or sub-event determined that the delegate will allow (455-Yes) other event recognizers to recognize the event or sub-event, the delegate (or operating system 118 or control application 124) sets (456) a property of the other event recognizers such that they can recognize the event or sub-event simultaneously. If the delegate does not allow other event recognizers to recognize the event or sub-event, the other event recognizers are prevented from recognizing the event or sub-event.

In some embodiments, prior to preventing a respective event recognizer from recognizing an event or sub-event, the delegate of that event recognizer is also invoked (see 452) to see if it will allow simultaneous recognition of the event or sub-event. In these embodiments, simultaneous recognition can be enabled by either the delegate of the first event recognizer to recognize the event, or the delegate of a second event recognizer. As shown by 452 and 455 in FIG. 4C, in these embodiments decisions about whether to allow simultaneous recognition are made only when an event matches the event definition of at least one event recognizer.

The above described delegate operations, when implemented in the delegates for a set of event recognizers used by an application view (or set of simultaneously displayed views), can be used to customize the interaction of the event recognizers. The delegates can implement exceptions to a default exclusivity rule, which otherwise allows only one event recognizer to recognize a gesture based on the same received event(s). The user of delegates to implement exceptions to the default exclusivity rule, and thereby allow simultaneous event recognition by compatible event recognizers, facilitates the implementation of many useful functions in software applications. The use of delegates to modify and control the behavior of event recognizers allows for a compact representation and implementation of complex relationships, such as mutually exclusive sets of mutually compatible gestures.

FIG. 4D depicts the role of delegates in state transition for continuous event recognizer state machine 402 in accordance with some embodiments. In the examples discussed below, state machine 402 corresponds to a particular continuous event recognizer that has a corresponding delegate. All the delegate operations shown in FIG. 4C and discussed above with reference to FIG. 4C are equally applicable to a continuous event recognizer that has a corresponding delegate, and therefore the delegate operations shown in FIG. 4D have the same reference numbers as those in FIG. 4C. The only difference is that the name of one state in the state machine has changed, from "event recognized" 420 in state machine 400 to "event began" 412 in state machine 402.

From event began state 412, the corresponding event recognizer transitions into other states as described above. For brevity, the transition from event changed state 414 to event failed state 416 is not depicted.

The following table presents in a tabular format the processing of an exemplary sub-event sequence (e.g., a single tap) as related to the states of event recognizers described above. In this example, the sub-event sequence comprises a single tap, and the view has two tap gesture recognizers: a single tap gesture recognizer and a double tap gesture recognizer. Also in this example, both gesture recognizers are configured to simultaneously receive and recognize the sub-event sequence. Simultaneous recognition can be allowed by a delegate assigned to the single tap gesture recognizer or a delegate assigned to the second tap gesture recognizer.

| Sequence # | Sub-Event Sequence (single tap) | Single Tap Gesture Recognizer | Double Tap Gesture Recognizer |
|---|---|---|---|
| 0 | before delivery starts | Event Possible | Event Possible |
| 1 | detect finger down | Event Possible | Event Possible |
| 2 | measure delay | Event Possible | Event Possible |
| 3 | detect finger liftoff | Event Recognized | Event Possible |
| 4 | measure delay | Event Recognized | Event Failed |

Before delivery of sub-event information starts (sequence #0), both gesture recognizers are in event possible state 410. Even after detecting a finger down sub-event (sequence #1) and measuring a delay (sequence #2), both gesture recognizers remain in event possible state 410. In response to detecting a finger liftoff (sequence #3), the single tap gesture recognizer transitions into event recognized state 420. After detecting additional delay, the single tap gesture recognizer remains in event recognized state 420 until it is reset, in which case the single tap gesture recognizer returns to event possible state 410. On the other hand, the double tap gesture recognizer transitions into event failed state 430 when the measured additional delay exceeds a predefined duration (e.g., during which the double tap gesture recognizer anticipates a second finger down sub-event).

The following table presents in a tabular format the processing of the exemplary sub-event sequence when the behavior of one gesture recognizer is modified. In this example, the sub-event sequence comprises a single tap, and the view has two tap gesture recognizers: a single tap gesture recognizer and a double tap gesture recognizer. Also in this example, the single tap gesture recognizer is not allowed by its delegate to receive the sub-events.

| Sequence # | Sub-Event Sequence (single tap) | Single Tap Gesture Recognizer | Double Tap Gesture Recognizer |
|---|---|---|---|
| 0 | before delivery starts | Event Possible | Event Possible |
| 1 | detect finger down | Event Possible | Event Possible |
| 2 | measure delay | Event Possible | Event Possible |
| 3 | detect finger liftoff | Event Possible | Event Possible |
| 4 | measure delay | Event Possible | Event Failed |

Because the single tap gesture recognizer is not allowed by its delegate to receive the sub-events, the single tap gesture recognizer remains in event possible state 410. The double tap gesture recognizer transitions into event failed state 430 when the measured second delay exceeds the predefined threshold (sequence #4).

The following table presents in a tabular format the processing of the exemplary sub-event sequence when the behavior of one gesture recognizer is modified. In this example, the sub-event sequence comprises a single tap, and the view has two tap gesture recognizers: a single tap gesture recognizer and a double tap gesture recognizer. Also in this example, both gesture recognizers are not allowed to simultaneously recognize the sub-event sequence.

| Sequence # | Sub-Event Sequence (single tap) | Single Tap Gesture Recognizer | Double Tap Gesture Recognizer |
|---|---|---|---|
| 0 | before delivery starts | Event Possible | Event Possible |
| 1 | detect finger down | Event Possible | Event Possible |
| 2 | measure delay | Event Possible | Event Possible |
| 3 | detect finger liftoff | Event Recognized | Event Failed |
| 4 | measure delay | Event Recognized | Event Failed |

Similar to what was described above, after detecting finger liftoff (sequence #3), single tap gesture recognizer transitions from event possible state 410 to event recognized state 420. In general, a first gesture recognizer that recognizes the sub-event sequence blocks other gesture recognizers that have not yet recognized the sub-event sequence from recognizing the sub-event sequence. Unless a simultaneous recognition is allowed, blocked gesture recognizers transition into event failed state 430. In this case, because simultaneous recognition is not allowed, when the single tap gesture recognizer recognizes the sub-event sequence (at sequence #3), the double tap gesture recognizer transitions into, and remains in, event failed state 430 until it is reset.

The following table presents in a tabular format the processing of the exemplary sub-event sequence when the behavior of one gesture recognizer is modified by its delegate, and operation of the two gesture recognizers is coordinated in accordance with actions taken by the delegate(s) of one or both recognizers. In this example, the sub-event sequence comprises a single tap, and the view has two tap gesture recognizers: a single tap gesture recognizer and a double tap gesture recognizer. Also in this example, the single tap gesture recognizer is not allowed to begin (or transition out of event possible state 410).

| Sequence # | Sub-Event Sequence (single tap) | Single Tap Gesture Recognizer | Double Tap Gesture Recognizer |
|---|---|---|---|
| 0 | before delivery starts | Event Possible | Event Possible |
| 1 | detect finger down | Event Possible | Event Possible |
| 2 | measure delay | Event Possible | Event Possible |
| 3 | detect finger liftoff | Event Failed | Event Possible |
| 4 | measure delay | Event Failed | Event Failed |

After detecting finger liftoff (sequence #3), single tap gesture recognizer attempts to transition from event possible state 410 to event recognized state 420. However, the delegate assigned to the single tap gesture recognizer does not allow the state transition into the event recognized state 420, and as a result, the single tap gesture recognizer transitions into event failed state 430. The double tap gesture recognizer transitions into event failed state 430 when the measured delay exceeds the predefined threshold (sequence #4).

The following table presents in a tabular format the processing of the exemplary sub-event sequence when the behavior of one gesture recognizer is modified, and operation of two gesture recognizers is coordinated in accordance with actions taken by the delegate(s) of one or both recognizers. In this example, the sub-event sequence comprises a single tap, and the view has two tap gesture recognizers: a single tap gesture recognizer and a double tap gesture recognizer. Also in this example, the single tap gesture recognizer waits for (or requires) a failure of the double tap gesture recognizer.

| Sequence # | Sub-Event Sequence (single tap) | Single Tap Gesture Recognizer | Double Tap Gesture Recognizer |
|---|---|---|---|
| 0 | before delivery starts | Event Possible | Event Possible |
| 1 | detect finger down | Event Possible | Event Possible |
| 2 | measure delay | Event Possible | Event Possible |
| 3 | detect finger liftoff | Event Possible | Event Possible |
| 4 | measure delay | Event Recognized | Event Failed |

After detecting finger liftoff (sequence #3), single tap gesture recognizer attempts to transition from event possible state 410 to event recognized state 420. However, due to the "wait-for" requirement or the failure requirement (that the double tap gesture recognizer fail), the single tap gesture recognizer delays transitioning into event recognized state 420. When the double tap gesture recognizer fails because the measured second delay exceeds the predefined threshold (sequence #4), the single tap gesture recognizer transitions into event recognized state 420. The "wait-for" requirement and/or the failure requirement may be implemented using delegates or in gesture recognizers.

The following table presents in a tabular format the processing of the exemplary sub-event sequence. In this example, the sub-event sequence comprises a pan gesture involving multiple intermediary sub-events, and the view has two gesture recognizers: a single tap gesture recognizer and a pan gesture recognizer. Also in this example, both gesture recognizers are allowed to simultaneously recognize the sub-event sequence.

| Sequence # | Sub-Event Sequence (pan gesture) | Single Tap Gesture Recognizer | Pan Gesture Recognizer |
|---|---|---|---|
| 0 | before delivery starts | Event Possible | Event Possible |
| 1 | detect finger down | Event Possible | Event Began |
| 2 | measure delay | Event Possible | Event Began |
| 3 | detect finger movement | Event Failed | Event Changed |
| 4 | detect finger movement | Event Failed | Event Changed |
| 5 | detect finger movement | Event Failed | Event Changed |
| 6 | detect finger liftoff | Event Failed | Event Ended |

Before delivery of sub-event information starts (sequence #0), both gesture recognizers are in event possible state 410. Even after detecting a finger down sub-event (sequence #1) and measuring a delay (sequence #2), the single tap gesture recognizer remains in event possible state 410, while the pan gesture recognizer transitions into event began state 412. In response to detecting a finger movement (sequence #3), the single tap gesture recognizer transitions into event failed state 430 as the sub-event does not match with the gesture definition for a single tap. The single tap gesture recognizer remains in event failed state 430 thereafter until it is reset. However, the pan gesture recognizer transitions into event changed state 414 in response to detecting the finger movement (sequence #4), and in some embodiments, sends action message(s) including the new location of the finger contact. After detecting additional finger movements (sequence #4 and 5), the pan gesture recognizer remains in event changed state 414, while sending action message(s) every time a finger movement is detected. When a finger liftoff is detected (sequence #6), the pan gesture recognizer transitions into event ended state 416.

Figure 5A:
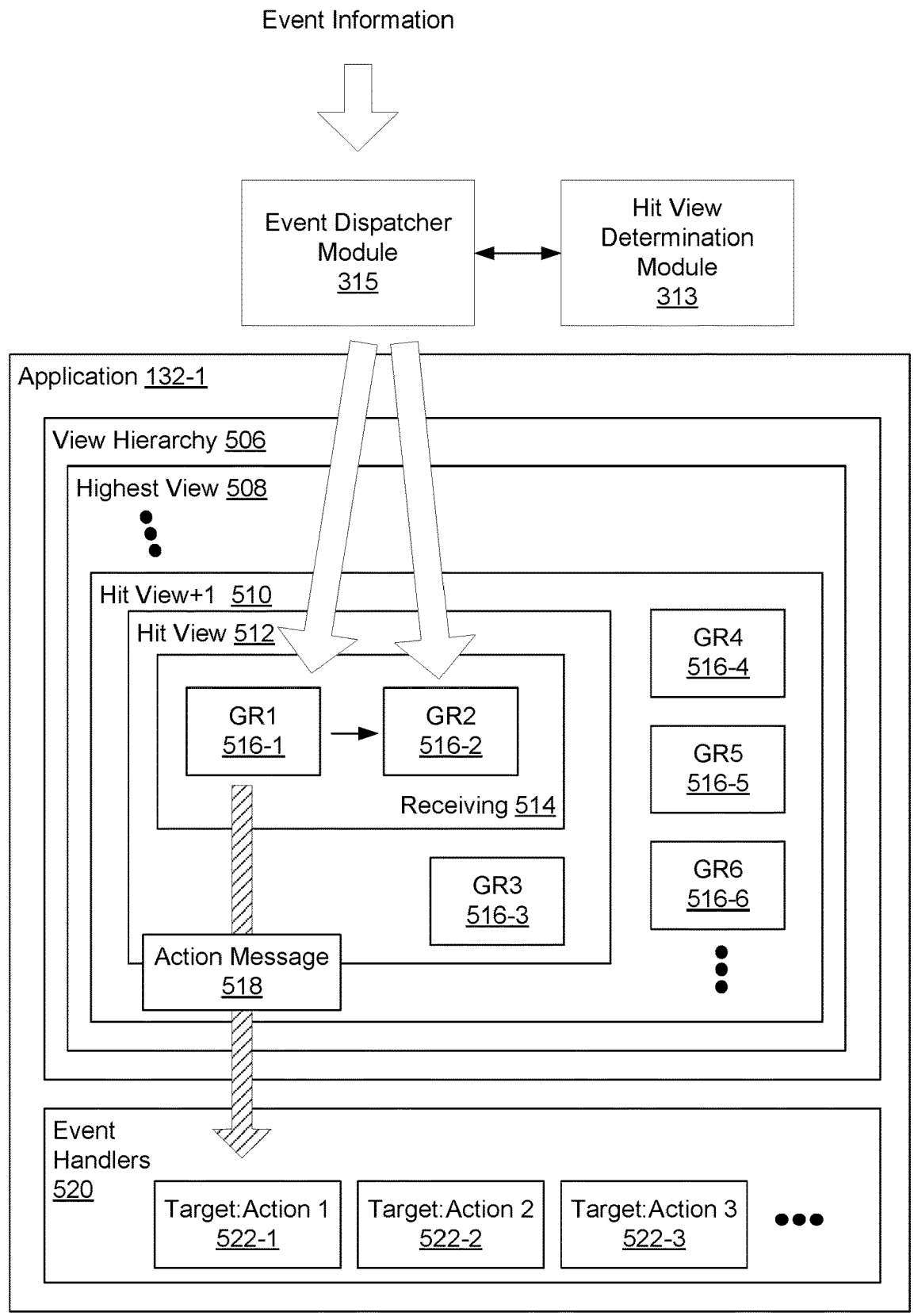
FIG. 5A is a block diagram illustrating the flow of event information, according to some embodiments.

Turning to the flow of event information and the interaction between event recognizers, FIG. 5A is a block diagram illustrating the flow of event information, according to some embodiments. Event dispatcher module 315 (e.g., in operating system 118 or control application 124) receives event information, and sends the event information to application (e.g., 132-1). In some embodiments, application 132-1 includes a plurality of views (e.g., 508, 510, and 512 corresponding to views 316) in view hierarchy 506 and a plurality of gesture recognizers (516-1 through 516-6) in the plurality of views. Application 132-1 also includes one or more event handlers 520, which correspond to the target values in target-action pairs (e.g., 522-1, 522-2, and 522-3). Event dispatcher module 315 receives hit view information from hit view determination module 313 and sends event information to the hit view (e.g., 512) or event recognizer(s) attached to the hit view (e.g., 512). In some embodiments, only a subset of gesture recognizers attached to the hit view are allowed to (or configured to) receive the event information (or touch information). Those gesture recognizers allowed to receive the event information are called herein "receiving gesture recognizers". In FIG. 5A, gesture recognizers 516-1 and 516-2 are in a set of receiving gesture recognizers 514. As a result, event dispatcher module 315 sends event information to both gesture recognizers 516-1 and 516-2 in the set of receiving gesture recognizers.

In some embodiments, gesture recognizers may block or prevent one another from recognizing the event or sub-event as a corresponding gesture. In this example, gesture recognizer 1 (516-1) prevents gesture recognizer 2 (516-2) from recognizing the event or sub-event as a corresponding gesture. As a result, in this example, only gesture recognizer 1 (516-1) sends an action message (518) to a corresponding target-action pair (e.g., target:action 1 (522-1)).

Figure 5B:
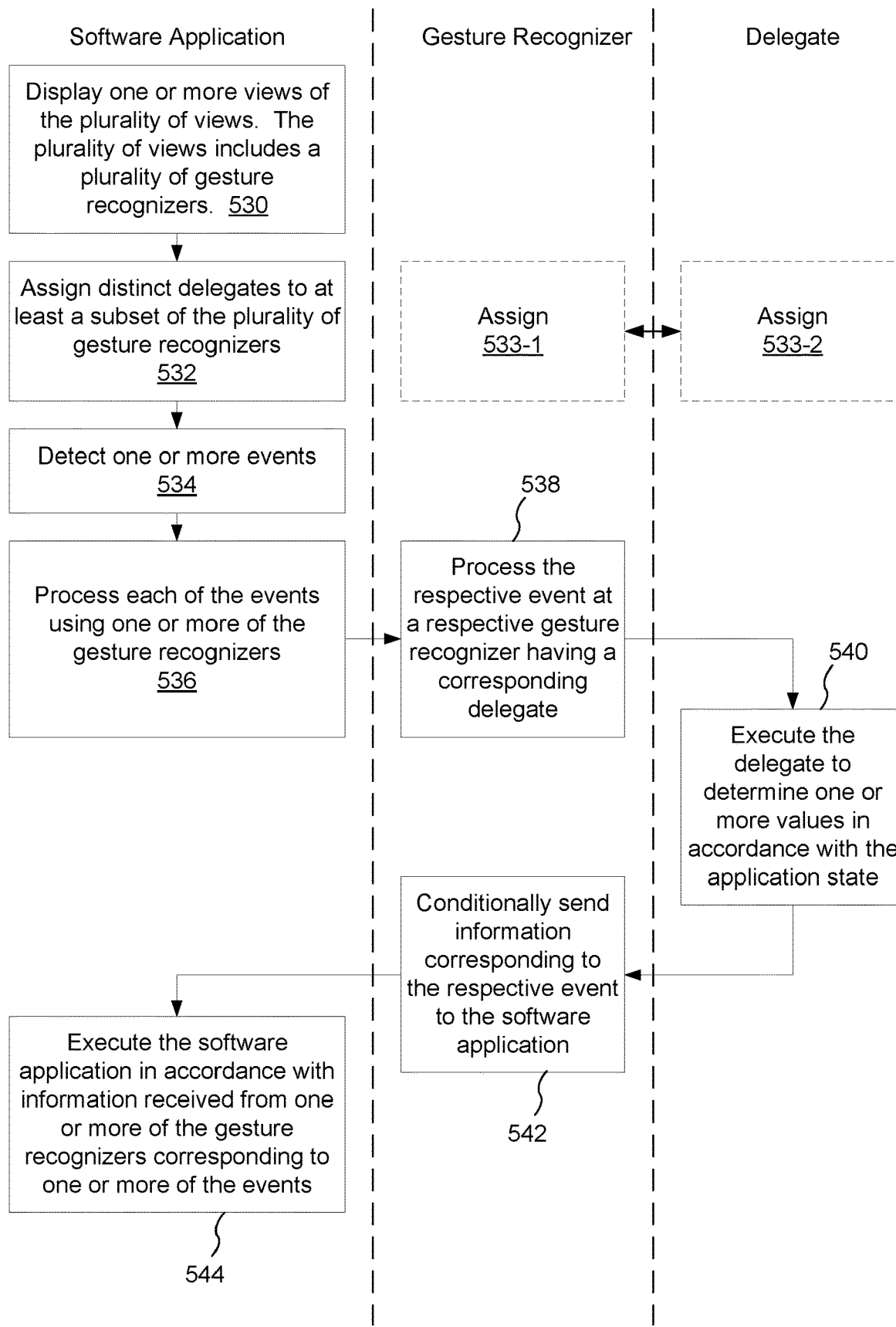
FIGS. 5B and 5C are high-level flow charts illustrating gesture recognition methods, according to some embodiments.
Figure 5C:
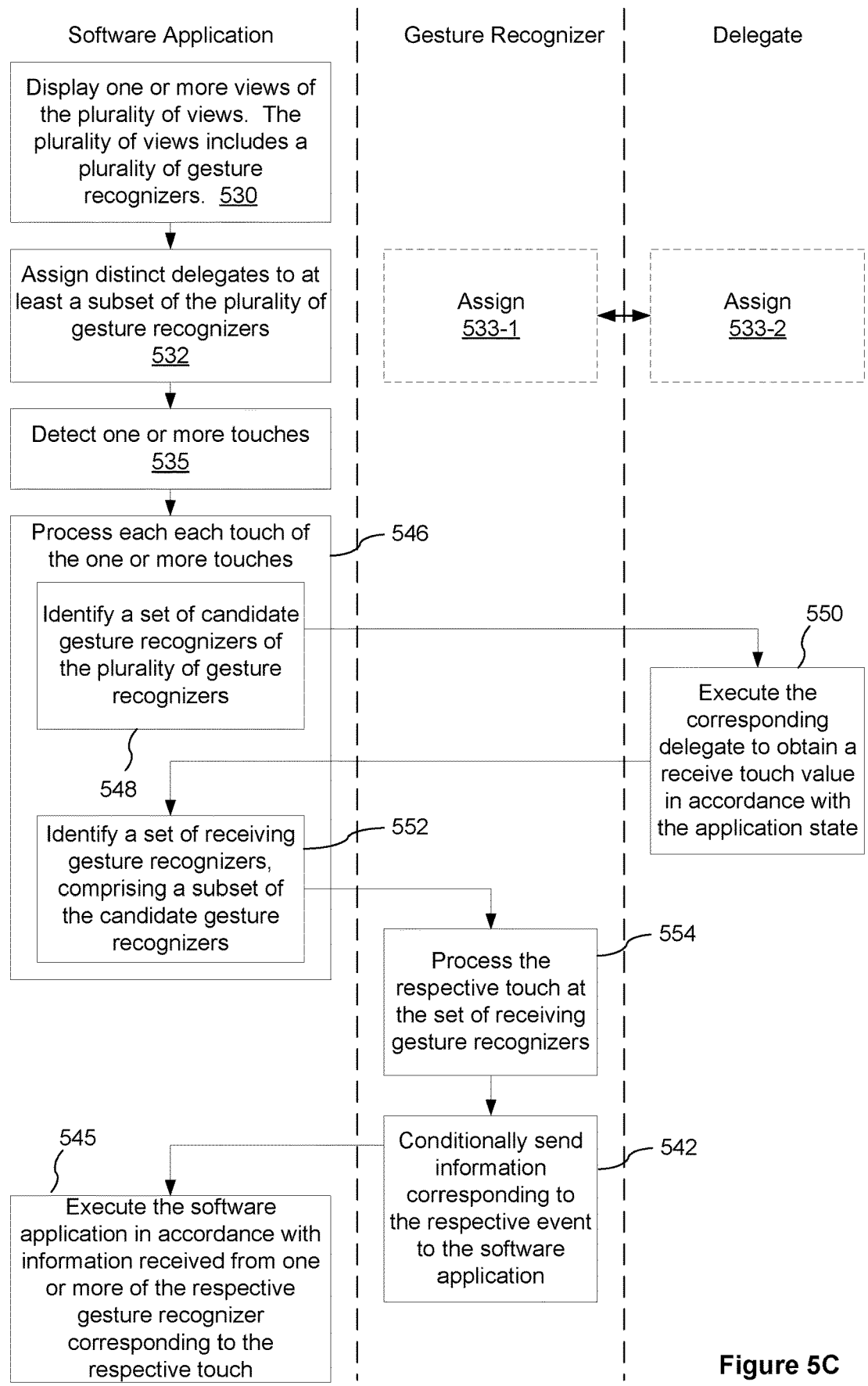

FIGS. 5B and 5C are flow charts illustrating gesture recognition methods, according to some embodiments. FIG. 5B illustrates a flow chart where a gesture recognizer invokes a corresponding delegate, and FIG. 5C illustrates a flow chart where a software application invokes a delegate corresponding to a respective gesture recognizer. In FIGS. 5B and 5C, each column represents processes performed at each entity or component (e.g., software application, gesture recognizer, or delegate).

In FIG. 5B, a software application (e.g., application 132-1) displays (530) one or more views of the plurality of views (e.g., 506, 508, 510). The plurality of views includes a plurality of gesture recognizers (e.g., 516-1 through 516-6). The software application (e.g., application 132-1) assigns (532) distinct delegates to at least a subset of the plurality of gesture recognizers. In some embodiments, a respective gesture recognizer is assigned (533-1) to a corresponding delegate. In some embodiments, a respective delegate is assigned (533-2) to a corresponding gesture recognizer. Alternately, the correspondence between a delegate and a gesture recognizer may be established prior to runtime. Throughout the following discussion, each reference to an assigned delegate may also mean a corresponding delegate, and each reference to a gesture recognizer to which a delegate has been assigned may also mean a gesture recognizer corresponding to a particular delegate.

The software application (e.g., application 132-1) detects (534) one or more events, and processes (536) each of the events using one or more of the gesture recognizers (e.g., 320).

The respective event is processed (538) at a respective gesture recognizer (of the one or more gesture recognizers (e.g., 320)). In order to explain operation of the delegates, we assume that a respective gesture recognizer that processes the event has a corresponding delegate. The respective gesture recognizer calls the assigned delegate, and the assigned delegate is executed (540) to determine one or more values in accordance with the application state. In response, the respective gesture recognizer conditionally sends (542) information corresponding to the respective event to the software application, in accordance with the one or more values determined by the assigned delegate.

The software application is executed (544) in accordance with information received from one or more of the gesture recognizers corresponding to one or more of the events.

In other words, in these embodiments, a respective gesture recognizer invokes an assigned delegate to obtain one or more values that determine the behavior of the gesture recognizer. As described above, the behavior of the gesture recognizer modified by its corresponding delegate includes whether to receive touch/event information, whether to transition out of the event possible state, and/or whether to allow simultaneous recognition. Operations by the delegate (sometimes with the coordinated action of the delegates of other gesture recognizers) also coordinate the operation of two or more gesture recognizers by controlling which gesture recognizers receive which touches, by determining which gesture recognizer is allowed to transition to the "event recognized" or "event began" state, and by allowing or disabling simultaneous recognition.

In FIG. 5C, a software application (e.g., application 132-1) displays (530) one or more views of the plurality of views (e.g., 506, 508, 510). The plurality of views includes a plurality of gesture recognizers (e.g., 516-1 through 516-6). The software application (e.g., application 132-1) assigns (532) distinct delegates to at least a subset of the plurality of gesture recognizers. In some embodiments, a respective gesture recognizer is assigned (533-1) to a corresponding delegate. In some embodiments, a respective delegate is assigned (533-2) to a corresponding gesture recognizer. Alternatively, the correspondence between a delegate and a gesture recognizer may be established prior to runtime.

The software application (e.g., application 132-1) detects (535) one or more touches, and processes (546) each of the one or more touches, using one or more of the gesture recognizers. In processing each of the one or more touches, the software application identifies (548) a set of candidate gesture recognizers of the plurality of gesture recognizers. In some embodiments, the candidate gesture recognizers are gesture recognizers attached to the hit view (e.g., gesture recognizers 516-1, 516-2, and 516-3 in FIG. 5A).

The delegate assigned to a respective candidate gesture recognizer is executed (550) to obtain a "receive touch value" in accordance with the application state. The "receive touch value" is used to determine whether the respective candidate gesture recognizer can receive the event/touch information (e.g., "should receive" step 450 in FIGS. 4C-4D).

Based on the receive touch value obtained from a respective delegate, a set of receiving gesture recognizers is identified (552). The set of receiving gesture recognizers comprise (552) a subset of the candidate gesture recognizers. In some embodiments, the set of receiving gesture recognizers include all candidate gesture recognizers that do not have respective assigned delegates. If more than one of the candidate gesture recognizers has a corresponding delegate, the delegate of each such candidate gesture recognizer is executed to determine whether the candidate gesture recognizer can receive the event/touch information. The "receive touch values" obtained from the delegates corresponding to the candidate gesture recognizers are used to identify the set of receiving gesture recognizers.

The respective touch is processed (554) at the set of receiving gesture recognizers. If processing of the respective touch by a respective gesture recognizer results in the recognition of an event or gesture (see match definition 453, FIGS. 4C and 4D), the delegate (if any) corresponding to the respective gesture recognizer is called to determine if recognition of the event or gesture is allowed. This corresponds to the "should begin" operation 454, discussed above with reference to FIGS. 4C and 4D. The delegate returns one or more values indicating whether the state transition is to be allowed. The respective gesture recognizer conditionally sends (542) information corresponding to the respective event to the software application, in accordance with the one or more values determined by the assigned delegate. The software application is executed (545) in accordance with information received from one or more of the gesture recognizers corresponding to the respective touch.

In other words, in these embodiments, a software application (or the operating system 118 or control application 124) invokes the delegates corresponding to respective candidate gesture recognizers to obtain values that indicate which of the respective candidate gesture recognizers (if any) should process the respective touch. In addition, other aspects of the behavior of the gesture recognizers can be further modified by the assigned delegate.

FIGS. 6A-6B are flow charts illustrating an exemplary method of processing a respective event in accordance with information obtained from a delegate, according to some embodiments.

Method 600 is performed (602) at an electronic device (e.g., device 102 or 104) having one or more event sensors (e.g., 130) and configured to execute a software application (e.g., 132) that includes a plurality of views (e.g., application views 316) and an application state of the software application (e.g., 317).

The device (604) displays one or more views of the plurality of views. A respective view of the one or more displayed views includes one or more gesture recognizers (e.g., event recognizer 320-1). In some embodiments, at least a subset of the one or more displayed views includes one or more gesture recognizers, and the rest of the one or more displayed views do not include gesture recognizers.

A respective gesture recognizer of the one or more gesture recognizers has a corresponding delegate. In some embodiments, not all gesture recognizers have corresponding delegates (i.e., in some embodiments, some gesture recognizers do not have corresponding delegates). In some embodiments, the respective gesture recognizer corresponds to two or more delegates, where each delegate determines distinct values for the corresponding gesture recognizer for distinct conditions (e.g., a first delegate determines "should receive" 450, a second delegate determines "recognition blocked" 451, etc.). In some embodiments, two or more gesture recognizers correspond to (e.g., utilize) a same delegate.

In some embodiments, the device assigns (606) a respective delegate (e.g., delegate 321-1) to the respective gesture recognizer (e.g., 320-1) (e.g., see the description of step 532 in FIG. 5B). Alternately, the respective gesture recognizer has a corresponding delegate, and thus a delegate does not need to be assigned at runtime. All references herein to the assigned delegate of an event/gesture recognizer shall be understood to be equally applicable to a corresponding delegate of an event/gesture recognizer, and all references to a corresponding delegate shall be understood to be equally applicable to an assigned delegate.

In some embodiments, the one or more displayed views include (608) a plurality of gesture recognizers, and the device assigns distinct delegates to at least a subset of the plurality of gesture recognizers. In other words, the device may have fewer delegates than the number of gesture recognizers, since some gesture recognizers may not have assigned delegates.

The device detects (610) one or more events. In some embodiments, the device detects one or more events using sensors 130, input devices 128, and/or touch-sensitive display 156.

The device processes (612) a respective event of the one or more events using the respective gesture recognizer. The processing of the respective event includes processing the respective event at the respective gesture recognizer in accordance with a respective gesture definition corresponding to the respective gesture recognizer (e.g., comparing the event and gesture definitions 333 using event comparator 332), executing the corresponding delegate to determine one or more values in accordance with the application state (e.g., 540 in FIG. 5B), and conditionally sending information corresponding to the respective event (e.g., whether the gesture recognizer recognizes the event, such as "tap gesture" or "swipe gesture", related event information, such as the location and time stamp of the event, and/or other additional information) to the software application in accordance with an outcome of the processing of the respective event by the respective gesture recognizer and in accordance with the one or more values determined by the corresponding delegate.

In some embodiments, the delegate has instructions for determining event recognizer properties (such as "should begin", "should receive", and "simultaneous recognition"), and when executed, returns one or more corresponding values. In some embodiments, values for the event recognizer properties can be set by the software application in accordance with the application state. In some embodiments, the values for the properties are predefined by developers. In some embodiments, the internal properties of a respective event/gesture recognizer have default values that can be overridden by the delegate corresponding to the event/gesture recognizer.

For example, the device sends information corresponding to the respective event when the gesture recognizer is allowed to recognize the event (e.g., based on the one or more values determined by the gesture recognizer's corresponding delegate, the one or more values indicating whether the gesture recognizer can transition out of event possible state 410 to event recognized state 420 or event began state 412 or whether the gesture recognizer can simultaneously recognize the event despite the presence of a blocking gesture recognizer). In some embodiments, the device sends information corresponding to the respective event only when the event matches a corresponding gesture definition or a part thereof. Furthermore, application states or other conditions may prevent the respective gesture recognizer from sending information corresponding to the respective event.

The device executes (614) the software application (e.g., 132-1) in accordance with information, received from the respective gesture recognizer, corresponding to the respective event. For example, the software application (e.g., 132-1) includes a plurality of event handlers 322, and one or more of event handlers 322 are activated according to information received from the respective gesture recognizer (e.g., event handlers 322 listed in action-target pairs 345 are activated).

In some embodiments, the one or more event sensors (e.g., 130) include a touch-sensitive surface (e.g., 156 or a separate touch-sensitive surface) configured to detect one or more touches, and the one or more events include the one or more touches, and processing the respective event comprises processing a respective touch (616). In some embodiments, the one or more event sensors (e.g., 130) include accelerometers and the one or more events also include rotation or other movement of the electronic device.

In some embodiments, the device conditionally receives (618) the respective touch at the respective gesture recognizer in accordance with the one or more values determined by the assigned delegate. For example, the respective gesture recognizer receives the respective touch only when the one or more values (e.g., "receive touch value") determined by the corresponding delegate allows the respective gesture recognizer to receive the respective touch (e.g., "should receive" 450 in FIGS. 4C-4D).

In some embodiments, processing the respective touch includes (620) the respective gesture recognizer disregarding the respective touch when the one or more values determined by the corresponding delegate matches predefined touch disregard criteria. In these embodiments, instead of conditionally receiving the respective touch as described in step 618, the respective gesture recognizer disregards the respective touch.

In some embodiments, processing the respective touch includes (622) blocking the respective gesture recognizer from receiving the respective touch when the one or more values determined by the corresponding delegate match predefined touch disregard criteria. In these embodiments, the gesture recognizer does not have a need for conditionally receiving or disregarding the respective touch, since the respective touch is blocked and therefore does not reach the respective gesture recognizer. In some embodiments, the blocking the respective gesture recognizer from receiving the respective touch includes instructing event dispatcher module 315 not to send event information to the corresponding gesture recognizer.

In some embodiments, processing the respective touch at the respective gesture recognizer includes (624), when the detected touch is consistent with the respective gesture definition (e.g., the respective touch matches the gesture definition or a part thereof), enabling a corresponding state transition in the respective gesture recognizer when the state transition is enabled by the corresponding delegate (e.g., "should begin" 454 in FIGS. 4C-4D). In some embodiments, the state transition is enabled when a state transition enable value (e.g., "should begin" value) is determined by the corresponding delegate to meet state transition criteria.

In some embodiments, processing the respective touch at the respective gesture recognizer includes (626), when the detected touch is consistent with the respective gesture definition, conditionally enabling a corresponding state transition in the respective gesture recognizer when the state transition is enabled by the corresponding delegate. In other words, the state transition is conditionally enabled even if the corresponding delegate enables (e.g., does not block) the transition. For example, the condition for the state transition includes: whether the respective touch/event matches the gesture definition or a part thereof, whether the respective gesture recognizer is allowed to receive the respective touch/event, and/or whether the recognition of the respective touch/event is blocked.

In some embodiments, processing the respective touch at the respective gesture recognizer includes, when the detected touch is consistent with the respective gesture definition, (conditionally) disabling a corresponding state transition in the respective gesture recognizer when the state transition is prevented/disabled by another gesture recognizer that has also recognized a gesture. In particular, gesture recognizers can be paired (or grouped) so that one gesture recognizer can prevent the other gesture recognizer(s) from make a transition into event recognized state 420 or event began state 412 (e.g., when a first gesture recognizer is configured to prevent a second gesture recognizer, the first gesture recognizer, in recognizing an event/touch, prevents the second gesture recognizer from recognizing the event/touch, regardless of the values returned by the delegate corresponding to the second gesture recognizer).

In some embodiments, multiple gesture recognizers are listed based on priority (e.g., based on the sequence of the code, sequence of instantiation, view hierarchy corresponding to the respective gesture recognizer, or priority assigned by a developer or the software application). When two or more gesture recognizers simultaneously recognize a respective touch, the highest priority gesture recognizer blocks all other gesture recognizers from recognizing the respective touch.

In some embodiments, processing the respective touch at the respective gesture recognizer includes (628) simultaneously processing the gesture at a second gesture recognizer in accordance with one or more values determined by a delegate corresponding to the second gesture recognizer. For example, the delegate corresponding to the second gesture recognizer may allow the second gesture recognizer to process the gesture at the second gesture recognizer (e.g., step 452 in FIGS. 4C-4D), even though another gesture recognizer blocks the recognition of the event.

In some embodiments, processing the respective touch at the respective gesture recognizer includes (630) simultaneously processing the gesture at a second gesture recognizer in accordance with one or more values determined by the delegate corresponding to the respective gesture recognizer. For example, the delegate corresponding to the gesture recognizer may allow the second gesture recognizer to process the gesture at the second gesture recognizer (e.g., steps 455 and 456 in FIGS. 4C-4D), even though another gesture recognizer blocks the recognition of the event.

In some embodiments, processing the respective touch at the respective gesture recognizer includes simultaneously processing the gesture at a second gesture recognizer in accordance with values determined by the delegates corresponding respectively to the first and second gesture recognizers.

FIGS. 7A-7B are flow charts illustrating an exemplary method of processing a respective touch in accordance with a receive touch value obtained from a delegate, according to some embodiments.

Method 700 is performed (702) at an electronic device (e.g., device 104) having a touch-sensitive surface (e.g., 156) and configured to execute a software application that includes a plurality of views (e.g., 316) and an application state of the software application (e.g., 317).

The device displays (704) one or more views of the plurality of views (e.g., 316). A respective view of the one or more displayed views includes one or more gesture recognizers (e.g., 320-1 or 343-2), and a respective gesture recognizer of the one or more gesture recognizers has a corresponding delegate (e.g., 321-1 or 346).

The device detects (706) one or more touches, on the touch-sensitive surface (e.g., 156 or 130). The one or more touches have a touch position that falls within one or more of the displayed views.

The device processes (708) a respective touch of the one or more touches (e.g., determining (453) whether the respective touch matches gesture definitions 333 by using event comparator 332). The processing a respective touch includes: executing (710) the delegate corresponding to the respective gesture recognizer to obtain a receive touch value in accordance with the application state (e.g., 550 in FIG. 5C); when the receive touch value meets predefined criteria (e.g., the predefined criteria is that the respective gesture recognizer is a receiving gesture recognizer 552 in some embodiments), processing the respective touch at the respective gesture recognizer (e.g., 554); and conditionally sending information corresponding to the respective touch to the software application (e.g., 542).

In some embodiments, the plurality of views includes (712) a plurality of gesture recognizers (e.g., application views 316 and recognizers 320 in FIG. 3B; views 508, 510, and 512 and gesture recognizers 516 in FIG. 5A). Distinct delegates correspond to at least a subset of the plurality of gesture recognizers. Optionally, the device assigns the distinct delegates (e.g., 321) to at least a subset of the plurality of gesture recognizers (e.g., 320). Processing the respective touch of the one or more touches includes: identifying a set of candidate gesture recognizers of the plurality of gesture recognizers (e.g., 548); for each candidate gesture recognizer having a corresponding delegate, executing the corresponding delegate to obtain a receive touch value in accordance with the application state (e.g., 550); identifying one or more receiving gesture recognizers, comprising a subset of the candidate gesture recognizers, in accordance with the obtained receive touch values (e.g., 552); and processing the respective touch at each gesture recognizer of the one or more of receiving gesture recognizers (e.g., 554).

In some embodiments, identifying the set of candidate gesture recognizers of the plurality of gesture recognizers includes identifying a set of gesture recognizers attached to the hit view. Optionally, identifying the set of candidate gesture recognizers of the plurality of gesture recognizers includes identifying a set of gesture recognizers that include a gesture definition corresponding to the respective touch. Furthermore, in some embodiments, identifying the set of receiving gesture recognizers includes identifying a subset of candidate gesture recognizers for which corresponding delegates provide respective receive touch values meeting receive touch criteria (e.g., the receive touch value indicates that the corresponding gesture recognize can receive the respective touch).

In some embodiments, processing the respective touch at each gesture recognizer of the one or more receiving gesture recognizers includes (718) processing the respective touch at a respective receiving gesture recognizer having a corresponding delegate in accordance with a respective gesture definition corresponding to the respective gesture recognizer, executing the delegate to determine one or more values in accordance with the application state, and conditionally sending information corresponding to the respective touch to the software application in accordance with an outcome of the processing of the respective touch by the respective gesture recognizer and in accordance with the one or more values determined by the delegate. The device executes the software application in accordance with information, received from one or more of the receiving gesture recognizers, corresponding to one or more of the touches.

In some embodiments, processing the respective touch at the respective receiving gesture recognizer includes (720), when the detected touch is consistent with the respective gesture definition (e.g., the respective touch matches the gesture definition or a part thereof), enabling a corresponding state transition in the respective gesture recognizer when the state transition is enabled by the corresponding delegate (e.g., "should begin" 454 in FIGS. 4C-4D).

In some embodiments, processing the respective touch at the respective receiving gesture recognizer includes (722), when the detected touch is consistent with the respective gesture definition, conditionally enabling a corresponding state transition in the respective gesture recognizer when the state transition is enabled by the corresponding delegate. For example, the condition for the state transition includes: whether the respective touch/event matches the gesture definition or a part thereof, whether the respective gesture recognizer is allowed to receive the respective touch/event, whether the recognition of the respective touch/event is blocked, and/or whether system level instructions (e.g., a shutdown process or other process having higher priority than the application) prevent the state transition.

In some embodiments, processing the respective touch at the respective receiving gesture recognizer includes (724) simultaneously processing the gesture at a second gesture recognizer in accordance with one or more values determined by the delegate corresponding to the second gesture recognizer. For example, the delegate corresponding to the second gesture recognizer may allow the second gesture recognizer to process the gesture at the second gesture recognizer (e.g., step 452 in FIGS. 4C-4D).

In some embodiments, processing the respective touch at the respective receiving gesture recognizer includes (726) simultaneously processing the gesture at a second gesture recognizer in accordance with one or more values determined by the delegate corresponding to the respective gesture recognizer (e.g., steps 455 and 456 in FIGS. 4C-4D).

The device executes (716) the software application in accordance with information, received from the respective gesture recognizer, corresponding to the respective touch (e.g., 545). For example, the software application (e.g., 132-1) includes a plurality of event handlers 322, and one or more of event handlers 322 are activated according to information received from the respective gesture recognizer (e.g., event handlers 322 listed in action-target pairs 345 are activated).

FIGS. 8A-8B are flow charts illustrating an exemplary method of processing a respective touch in a software application including a discrete gesture recognizer and a continuous gesture recognizer, according to some embodiments.

Method 800 is performed (802) at an electronic device (e.g., device 104) having a touch-sensitive surface and configured to execute a software application.

The device displays (804) one or more views (e.g., 316) of the software application (e.g., 132-1). The one or more displayed views include a plurality of gesture recognizers (e.g., 320). The plurality of gesture recognizers includes at least one discrete gesture recognizer (e.g., FIGS. 4A and 4C), and at least one continuous gesture recognizer (e.g., FIGS. 4B and 4D).

In some embodiments, the discrete gesture recognizer is configured (806) to send a single action message in response to a respective gesture, and the continuous gesture recognizer configured to send action messages at successive recognized sub-events of a respective recognized gesture.

In some embodiments, a discrete gesture recognizer is configured to send a single set of action messages in response to a respective gesture. When a plurality of target-action pairs are assigned to the respective discrete gesture recognizer, the single set of action messages includes a plurality of action messages. When a single target-action pair is assigned to the respective discrete gesture recognizer, the single set of action messages includes a single action message.

In some embodiments, each gesture recognizer has (822) a set of gesture recognizer states (e.g., FIGS. 4A-4D).

In some embodiments, the discrete gesture recognizer has (824) a first set of gesture recognizer states including:
  gesture possible state 410, corresponding to an initial state of the discrete gesture recognizer;
  gesture recognized state 420, corresponding to recognition of the respective gesture; and
  gesture failed state 430, corresponding to failure of the discrete gesture recognizer to recognize the one or more touches as the respective gesture.

In some embodiments, the continuous gesture recognizer has a second set of gesture recognizer states including:
  gesture possible state 410, corresponding to an initial state of the continuous gesture recognizer;
  gesture began state 412, corresponding to initial recognition of the respective gesture;
  gesture changed state 414, corresponding to a respective change in location of the respective touch;
  gesture ended state 416, corresponding to completion of the respective recognized gesture;
  gesture canceled state 418, corresponding to interruption of the recognition of the respective gesture; and
  gesture failed state 430, corresponding to failure of the continuous gesture recognizer to recognize the one or more touches as the respective gesture.

In some embodiments, gesture recognizer states have assigned values (e.g., gesture recognizer state values). In some embodiments, the gesture recognized state and the gesture ended state have (826) an identical gesture recognizer state value.

In some embodiments, the at least one discrete gesture recognizer includes (828): one or more of a tap gesture recognizer, and a swipe gesture recognizer; and the at least one continuous gesture recognizer includes: one or more of a long press gesture recognizer, a pinch gesture recognizer, a pan gesture recognizer, a rotate gesture recognizer, and a transform gesture recognizer.

In some embodiments, the at least one discrete gesture recognizer includes (830): a tap gesture recognizer, and a swipe gesture recognizer; and the at least one continuous gesture recognizer includes: a long press gesture recognizer, a pinch gesture recognizer, a pan gesture recognizer, a rotate gesture recognizer, and a transform gesture recognizer.

A tap gesture recognizer is configured to recognize a tap gesture; a swipe gesture recognizer is configured to recognize a swipe gesture (e.g., a flick of a touch on a touch-sensitive surface); a long press gesture recognizer is configured to recognize a long press gesture (e.g., a press and hold of a touch); a pinch gesture recognizer is configured to recognize a pinch gesture (e.g., contact and relative movement of two or more touches); a pan gesture recognizer is configured to recognize a pan gesture (e.g., touch and coherent movement of one or more touches); a rotate gesture recognizer is configured to recognize a rotation (e.g., contact and rotational movement of two or more touches); and a transform gesture recognizer is configured to recognize a transform gesture (e.g., a simultaneous movement of two or more touches representing panning, rotation, and pinch).

In some embodiments, at least one discrete gesture recognizer (e.g., one or more of the aforementioned discrete gesture recognizers) and at least one continuous gesture recognizer (e.g., one or more of the aforementioned continuous gesture recognizers) are distributed in a software library such that software developers can incorporate them into any third party software using the software library. In comparison, views have view styles (e.g., color, size, and shape of user interface objects and frames). In some embodiments, predefined view styles are distributed as a part of UI Interface API (e.g., 204 in FIG. 2) such that software developers can develop a software application having the predefined view styles by using the software library (or template).

The device detects (808 in FIG. 8A) one or more touches. In some embodiments, the device detects one or more events using sensors 130, input devices 128, and/or touch-sensitive display 156.

The device processes (810) each of the touches using one or more of the gesture recognizers. The processing of a respective touch includes (812) processing the respective touch at a respective gesture recognizer in accordance with a respective gesture definition corresponding to the respective gesture recognizer (e.g., comparing the event and gesture definitions 333 using event comparator 332 and determining whether the event matches the gesture definitions 333 or a part thereof), and conditionally sending one or more respective action messages to the software application in accordance with an outcome of the processing of the respective touch at the respective gesture recognizer (e.g., sending an action message when the respective touch matches the gesture definition).

In some embodiments, the software application has (814) an application state. Conditionally sending the one or more respective action messages includes conditionally sending the one or more respective action messages further in accordance with the application state of the software application. For example, the application state of the software application may delay or prevent sending the one or more respective action messages (e.g., when the system resources are overused, when a higher priority process needs to be processed, etc.).

The device executes (816) the software application in accordance with one or more action messages received from one or more of the gesture recognizers corresponding to one or more of the touches. For example, the software application (e.g., 132-1) includes a plurality of event handlers 322, and one or more of event handlers 322 are activated according to action message received from one or more of the gesture recognizers.

In some embodiments, the device requests (818) additional information from the respective gesture recognizer. Executing the software application includes executing the software application further in accordance with the additional information. For example, the respective gesture recognizer can provide additional information (e.g., detailed information, such as a time stamp for each sub-event, the amount of jitter, speed, direction, duration, scale factor, angle, etc.).

In some embodiments, the additional information includes (820) the number and locations of respective touches processed at the respective gesture recognizer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at an electronic device having one or more event sensors and configured to execute a software application:
displaying one or more views of the software application, wherein the one or more displayed views include a plurality of gesture recognizers, the plurality of gesture recognizers including:
at least a first discrete gesture recognizer, the first discrete gesture recognizer configured to send a single action message in response to a respective gesture, wherein the first discrete gesture recognizer is for recognizing a corresponding discrete gesture and has at least one gesture definition that specifies a sequence of events or sub-events of the corresponding discrete gesture recognized by the first discrete gesture recognizer; and
at least a first continuous gesture recognizer, distinct from the at least the first discrete gesture recognizer, the first continuous gesture recognizer configured to send action messages at successive recognized sub-events of a respective recognized gesture, wherein the first continuous gesture recognizer is for recognizing a corresponding continuous gesture and has at least one gesture definition that specifies a sequence of events or sub-events of the corresponding continuous gesture recognized by the first continuous gesture recognizer;
detecting one or more events, a respective event of the one or more events including one or more sub-events;
processing the respective event of the one or more events, including processing a respective sub-event of the respective event, using at least two gesture recognizers of the plurality of gesture recognizers, including the first discrete gesture recognizer and the first continuous gesture recognizer, the processing of the respective event including:
processing the respective event of the one or more events at a respective gesture recognizer in accordance with a respective gesture definition corresponding to the respective gesture recognizer; and
conditionally sending one or more respective action messages to the software application in accordance with an outcome of the processing of the respective event at the respective gesture recognizer, including, when the respective gesture recognizer is the first continuous gesture recognizer and the respective event corresponds to a respective recognized continuous gesture recognized by the first continuous gesture recognizer, sending to the software application in sequence a first action message and a second action message at successive recognized sub-events of the respective recognized continuous gesture recognized by the first continuous gesture recognizer; and
executing the software application in accordance with one or more action messages received from a gesture recognizer of the at least two gesture recognizers, wherein the one or more action messages are sent to the software application based on processing of the one or more events by the at least two gesture recognizers.

2. The method of claim 1, wherein the one or more event sensors include a camera configured to detect one or more eye movements, and the one or more events include the one or more eye movements, and processing the respective event comprises processing a respective eye movement.

3. The method of claim 1, wherein the one or more event sensors include an accelerometer or gyroscope configured to detect one or more movements of the electronic device, and the one or more events include the one or more movements of the electronic device, and processing the respective event comprises processing a respective movement of the electronic device.

4. The method of claim 1, wherein the one or more event sensors include a camera configured to detect one or more movements of an object, and the one or more events include the one or more movements of the object, and processing the respective event comprises processing a respective movement of the object.

5. The method of claim 1, wherein the one or more event sensors include a touch sensitive surface configured to detect one or more touches, and the one or more events include the one or more touches, and processing the respective event comprises processing a respective touch.

6. The method of claim 1, wherein the one or more action messages received from the first continuous gesture recognizer cause a scrolling of at least a portion of a di splayed view of the software application.

7. The method of claim 1, wherein, concurrently, in accordance with the processing of the respective event, the first discrete gesture recognizer has a first state and the first continuous gesture recognizer has a second state, distinct from the first state of the first discrete gesture recognizer.

8. The method of claim 7, wherein, concurrently, in accordance with the processing of the respective event:

the first state of the first discrete gesture recognizer is selected from a first set of gesture recognizer states including:
- a gesture possible state, corresponding to an initial state of the first discrete gesture recognizer;
- a gesture recognized state, corresponding to recognition of a respective gesture; and
- a gesture failed state, corresponding to failure of the first discrete gesture recognizer to recognize the one or more events as the respective gesture; and the second state of the first continuous gesture recognizer is selected from a second set of gesture recognizer states including:
- a gesture possible state;
- a gesture began state, corresponding to initial recognition of the respective gesture;
- a gesture changed state, corresponding to a respective change in location of the respective event;
- a gesture ended state, corresponding to completion of recognition of the respective gesture;
- a gesture canceled state, corresponding to interruption of recognition of the respective gesture; and
- a gesture failed state, corresponding to failure of the first continuous gesture recognizer to recognize the one or more events as the respective gesture.

9. The method of claim 8, wherein processing a respective event includes transitioning a state of the respective gesture recognizer, between states selected from a set of gesture recognizer states of the respective gesture recognizer, based on the processing of the respective event.

10. The method of claim 1, wherein:
the software application has an application state; and
conditionally sending the one or more respective action messages includes conditionally sending the one or more respective action messages further in accordance with the application state of the software application.

11. The method of claim 1, further comprising requesting additional information from the respective gesture recognizer, wherein executing the software application includes executing the software application further in accordance with the additional information.

12. The method of claim 1, wherein:
the at least the first discrete gesture recognizer includes one or more gesture recognizers selected from the group consisting of:
- a tap gesture recognizer and a swipe gesture recognizer; and the at least the first continuous gesture recognizer includes one or more gesture recognizers selected from the group consisting of:
- a long press gesture recognizer, a pinch gesture recognizer, a pan gesture recognizer, a rotate gesture recognizer, and a transform gesture recognizer.

13. The method of claim 1, wherein:
the at least the first discrete gesture recognizer includes:
- a tap gesture recognizer, and a swipe gesture recognizer; and the at least the first continuous gesture recognizer includes:
- a long press gesture recognizer, a pinch gesture recognizer, a pan gesture recognizer, a rotate gesture recognizer, and a transform gesture recognizer.

14. The method of claim 1, wherein the plurality of gesture recognizers included in the one or more displayed views comprise instances of gesture recognizers each corresponding to a gesture recognizer attached to a respective view of the one or more displayed views of the software application.

15. The method of claim 1, wherein the first discrete gesture recognizer has a first set of gesture recognizer states associated with a discrete gesture, the first continuous gesture recognizer has a second set of gesture recognizer states associated with a continuous gesture that is at least partially distinct from the first set of gesture recognizer states, and processing a respective event includes transitioning a state of the respective gesture recognizer, between states selected from a set of gesture recognizer states of the respective gesture recognizer, based on the processing of the respective event.

16. An electronic device, comprising:
one or more event sensors;
one or more processors; and
memory storing one or more programs for execution by the one or more processors, the one or more programs including a software application, and the software application including instructions for:
displaying one or more views of the software application, wherein the one or more displayed views include a plurality of gesture recognizers, the plurality of gesture recognizers including:
at least a first discrete gesture recognizer, the first discrete gesture recognizer configured to send a single action message in response to a respective gesture, wherein the first discrete gesture recognizer is for recognizing a corresponding discrete gesture and has at least one gesture definition that specifies a sequence of events or sub-events of the corresponding discrete gesture recognized by the first discrete gesture recognizer; and
at least a first continuous gesture recognizer, distinct from the at least the first discrete gesture recognizer, the first continuous gesture recognizer configured to send action messages at successive recognized sub-events of a respective recognized gesture, wherein the first continuous gesture recognizer is for recognizing a corresponding continuous gesture and has at least one gesture definition that specifies a sequence of events or sub-events of the corresponding continuous gesture recognized by the first continuous gesture recognizer;
detecting one or more events, a respective event of the one or more events including one or more sub-events;
processing the respective event of the one or more events, including processing a respective sub-event of the respective event, using at least two gesture recognizers of the plurality of gesture recognizers, including the first discrete gesture recognizer and the first continuous gesture recognizer, the processing of the respective event including:
processing the respective event of the one or more events at a respective gesture recognizer in accordance with a respective gesture definition corresponding to the respective gesture recognizer; and
conditionally sending one or more respective action messages to the software application in accordance with an outcome of the processing of the respective event at the respective gesture recognizer, including, when the respective gesture recognizer is the first continuous gesture recognizer and the respective event corresponds to a respective recognized continuous gesture recognized by the first continuous gesture recognizer, sending to the software application in sequence a first action message and a second action message at successive recognized sub-events of the respective recognized continuous gesture recognized by the first continuous gesture recognizer; and executing the software application in accordance with one or more action messages received from a gesture recognizer of the at least two gesture recognizers, wherein the one or more action messages are sent to the software application based on processing of the one or more events by the at least two gesture recognizers.

17. The electronic device of claim 16, wherein the one or more event sensors include a camera configured to detect one or more eye movements, and the one or more events include the one or more eye movements, and processing the respective event comprises processing a respective eye movement.

18. The electronic device of claim 16, wherein the one or more event sensors include an accelerometer or gyroscope configured to detect one or more movements of the electronic device, and the one or more events include the one or more movements of the electronic device, and processing the respective event comprises processing a respective movement of the electronic device.

19. The electronic device of claim 16, wherein the one or more event sensors include a camera configured to detect one or more movements of an object, and the one or more events include the one or more movements of the object, and processing the respective event comprises processing a respective movement of the object.

20. The electronic device of claim 16, wherein the one or more action messages received from the first continuous gesture recognizer cause a scrolling of at least a portion of a displayed view of the software application.

21. The electronic device of claim 16, wherein the one or more event sensors include a touch sensitive surface configured to detect one or more touches, and the one or more events include the one or more touches, and processing the respective event comprises processing a respective touch.

22. The electronic device of claim 16, wherein, concurrently, in accordance with the processing of the respective event, the first discrete gesture recognizer has a first state and the first continuous gesture recognizer has a second state, distinct from the first state of the first discrete gesture recognizer.

23. The electronic device of claim 22, wherein, concurrently, in accordance with the processing of the respective event:

the first state of the first discrete gesture recognizer is selected from a first set of gesture recognizer states including:
 a gesture possible state, corresponding to an initial state of the first discrete gesture recognizer;
 a gesture recognized state, corresponding to recognition of a respective gesture; and
 a gesture failed state, corresponding to failure of the first discrete gesture recognizer to recognize the one or more events as the respective gesture; and the second state of the first continuous gesture recognizer is selected from a second set of gesture recognizer states including:
 a gesture possible state;
 a gesture began state, corresponding to initial recognition of the respective gesture;

a gesture changed state, corresponding to a respective change in location of the respective event;
 a gesture ended state, corresponding to completion of recognition of the respective gesture;
 a gesture canceled state, corresponding to interruption of recognition of the respective gesture; and
 a gesture failed state, corresponding to failure of the first continuous gesture recognizer to recognize the one or more events as the respective gesture.

24. The electronic device of claim 23, wherein processing a respective event includes transitioning a state of the respective gesture recognizer, between states selected from a set of gesture recognizer states of the respective gesture recognizer, based on the processing of the respective event.

25. The electronic device of claim 16, wherein:
the software application has an application state; and
conditionally sending the one or more respective action messages includes conditionally sending the one or more respective action messages further in accordance with the application state of the software application.

26. The electronic device of claim 16, wherein the one or more programs include instructions for requesting additional information from the respective gesture recognizer, and wherein executing the software application includes executing the software application further in accordance with the additional information.

27. The electronic device of claim 16, wherein:
the at least the first discrete gesture recognizer includes one or more gesture recognizers selected from the group consisting of:
a tap gesture recognizer and a swipe gesture recognizer; and
the at least the first continuous gesture recognizer includes one or more gesture recognizers selected from the group consisting of:
a long press gesture recognizer, a pinch gesture recognizer, a pan gesture recognizer, a rotate gesture recognizer, and a transform gesture recognizer.

28. The electronic device of claim 16, wherein:
the at least the first discrete gesture recognizer includes:
a tap gesture recognizer, and a swipe gesture recognizer; and
the at least the first continuous gesture recognizer includes:
a long press gesture recognizer, a pinch gesture recognizer, a pan gesture recognizer, a rotate gesture recognizer, and a transform gesture recognizer.

29. The electronic device of claim 16, wherein the plurality of gesture recognizers included in the one or more displayed views comprise instances of gesture recognizers each corresponding to a gesture recognizer attached to a respective view of the one or more displayed views of the software application.

30. The electronic device of claim 16, wherein the first discrete gesture recognizer has a first set of gesture recognizer states associated with a discrete gesture, the first continuous gesture recognizer has a second set of gesture recognizer states associated with a continuous gesture that is at least partially distinct from the first set of gesture recognizer states, and processing a respective event includes transitioning a state of the respective gesture recognizer, between states selected from a set of gesture recognizer states of the respective gesture recognizer, based on the processing of the respective event.

31. A non-transitory computer readable storage medium storing one or more programs for execution by one or more processors of an electronic device having one or more event sensors, the one or more programs including a software application, the software application including instructions for:
- displaying one or more views of the software application, wherein the one or more displayed views include a plurality of gesture recognizers, the plurality of gesture recognizers including:
  - at least a first discrete gesture recognizer, the first discrete gesture recognizer configured to send a single action message in response to a respective gesture, wherein the first discrete gesture recognizer is for recognizing a corresponding discrete gesture and has at least one gesture definition that specifies a sequence of events or sub-events of the corresponding discrete gesture recognized by the first discrete gesture recognizer; and
  - at least a first continuous gesture recognizer, distinct from the at least the first discrete gesture recognizer, the first continuous gesture recognizer configured to send action messages at successive recognized sub-events of a respective recognized gesture, wherein the first continuous gesture recognizer is for recognizing a corresponding continuous gesture and has at least one gesture definition that specifies a sequence of events or sub-events of the corresponding continuous gesture recognized by the first continuous gesture recognizer;
- detecting one or more events, a respective event of the one or more events including one or more sub-events;
- processing the respective event of the one or more events, including processing a respective sub-event of the respective event, using at least two gesture recognizers of the plurality of gesture recognizers, including the first discrete gesture recognizer and the first continuous gesture recognizer, the processing of the respective event including:
  - processing the respective event of the one or more events at a respective gesture recognizer in accordance with a respective gesture definition corresponding to the respective gesture recognizer; and
  - conditionally sending one or more respective action messages to the software application in accordance with an outcome of the processing of the respective event at the respective gesture recognizer, including, when the respective gesture recognizer is the first continuous gesture recognizer and the respective event corresponds to a respective recognized continuous gesture recognized by the first continuous gesture recognizer, sending to the software application in sequence a first action message and a second action message at successive recognized sub-events of the respective recognized continuous gesture recognized by the first continuous gesture recognizer; and
- executing the software application in accordance with one or more action messages received from a gesture recognizer of the at least two gesture recognizers, wherein the one or more action messages are sent to the software application based on processing of the one or more events by the at least two gesture recognizers.

32. The non-transitory computer readable storage medium of claim 31, wherein the one or more event sensors include an accelerometer or gyroscope configured to detect one or more movements of the electronic device, and the one or more events include the one or more movements of the electronic device, and processing the respective event comprises processing a respective movement of the electronic device.

33. The non-transitory computer readable storage medium of claim 31, wherein the one or more event sensors include a camera configured to detect one or more movements of an object, and the one or more events include the one or more movements of the object, and processing the respective event comprises processing a respective movement of the object.

34. The non-transitory computer readable storage medium of claim 31, wherein the one or more event sensors include a camera configured to detect one or more eye movements, and the one or more events include the one or more eye movements, and processing the respective event comprises processing a respective eye movement.

35. The non-transitory computer readable storage medium of claim 31, wherein the one or more event sensors include a touch sensitive surface configured to detect one or more touches, and the one or more events include the one or more touches, and processing the respective event comprises processing a respective touch.

36. The non-transitory computer readable storage medium of claim 31, wherein the one or more action messages received from the first continuous gesture recognizer cause a scrolling of at least a portion of a displayed view of the software application.

37. The non-transitory computer readable storage medium of claim 31, wherein, concurrently, in accordance with the processing of the respective event, the first discrete gesture recognizer has a first state and the first continuous gesture recognizer has a second state, distinct from the first state of the first discrete gesture recognizer.

38. The non-transitory computer readable storage medium of claim 37, wherein, concurrently, in accordance with processing of the respective event:
- the first state of the first discrete gesture recognizer is selected from a first set of gesture recognizer states including:
  - a gesture possible state, corresponding to an initial state of the first discrete gesture recognizer;
  - a gesture recognized state, corresponding to recognition of a respective gesture; and
  - a gesture failed state, corresponding to failure of the first discrete gesture recognizer to recognize the one or more events as the respective gesture; and
- the second state of the first continuous gesture recognizer is selected from a second set of gesture recognizer states including:
  - a gesture possible state;
  - a gesture began state, corresponding to initial recognition of the respective gesture;
  - a gesture changed state, corresponding to a respective change in location of the respective event;
  - a gesture ended state, corresponding to completion of recognition of the respective gesture;
  - a gesture canceled state, corresponding to interruption of recognition of the respective gesture; and
  - a gesture failed state, corresponding to failure of the first continuous gesture recognizer to recognize the one or more events as the respective gesture.

39. The non-transitory computer readable storage medium of claim 38, wherein processing a respective event includes transitioning a state of the respective gesture recognizer, between states selected from a set of gesture recognizer states of the respective gesture recognizer, based on the processing of the respective event.

40. The non-transitory computer readable storage medium of claim 31, wherein:
the software application has an application state; and
conditionally sending the one or more respective action messages includes conditionally sending the one or more respective action messages further in accordance with the application state of the software application.

41. The non-transitory computer readable storage medium of claim 31, wherein the one or more programs comprise instructions that cause the electronic device to request additional information from the respective gesture recognizer, and wherein executing the software application includes executing the software application further in accordance with the additional information.

42. The non-transitory computer readable storage medium of claim 31, wherein:
the at least the first discrete gesture recognizer includes one or more gesture recognizers selected from the group consisting of:
a tap gesture recognizer and a swipe gesture recognizer; and
the at least the first continuous gesture recognizer includes one or more gesture recognizers selected from the group consisting of:
a long press gesture recognizer, a pinch gesture recognizer, a pan gesture recognizer, a rotate gesture recognizer, and a transform gesture recognizer.

43. The non-transitory computer readable storage medium of claim 31, wherein:
the at least the first discrete gesture recognizer includes:
a tap gesture recognizer, and a swipe gesture recognizer; and
the at least the first continuous gesture recognizer includes:
a long press gesture recognizer, a pinch gesture recognizer, a pan gesture recognizer, a rotate gesture recognizer, and a transform gesture recognizer.

44. The non-transitory computer readable storage medium of claim 31, wherein the plurality of gesture recognizers included in the one or more displayed views comprise instances of gesture recognizers each corresponding to a gesture recognizer attached to a respective view of the one or more displayed views of the software application.

45. The non-transitory computer readable storage medium of claim 31, wherein the first discrete gesture recognizer has a first set of gesture recognizer states associated with a discrete gesture, the first continuous gesture recognizer has a second set of gesture recognizer states associated with a continuous gesture that is at least partially distinct from the first set of gesture recognizer states, and processing a respective event includes transitioning a state of the respective gesture recognizer, between states selected from a set of gesture recognizer states of the respective gesture recognizer, based on the processing of the respective event.

* * * * *